United States Patent
Gao et al.

(10) Patent No.: US 8,842,628 B2
(45) Date of Patent: Sep. 23, 2014

(54) ENHANCED PDCCH WITH TRANSMIT DIVERSITY IN LTE SYSTEMS

(75) Inventors: Shiwei Gao, Nepean (CA); Hua Xu, Ottawa (CA); Yongkang Jia, Ottawa (CA); Amin Mobasher, Santa Clara (CA)

(73) Assignee: BlackBerry Limited, Waterloo, Ontario (CA)

( * ) Notice: Subject to any disclaimer, the term of this patent is extended or adjusted under 35 U.S.C. 154(b) by 249 days.

(21) Appl. No.: 13/610,396

(22) Filed: Sep. 11, 2012

(65) Prior Publication Data

US 2013/0064215 A1    Mar. 14, 2013

Related U.S. Application Data

(60) Provisional application No. 61/533,470, filed on Sep. 12, 2011, provisional application No. 61/541,514, filed on Sep. 30, 2011, provisional application No. 61/554,582, filed on Nov. 2, 2011, provisional application No. 61/576,558, filed on Dec. 16, 2011, provisional application No. 61/606,839, filed on Mar. 5, 2012, provisional application No. 61/611,968, filed on Mar. 16, 2012, provisional application No. 61/644,089, filed on May 8, 2012.

(51) Int. Cl.
*H04W 72/04* (2009.01)
*H04W 48/12* (2009.01)

(52) U.S. Cl.
CPC .............. *H04W 72/04* (2013.01); *H04W 48/12* (2013.01)
USPC ........................................ 370/329; 370/330

(58) Field of Classification Search
CPC .............................. H04W 72/04; H04W 48/12
USPC ..................................................... 370/329, 330
See application file for complete search history.

(56) References Cited

U.S. PATENT DOCUMENTS

| 8,379,601 | B2 | 2/2013 | Love et al. |
| 2004/0252670 | A1 | 12/2004 | Rong et al. |
| 2008/0089281 | A1 | 4/2008 | Yoon et al. |
| 2008/0232322 | A1 | 9/2008 | Heo et al. |
| 2008/0311873 | A1 | 12/2008 | Kim et al. |
| 2009/0046793 | A1 | 2/2009 | Love et al. |
| 2010/0034312 | A1 | 2/2010 | Muharemovic et al. |
| 2010/0195614 | A1 | 8/2010 | Nimbalker et al. |

(Continued)

FOREIGN PATENT DOCUMENTS

| EP | 2302830 A2 | 3/2011 |
| WO | 2010053984 A2 | 5/2010 |

(Continued)

OTHER PUBLICATIONS

Notice of Allowance dated May 14, 2013; U.S. Appl. No. 13/174,334, filed Jun. 30, 2011; 23 pages.

(Continued)

*Primary Examiner* — Melvin Marcelo
(74) *Attorney, Agent, or Firm* — Conley Rose, P.C.; J. Robert Brown, Jr.

(57) ABSTRACT

A method is provided for communication in a wireless telecommunications network. The method comprises transmitting an extended physical downlink control channel to a user equipment using transmit diversity from at least one demodulation reference signal port.

28 Claims, 47 Drawing Sheets

- eCCE2 is shared by E-PDCCH3 and E-PDCCH5 for MU-MIMO
- eCCE4 and eCCE5 are shared by E-PDCCH4 and E-PDCCH6 for MU-MIMO
- eCCE6 is shared by E-PDCCH4 and E-PDCCH7 for MU-MIMO

(56) References Cited

U.S. PATENT DOCUMENTS

| | | | |
|---|---|---|---|
| 2010/0208673 A1 | 8/2010 | Nam et al. | |
| 2010/0232346 A1 | 9/2010 | Yu et al. | |
| 2011/0019776 A1* | 1/2011 | Zhang et al. | 375/340 |
| 2011/0038303 A1 | 2/2011 | Ji et al. | |
| 2011/0075624 A1 | 3/2011 | Papasakellariou et al. | |
| 2011/0080865 A1 | 4/2011 | Tsai et al. | |
| 2011/0085506 A1 | 4/2011 | Lee et al. | |
| 2011/0116455 A1 | 5/2011 | Damnjanovic et al. | |
| 2011/0170435 A1 | 7/2011 | Kim et al. | |
| 2011/0170496 A1 | 7/2011 | Fong et al. | |
| 2011/0194524 A1 | 8/2011 | Hedlund et al. | |
| 2011/0249633 A1 | 10/2011 | Hong et al. | |
| 2011/0252139 A1 | 10/2011 | Bhattad et al. | |
| 2011/0261767 A1 | 10/2011 | Ji et al. | |
| 2011/0268062 A1 | 11/2011 | Ji et al. | |
| 2011/0274031 A1 | 11/2011 | Gaal et al. | |
| 2011/0274066 A1 | 11/2011 | Tee et al. | |
| 2011/0310829 A1 | 12/2011 | Ji et al. | |
| 2012/0039283 A1 | 2/2012 | Chen et al. | |
| 2012/0300718 A1* | 11/2012 | Ji et al. | 370/329 |
| 2013/0250782 A1* | 9/2013 | Nimbalker et al. | 370/252 |

FOREIGN PATENT DOCUMENTS

| | | |
|---|---|---|
| WO | 2010105098 A1 | 9/2010 |
| WO | 2011011566 A2 | 1/2011 |
| WO | 2011013989 A2 | 2/2011 |
| WO | 2011085189 A1 | 7/2011 |
| WO | 2011085195 A1 | 7/2011 |
| WO | 2011096646 A2 | 8/2011 |

OTHER PUBLICATIONS

3GPP TSG RAN WG1 Meeting #67; "Considerations on the ePDCCH Design"; R1-113655; San Francisco, USA; Nov. 14-18, 2011; 5 pages.
3GPP TSG RAN WG1 Meeting #67; "Mapping Design for E-PDCCH in Rel-11"; R1-114081; San Francisco, USA; Nov. 14-18, 2011; 5 pages.
3GPP TSG RAN WG1 Meeting #68; "Search Space Design for E-PDCCH"; R1-120330; Dresden, Germany; Feb. 6-10, 2012; 6 pages.
3GPP TSG RAN WG1 Meeting #70; "Discussion on PUCCH A/N Resource Mapping for E-PDCCH"; R1-123181; Qingdao, P.R. China; Aug. 13-17, 2012; 6 pages.
3GPP TSG RAN WG1 #66; "Investigation on Downlink Control Channel and Signalling Enhancements"; R1-112049; Athens, Greece; Aug. 22-26, 2011; 4 pages.
3GPP TSG RAN WG1 #60bis; "PDCCH Extension for ICIC and Capacity Gains"; R1-102224; Beijing, China; Apr. 12-16, 2010; 2 pages.
3GPP TSG-RAN WG1 Meeting #68; "Associating of DM-RS for ePDCCHs Within a PRB Pair"; R1-120385; Dresden, Germany; Feb. 6-10, 2012; 5 pages.
3GPP TSG-RAN WG1 #66; "On Downlink Control Singaling Enhancements"; R1-112292; Athens, Greece; Aug. 22-26, 2011; 2 pages.
3GPP TSG RAN WG1 #59; "PDCCH Extension to Support Operation with CI"; R1-094569; Jeju, Korea; Nov. 9-13, 2009; 2 pages.
PCT International Search Report; Application No. PCT/US2012/043683; Jan. 31, 2013; 4 pages.
PCT Written Opinion of the International Searching Authority; Application No. PCT/US2012/043683; Jan. 31, 2013; 6 pages.
PCT International Search Report; Application No. PCT/US2012/043684; Jan. 17, 2013; 3 pages.
PCT Written Opinion of the International Searching Authority; Application No. PCT/US2012/043684; Jan. 17, 2013; 5 pages.
PCT International Search Report; Application No. PCT/US2012/49015; Dec. 17, 2012; 4 pages.
PCT Written Opinion of the International Searching Authority; Application No. PCT/US2012/49015; Dec. 17, 2012; 8 pages.

PCT International Search Report; Application No. PCT/CA2012/050630; Dec. 3, 2012; 3 pages.
PCT Written Opinion of the International Searching Authority; Application No. PCT/CA2012/050630; Dec. 3, 2012; 3 pages.
PCT International Search Report; Application No. PCT/CA2012/050631; Dec. 3, 2012; 4 pages.
PCT Written Opinion of the International Searching Authority; Application No. PCT/CA2012/050631; Dec. 3, 2012; 6 pages.
PCT International Search Report; Application No. PCT/CA2012/050632; Nov. 30, 2012; 4 pages.
PCT Written Opinion of the International Searching Authority; Application No. PCT/CA2012/050632; Nov. 30, 2012; 8 pages.
Office Action dated Mar. 26, 2014; U.S. Appl. No. 13/174,342, filed Jun. 30, 2011; 48 pages.
Office Action dated May 8, 2014; U.S. Appl. No. 13/610,434, filed Sep. 11, 2012; 23 pages.
Taiwan Office Action; Application No. 101133372; Mar. 17, 2014; 10 pages.
Blakenship, Yufei, et al., U.S. Appl. No. 13/174,334, filed Jun. 30, 2011; Title: Transmit Downlink Control Information with Higher Order Modulation.
Blakenship, Yufei, et al., U.S. Appl. No. 13/174,342, filed Jun. 30, 2011; Title: Method and Apparatus for Enhancing Downlink Control Information Transmission.
Blakenship, Yufei, et al., U.S. Appl. No. 13/545,577, filed Jul. 10, 2012; Title: Design on Enchanced Control Channel for wireless System.
Gao, Shiwei, et al., U.S. Appl. No. 13/610,434, filed Sep. 11, 2012; Title: Searching Space and Operating for Enhanced PDCCH in LTE Systems.
Gao, Shiwei, et al., U.S. Appl. No. 13/610,464, filed Sep. 11, 2012; Title DMRS Association and Signaling for Enhanced PDCCH in LTE Systems.
3GPP TS 36.213 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TS 36.211 V9.1.0; 3rd Generation Partnership Project; Technical Specification Group Radio Access Network; Evolved Universal Terrestrial Radio Access (E-UTRA); Physical Channels and Modulation; Release 9; Mar. 2010; 85 pages.
3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.
3GPP TS 36.212 V10.2.0; 3rd Generation Partnership Project; Technical Specification Group Radio Access Network; Evolved Universal Terrestrial Radio Access (E-UTRA); Multiplexing and Channel Coding; Release 10; Jun. 2011; 78 pages.
3GPP TS 36.331 V10.2.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2011; 294 pages.
3GPP TS 36.216 V10.3.0; 3rd Generation Partnership Project; Technical Specification Group Radio Access Network; Evolved Universal Terrestrial Radio Access (E-UTRA); Physical Layer for Relaying Operation; Release 10; Jun. 2011; 16 pages.
3GPP TR 36.819 V0.0.2; 3rd Generation Partnership Project; Technical Specification Group Radio Access Network; Coordinated Multi-Point Operation for LTE Physical Layer Aspects; Release 11; May 2011; 58 pages.
3GPP TSG RAN WG1 Meeting #65; "On Enhanced Downlink Control Signalling for Rel-11;" R1-111743; Barcelona, Spain; May 9-13, 2011; 3 pages.
3GPP TSG RAN1 #50; "PDCCH Channel Estimation Impact (1 vs 2 DRS) on System Performance;" R1-073374; Athens, Greece; Aug. 20-24, 2007; 5 pages.
3GPP TSG-RAN WG1 Meeting #47; "Performance Evaluation of P-BCH;" R1-063529; Riga, Latvia; Nov. 6-10, 2006; 6 pages.
3GPP TSG-RAN WG1 #64; "Aspects on Distributed RRUs with Shared Cell-ID for Heterogeneous Deployments"; R1-110649; Taipei, Taiwan; Feb. 21-25, 2011; 11 pages.

(56) References Cited

OTHER PUBLICATIONS

3GPP TSG RAN WG1 Meeting #65; "DL Control Channel Enhancement for DL MIMO in Rel-11"; R1-111636; Barcelona, Spain; May 9-13, 2011; 6 pages.

3GPP TSG-RAN WG1 #65; "Enhancements for UE Specific Control Signaling"; R1-111332; Barcelona, Spain; May 9-13, 2011; 3 pages.
Office Action dated Jun. 19, 2014; U.S. Appl. No. 13/545,577, filed Jul. 10, 2012; 23 pages.

* cited by examiner

- eCCE2 is shared by E-PDCCH3 and E-PDCCH5 for MU-MIMO
- eCCE4 and eCCE5 are shared by E-PDCCH4 and E-PDCCH6 for MU-MIMO
- eCCE6 is shared by E-PDCCH4 and E-PDCCH7 for MU-MIMO

- eCCE3 is shared by E-PDCCH3 and E-PDCCH5 for MU-MIMO
- eCCE5 is shared by E-PDCCH4 and E-PDCCH6 for MU-MIMO
- eCCE6 and eCCE7 are shared by E-PDCCH4 and E-PDCCH7 for MU-MIMO

- eCCE2 is shared by E-PDCCH3 and E-PDCCH5 for MU-MIMO
- eCCE4 and eCCE5 are shared by E-PDCCH4 and E-PDCCH6 for MU-MIMO
- eCCE6 is shared by E-PDCCH4 and E-PDCCH7 for MU-MIMO

Figure 61

ENHANCED PDCCH WITH TRANSMIT DIVERSITY IN LTE SYSTEMS

CROSS-REFERENCE TO RELATED APPLICATIONS

The present application claims priority to U.S. Provisional Application Nos. 61/533,470 filed Sep. 12, 2011; 61/541,514 filed Sep. 30, 2011; 61/554,582 filed Nov. 2, 2011; 61/576,558 filed Dec. 16, 2011; 61/606,839 filed Mar. 5, 2012; 61/611,968 filed Mar. 16, 2012, and 61/644,089 filed May 8, 2012 by Shiwei Gao, et al., entitled "Enhanced PDCCH with Transmit Diversity in LTE Systems", which are incorporated herein by reference as if reproduced in their entirety.

FIELD OF THE DISCLOSURE

The present disclosure relates to a physical downlink control channel in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or an access point.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 61 illustrates DMRS port allocation at different aggregation levels according to one embodiment.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

In an LTE system, a physical downlink control channel (PDCCH) is used to carry downlink control information (DCI) from an eNB to one or more UEs. DCI may contain a downlink (DL) data assignment or an uplink (UL) data grant for a UE. By decoding PDCCHs in a subframe, a UE knows whether there is a DL data transmission scheduled to itself in the current DL subframe or a UL resource assignment for itself in a future UL subframe.

Figure 1:
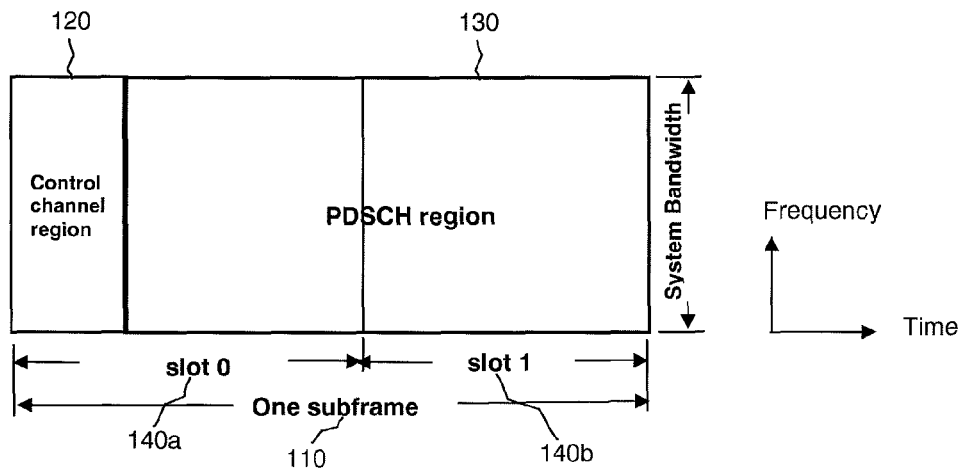
FIG. 1 is a diagram of a downlink LTE subframe, according to the prior art.

FIG. 1 illustrates a typical DL LTE subframe 110. Control information transmitted in a control channel region 120 and may include a PCFICH (physical control format indicator channel), PHICH (physical HARQ (hybrid automatic repeat request) indicator channel), and PDCCH. The control channel region 120 includes the first few OFDM (orthogonal frequency division multiplexing) symbols in the subframe 110. The exact number of OFDM symbols for the control channel region 120 is either dynamically indicated by PCFICH, which is transmitted in the first symbol, or semi-statically configured in the case of carrier aggregation in LTE Rel-10.

A physical downlink shared channel (PDSCH), PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130.

The PDSCH is used in LTE to transmit DL data to a UE. The PDCCH and the PDSCH are transmitted in different time-frequency resources in a LTE subframe as shown in FIG. 1. Different PDCCHs can be multiplexed in the PDCCH region 120, while different PDSCHs can be multiplexed in the PDSCH region 130.

In a frequency division duplex system, a radio frame includes ten subframes of one millisecond each. A subframe 110 includes two slots in time and a number of resource blocks (RBs) in frequency as shown in FIG. 1. The number of RBs is determined by the system bandwidth. For example, the number of RBs is 50 for a 10 megahertz system bandwidth.

An OFDM symbol in time and a subcarrier in frequency together define a resource element (RE). A physical RB can be defined as, for example, 12 consecutive subcarriers in the frequency domain and all the OFDM symbols in a slot in the time domain. An RB pair with the same RB index in slot 0 (140a) and slot 1 (140b) in a subframe can be allocated together to the same UE for its PDSCH.

Figure 2:
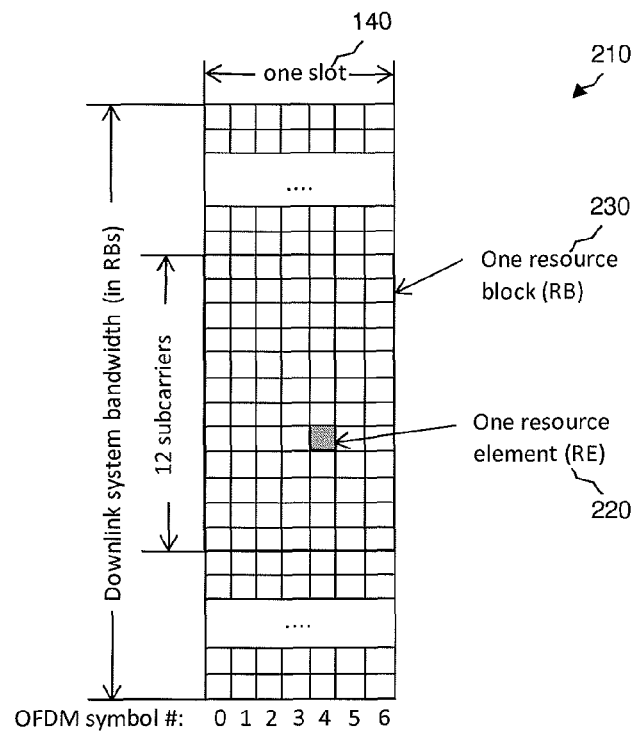
FIG. 2 is a diagram of an LTE downlink resource grid in the case of a normal cyclic prefix, according to the prior art.

In LTE, multiple transmit antennas are supported at the eNB for DL transmissions. Each antenna port can have a resource grid as shown in FIG. 2. Each DL slot includes seven OFDM symbols in the case of a normal cyclic prefix configuration and six OFDM symbols in the case of an extended cyclic prefix configuration. To simplify the following discussion, subframes with the normal cyclic prefix configuration will be considered hereinafter, but it should be understood that similar concepts are applicable to subframes with an extended cyclic prefix.

FIG. 2 shows an LTE DL resource grid 210 within each slot 140 in the case of a normal cyclic prefix configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

In LTE, the set of antenna ports supported for DL transmission depends on the reference signal configuration. Cell specific reference signals (CRSs) support a configuration of one, two or four antenna ports and are transmitted on antenna ports p=0, p∈{0,1}, and p∈{0, 1, 2, 3} respectively. CRS signals are transmitted in all subframes and can be used for channel measurement and PDSCH demodulation.

UE-specific reference signals, which can also be referred to as demodulation reference signals (DMRS), are used for PDSCH demodulation and are transmitted on antenna ports p=7, p=8, or one or several of p∈{7, 8, 9, 10, 11, 12, 13, 14}. DMRSs are transmitted only in the RBs upon which the corresponding PDSCH for a particular UE is mapped.

Channel state information reference signals (CSI-RS) can be configured as one, two, four or eight ports and are transmitted on antenna ports p=15, p=15,16, p=15, ..., 18 and p=15, ..., 22, respectively. CSI-RSs can be transmitted only in certain subframes.

Figure 3:
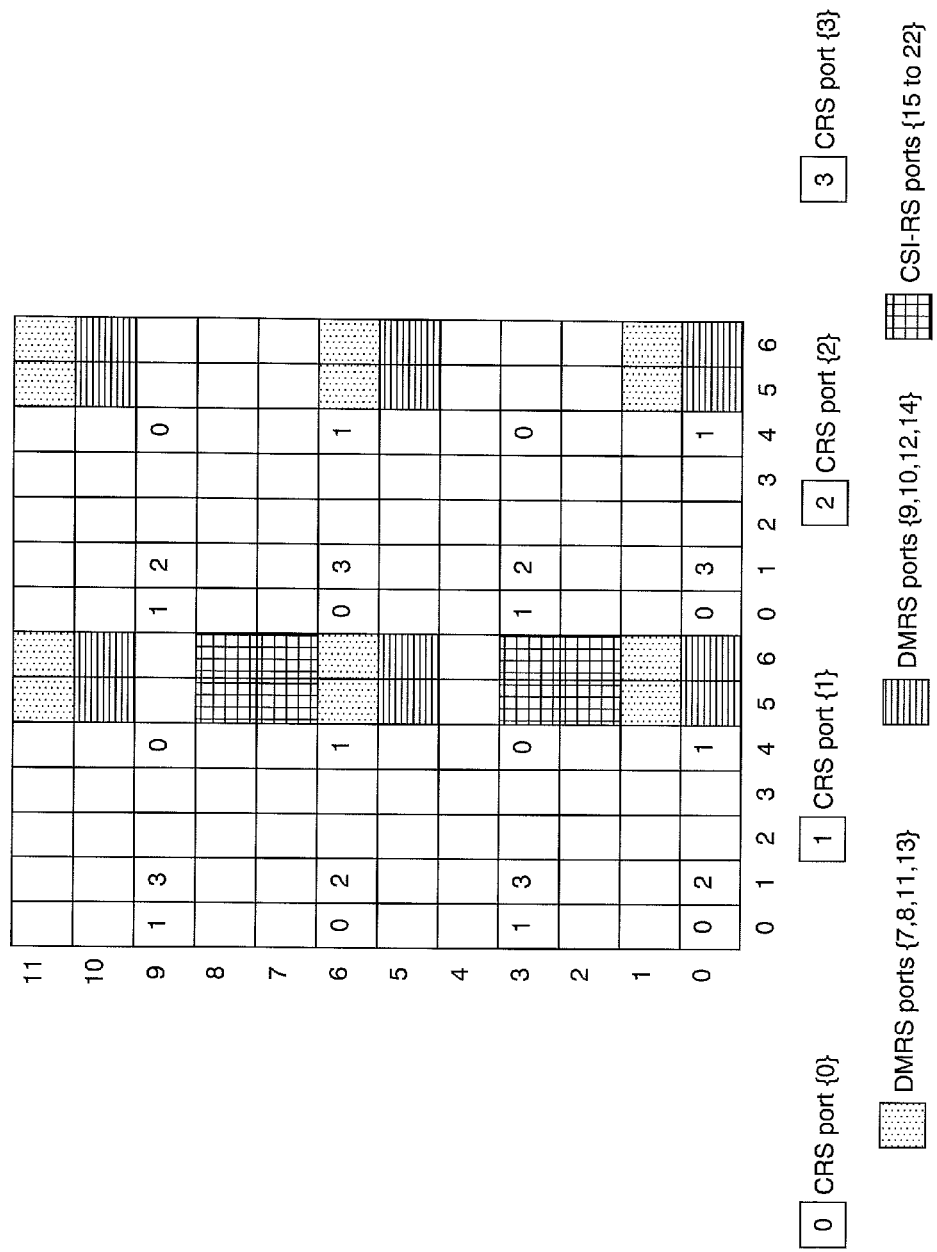
FIG. 3 is a diagram of CRS, DMRS and CSI-RS ports in an LTE subframe for a normal cyclic prefix, according to the prior art.

An example of mapping CRS and DMRS to REs in a subframe is shown in FIG. 3. It should be noted that DMRS ports {7, 8, 11, 13} are multiplexed on the same group of REs with different orthogonal codes. The same is true for DMRS ports {9, 10, 12, 14}. The orthogonal codes are applied in the time direction and are shown in Table 1 below.

TABLE 1

Orthogonal codes assigned to DMRS ports for normal cyclic prefix in LTE

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Figure 4:
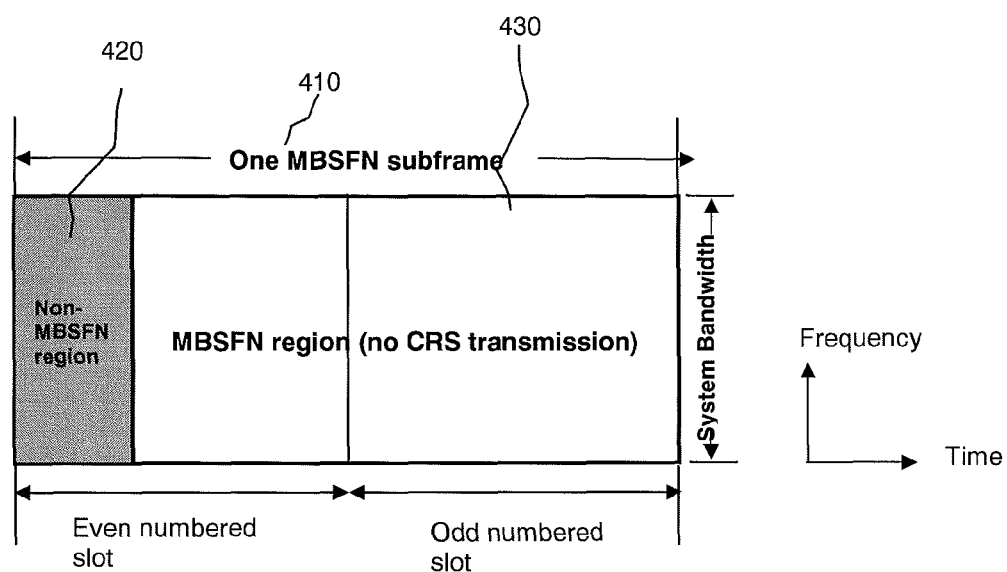
FIG. 4 is a diagram of an MBSFN subframe, according to the prior art.

A subset of the LTE DL subframes in a radio frame supporting PDSCH transmission can be configured as Multimedia Broadcasting and multicasting Single Frequency Network (MBSFN) subframes, as shown in FIG. 4. An MBSFN subframe 410 includes two regions, a non-MBSFN region 420, which spans the first one or two OFDM symbols, and an MBSFN region 430 for the rest of the OFDM symbols. The non-MBSFN region 420 is used for transmitting control information. The MBSFN region 430 can be used for transmitting a multimedia broadcasting signal. In LTE Rel-10, the MBSFN region 430 can also be configured to transmit a PDSCH with a DMRS as the demodulation reference signal. There is no CRS transmission in the MBSFN region 430.

The PDCCH region 120 shown in FIG. 1 may consist of up to three symbols for a system bandwidth greater than 10 RBs and up to four symbols for a system bandwidth less than or equal to 10 RBs. In some cases, such as a secondary radio frequency carrier, a PDCCH region may not be present in a subframe. The REs of each OFDM symbol in the PDCCH region 120 are grouped into resource element groups (REGs). An REG includes four neighbor REs not allocated for CRS transmission. A PDCCH is transmitted on an aggregation of one or several consecutive indexed control channel elements (CCEs), where a CCE includes nine REGs. Up to eight CCEs may be allocated to a PDCCH.

For a PDCCH region that spans 10 MHz bandwidth and three OFDM symbols, the available CCEs in the case of four CRS ports are in the range of 34 to 39 depending on the number of hybrid automatic repeat request (HARQ) groups configured. Assuming an equal resource partition between UL grants and DL assignments, about 17 to 20 CCEs are available for each link. So the average number of UEs that can be scheduled in a subframe could be less than ten.

Figure 5:
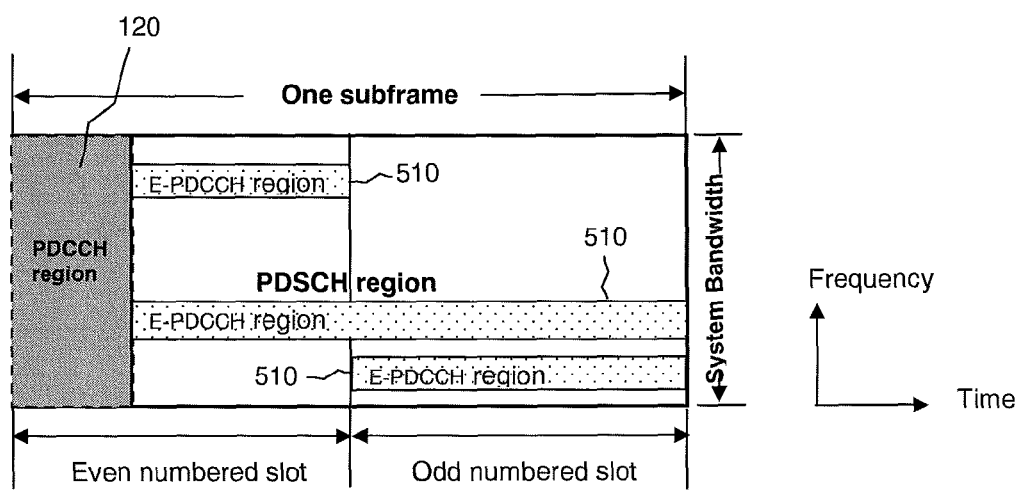
FIG. 5 is a diagram of an example of an E-PDCCH region, according to an embodiment of the disclosure.

With the introduction of Multi-User Multiple Input and Multiple Output (MU-MIMO) and future support of Machine-to-Machine (M2M) communication, the current PDCCH capacity may not be enough to support a large number of UEs in a cell. One approach for PDCCH capacity enhancement is to transmit DCI in the legacy PDSCH region. Similar to the situation with the R-PDCCH (Relay Physical Downlink Control Channel) in which a number of RBs are reserved in the PDSCH region for transmitting DCIs from an eNB to relay nodes (RNs), some RBs in the traditional PDSCH region can be reserved for DCI transmission to the UE. Hereinafter, a physical downlink control channel transmitted in the PDSCH region will be referred to as an enhanced or extended PDCCH (E-PDCCH). The set of RBs and OFDM symbols reserved for this purpose can be referred as the E-PDCCH region. One example is shown in FIG. 5. The time and frequency resources of an E-PDCCH region 510 may be configurable. In addition, the PDCCH region 120 in a subframe may not be present in a subframe containing the E-PDCCH region.

Figure 6:
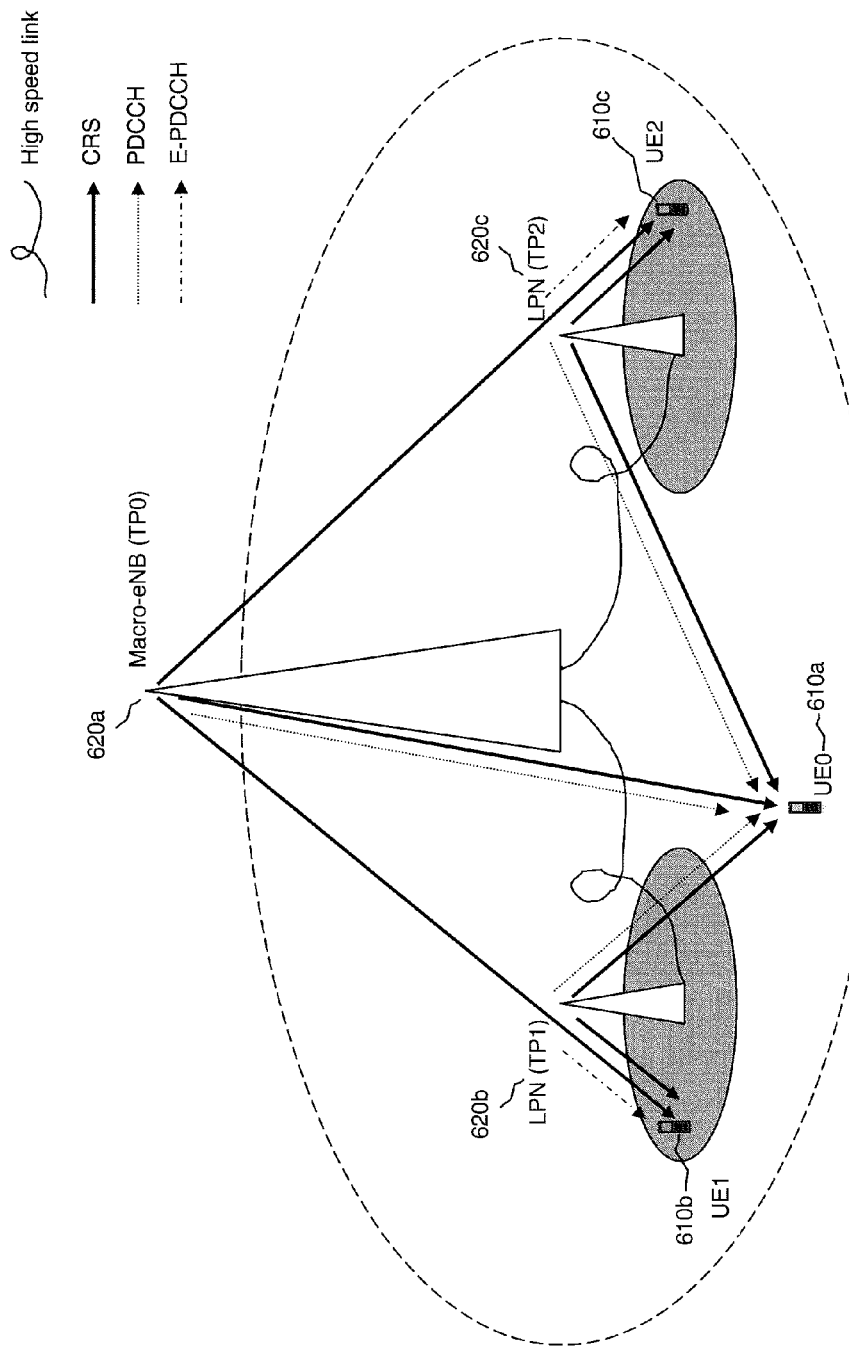
FIG. 6 is a diagram of an example of a cell with a macro-eNB and multiple low power node (LPNs) sharing the same cell ID, according to the prior art.

One of the wireless network deployment scenarios under study for LTE Rel-11 for system performance improvement through coordinated scheduling is the deployment in a cell covered by a macro-eNB of multiple low power nodes (LPNs) that share the same cell ID with the macro-eNB. The LPNs might be relay nodes, remote radio heads, or similar components. This scenario is also referred as Coordinated Multi-Point (CoMP) Scenario 4 in some contexts. An example is shown in FIG. 6. In this scenario, it may be more efficient to transmit downlink data to a UE 610 from a transmission point 620 or transmission points that provides the best signal quality to the UE 610. The term "transmission point" (TP) may be used herein to refer to either an LPN or a macro-eNB. As the LPNs 620b and 620c have the same cell ID as the macro-eNB 620a, only one set of CRSs might be configured. The CRSs could be transmitted either from the macro-eNB 620a only or from both the macro-eNB 620a and the LPNs 620b and 620c. Because CRSs are required for legacy PDCCH demodulation, the PDCCH has to be transmitted over the same antenna ports as the CRS. As a result, the PDCCH can be transmitted either from the macro-eNB 620a only or from both the macro-eNB 620a and the LPNs 620b and 620c. To support DCI transmission only from LPNs 620b and 620c, an E-PDCCH could be used instead, with DMRSs as the reference signals for demodulation.

In a scenario where an E-PDCCH is transmitted in the MBSFN subframes, the CRS is not available, and thus DMRSs may need to be used for E-PDCCH demodulation.

Figure 7:
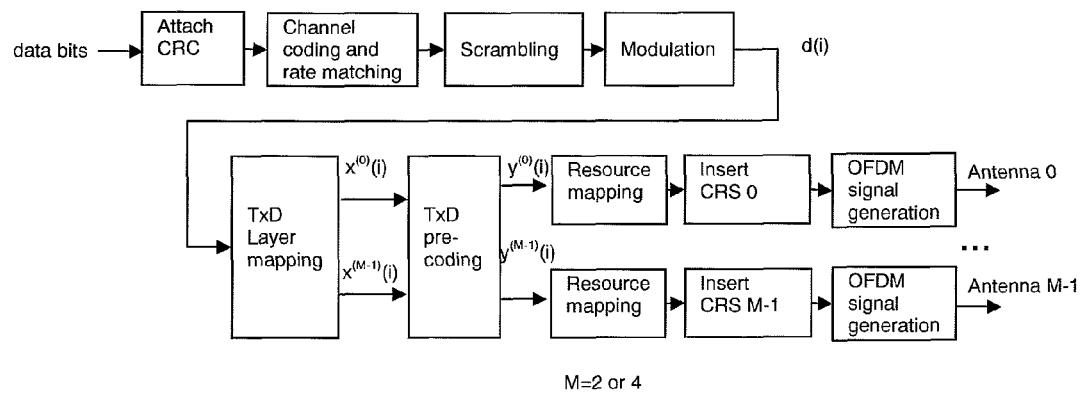
FIG. 7 is a block diagram of transmit diversity supported in an LTE system, according to the prior art.

A conceptual block diagram of data transmission with transmit diversity in LTE systems is shown in FIG. 7. Let $\{d(0), d(1), \ldots, d(M_{symb}-1)\}$ be the symbols after modulation for transmission. The symbols are first mapped to layers. For two-port transmit diversity, the following mapping can be performed:

$$x^{(0)}(i)=d(2i)$$

$$x^{(1)}(i)=d(2i+1)$$

where $i=0, 1, \ldots, M_{symb}^{layer}-1$; $M_{symb}^{layer}=M_{symb}$.

Precoding for transmit diversity can be combined with the above layer mapping. The precoding for transmit diversity can be defined for two and four antenna ports.

For transmission on two antenna ports $\{0,1\}$, the output $y(i)=[y^{(0)}(i)\ y^{(1)}(i)]_T$, $i=0, 1, \ldots, M_{symb}^{ap}-1$ of the precoding operation can be defined by:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix}$$

for $i=0, 1, \ldots, M_{symb}^{layer}-1$ with $M_{symb}^{ap}=2M_{symb}^{layer}$, where Re( ) and Im( ) indicate the real and imaginary part, respectively.

For four-port transmit diversity on antenna ports $\{0, 1, 2, 3\}$, the following layer mapping can be performed:

$$x^{(0)}(i)d(4i)$$

$$x^{(1)}(i) = d(4i+1);$$

$$x^{(2)}(i) = d(4i+2);$$

$$x^{(3)}(i)d(4i+3); i = 0, 1, \ldots, M_{symb}^{layer} - 1;$$

$$M_{symb}^{layer} = \begin{cases} M_{symb}/4 & \text{if } M_{symb} \bmod 4 = 0 \\ (M_{symb}+2)/4 & \text{if } M_{symb} \bmod 4 = 0 \end{cases}$$

The output $y(i)=[y^{(0)}(i)\ y^{(1)}(i)\ y^{(2)}(i)\ y^{(3)}(i)]^T$, $i=0, 1, \ldots, M_{symb}^{ap}-1$ of the precoding operation can be defined by:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(x^{(0)}(i)) \\ \text{Re}(x^{(1)}(i)) \\ \text{Re}(x^{(2)}(i)) \\ \text{Re}(x^{(3)}(i)) \\ \text{Im}(x^{(0)}(i)) \\ \text{Im}(x^{(1)}(i)) \\ \text{Im}(x^{(2)}(i)) \\ \text{Im}(x^{(3)}(i)) \end{bmatrix}$$

for $i = 0, 1, \ldots, M_{symb}^{layer}$ with $$M_{symb}^{ap} = \begin{cases} 4M_{symb}^{layer} & \text{if } M_{symb}^{(0)} \bmod 4 = 0 \\ (4M_{symb}^{layer})-2 & \text{if } M_{symb}^{(0)} \bmod 4 \neq 0. \end{cases}$$

For maintaining orthogonality between the symbols, thus achieving maximum diversity gain and allowing simple decoding, the symbol pair $\{y^{(p)}(2i), y^{(p)}(2i+1)\}$ (i=0, 1, ..., $M_{symb}^{layer}-1$; p=0, 1, 2, 3) may need to be transmitted over the same wireless channel. For this purpose, $\{y^{(p)}(2i), y^{(p)}(2i+1)\}$ could be mapped to two REs in close proximity in either time or frequency. In LTE, each symbol pair is mapped to consecutive REs in the same OFDM symbol.

In LTE Rel-8, DL transmit diversity only uses CRSs as the reference signal for demodulation. When DMRSs are used as demodulation reference signals, transmit diversity is not supported. For PDCCH transmission, CRSs are used as demodulation reference signals. Therefore, transmit diversity is used for PDCCH transmission if more than one CRS port is present. For E-PDCCH transmission, as DMRSs are likely configured as the demodulation reference signals due to reasons such as E-PDCCH transmission in MBSFN subframes or in the CoMP scenario as shown in FIG. 6, the E-PDCCH transmission scheme is therefore left to either single antenna port or beamforming transmission.

Beamforming transmission requires DL channel state information (CSI) including precoding information, which is not always available at an eNB. For example, under certain PDSCH transmission modes in LTE, such as transmission modes 2 and 3, a UE does not feed back precoding information to the eNB. In addition, even if precoding information is reported by a UE, it may not always be reliable under a fast fading channel with a high mobility UE. In the situation that UE feeds back only wideband precoding information, it may not be good enough to form a narrow beam.

Unlike in the PDSCH case where, with the support of HARQ, retransmission can be performed by an eNB in the case of a PDSCH decoding failure at a UE, any E-PDCCH decoding failure could lead to the loss of a DL and/or UL packet because retransmission is not possible for an E-PDCCH (as is also the case for the legacy PDCCH). So it may be desirable to have more robust E-PDCCH transmissions under even the worst case channel conditions and UE mobility. Implementations of the present disclosure can address questions that may arise regarding how to support E-PDCCH with transmit diversity (TxD) for robust E-PDCCH detection performance using DMRS as the demodulation reference signals.

The concept of an E-PDCCH has been discussed in a number of publications. However, in all these discussions, E-PDCCH transmission is limited to one of the following transmission schemes: a single-port transmission with CRS as the demodulation reference signal; a single-port transmission with DMRS as the demodulation reference signal (this scheme supports beamforming-based E-PDCCH transmission); transmit diversity using SFBC (space frequency block coding) with CRS as the demodulation reference signal; or Single User MIMO (SU-MIMO) or MU-MIMO with DMRS as the demodulation reference signal. In the SU-MIMO case, multiple data layers can be transmitted to a single user over the same resource for increased data throughput with multiple transmission antennas at the eNB and multiple reception antennas at the UE. In the case of MU-MIMO, multiple E-PDCCHs, one to each UE, can be transmitted over the same resource.

However, transmit diversity for E-PDCCH transmission with DMRS as the demodulation reference signal has not been discussed. Robust E-PDCCH transmission with transmit diversity using DMRS may be needed for improved E-PDCCH detection performance in scenarios where CRSs are either not available or cannot be used for E-PDCCH demodulation. Examples of such scenarios include an E-PDCCH being transmitted over an LPN located in a macro-cell coverage area and sharing the same cell ID as the macro-cell, or an E-PDCCH being transmitted in the MBSFN region in an MBSFN subframe.

In an implementation, transmit diversity is used for E-PDCCH transmission with LTE Rel-10 DMRSs as demodulation reference signals. Such implementations allow for more robust E-PDCCH transmission to a UE from a nearby TP or TPs in a CoMP deployment scenario where LPNs share the same cell ID as the macro-eNB. Terms such as "near" a TP or "a nearby TP" or "close to" a TP are used herein to indicate that a UE would have a better DL signal strength or quality if the DL signal is transmitted to that UE from that TP rather than from a different TP. Such implementations would also allow for more robust E-PDCCH transmission to a UE in MBSFN subframes where CRSs are not available in the MBSFN region. The UE could use the received DMRS signals for channel estimation and E-PDCCH demodulation.

Two resource mapping methods, one based on space frequency block code (SFBC) and the other based on hybrid SFBC and space time block code (STBC), are also provided for mapping of transmit diversity precoded signals to resource elements.

Although the Rel-10 DMRS is discussed hereinafter, it should be understood that the implementations described herein are not limited only to the Rel-10 DMRS. For example, a new DMRS could be defined for the same purpose.

An E-PDCCH could also be transmitted using beamforming, where both the E-PDCCH and DMRS are precoded with the same precoding vectors.

In an implementation, the configuration of E-PDCCH transmission schemes for a UE can be implicitly signaled through demodulation reference signal configuration for the UE. For example, if multiple DMRS ports are configured for E-PDCCH transmission to a UE, transmit diversity could be assumed by the UE for E-PDCCH transmission. The UE could use the received DMRS signals for channel estimation and E-PDCCH demodulation. This concept is applicable to an E-PDCCH with or without cross-interleaving. If a single DMRS port is configured for a UE, a single port E-PDCCH transmission with the configured DMRS could be used by the UE. Beamforming, which is transparent to the UE, could be achieved by applying precoding to both the DMRS and E-PDCCH.

Alternatively, the configuration of E-PDCCH transmission schemes could be explicitly signaled to a UE.

The same DMRS sequence and resources defined in LTE Rel-10 could be reused for the E-PDCCH. However, in the case of E-PDCCH with cross-interleaving, the same DMRS ports could be shared by different UEs for E-PDCCH demodulation. In this case, DMRS ports could be viewed as TP-specific RS ports and precoding might not be applied on the DMRS.

The transmit diversity method could also be used for PDSCH transmission in MBSFN subframes with DMRS.

More specifically, a method for E-PDCCH transmission with transmit diversity (TxD) using UE-specific reference signal (RS) or demodulation RS (DMRS) ports for demodulation is provided for LTE systems. E-PDCCH transmission with transmit diversity could enable robust E-PDCCH transmissions to a UE from a nearby TP in a cell where multiple LPNs are deployed that share the same cell ID as the macro-eNB. Such robust E-PDCCH transmissions could also be provided in an MBSFN subframe where CRSs are not available. In addition, robust E-PDCCH transmissions could be made from multiple TPs with increased transmit diversity, and thus improved robustness of E-PDCCH decoding could be achieved.

Figure 8:
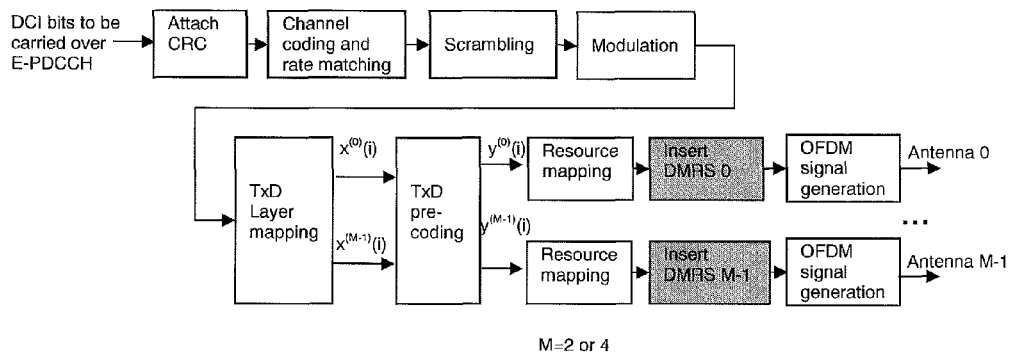
FIG. 8 is a diagram of an example of using transmit diversity with DMRS ports for demodulation, according to an embodiment of the disclosure.

An implementation of one such E-PDCCH transmission scheme is illustrated in FIG. 8, where DMRSs are used together with existing LTE Rel-8 TxD layer mapping and precoding for E-PDCCH transmission. In this example, there is a one-to-one mapping between DMRS ports and physical antenna ports.

Figure 9:
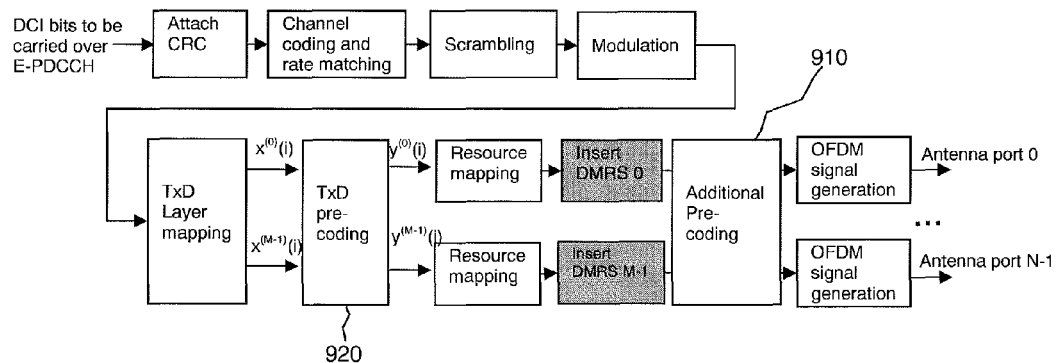
FIG. 9 is a diagram of another example of transmit diversity over DMRS ports, according to an embodiment of the disclosure.

Alternatively, DMRS may be precoded at the eNB as shown in FIG. 9, where there is no one-to-one mapping between the DMRS ports and the physical antennas. The number of physical antennas can be larger than the number of DMRS ports. The precoding is transparent to a UE. That is, the UE does not need to know whether or not precoding is applied or what precoding vector is applied. Precoding may provide additional benefits when there are more physical antennas than two or four DMRS ports. For example, if there are eight antennas and TxD with two or four DMRS ports is used, then precoding may be applied to provide additional beamforming gain if DL channel state information is available for a UE at the eNB.

It should be noted that the additional precoding 910 applied in FIG. 9 after TxD precoding 920 could be an eNB implementation issue. Namely, whether to apply the precoding and which precoding vector to choose could be a decision made by the eNB. This operation of additional precoding is also transparent to the UE. In this sense, the examples shown in FIG. 8 and FIG. 9 are the same from a UE's perspective.

A UE can be configured with either CRS or DMRS as the demodulation reference signals for its E-PDCCH demodulation. When CRS is configured for E-PDCCH demodulation, the number of CRS ports is indicated in the Physical Broadcast Channel (PBCH) and thus no additional signaling is needed for the CRS ports. If DMRS is configured for E-PDCCH demodulation, the DMRS ports may need to be signaled to the UE through UE-specific higher layer signaling.

The following Rel-10 DMRS ports may be configured for E-PDCCH to a UE: a single DMRS port, i.e., port {7}, {8}, . . . , {14}; two DMRS ports, i.e., any two of the DMRS ports {7, 8, 9, 10, 11, 12, 13, 14}; or four DMRS ports, i.e., ports {7, 8, 11, 13}, {9, 10, 12, 14}, {7, 8, 9, 10}, {11, 12, 13, 14}, {7, 8, 12, 14}, or {9, 10, 11, 13}.

When the Rel-10 DMRSs are reused for E-PDCCH demodulation, proper pairing of DMRS ports may be needed. For example, in the case of two-port TxD, any pair of DMRS ports {7,8}, {9,10}, {11,13}, or {12,14} may be used to save DMRS overhead, because the DMRS ports in each pair share the same time-frequency resource. In addition, high mobility UEs can be supported because the DMRS signals in each pair are orthogonal to each other over two adjacent OFDM symbols. Further, due to the orthogonal covering code used for each pair of ports, two separate channel estimations could be derived, one for each slot. Therefore, good channel estimation can be done as the channels do not change significantly over two adjacent OFDM symbols, even for high mobility UEs. For very high speed scenarios, it is possible to choose one DMRS port from {7, 8, 11, 13} and one from {9, 10, 12, 14} to improve channel estimation at the cost of additional DMRS overhead, as these two ports of DMRS occupy different resources and therefore will not cause interference with each other in the situation of a UE with very high mobility.

In the case of four-port TxD, DMRS ports {7, 8, 11, 13} or {9, 10, 12, 14} may be used. With these two groups of DMRS ports, the same DMRS resource is used on all the antenna ports in each group. A drawback is that this grouping may not be good for high mobility UEs because the DMRS signals of those ports are orthogonal only if the channels do not change significantly over a subframe. Otherwise, the orthogonality may not hold and large channel estimation errors may occur.

An alternative option is to use DMRS ports {7, 8, 9, 10} or {11, 12, 13, 14} instead, in which different frequency resources are used for ports {7,8} and {9,10} and similarly for ports {11,13} and {12,14}. This option could provide better channel estimation even in the high mobility case because orthogonality can be maintained as long as the channels do not change between two adjacent OFDM symbols. This condition can be satisfied even at high mobility. A drawback is that more overhead may be needed for the DMRS.

Figure 10:
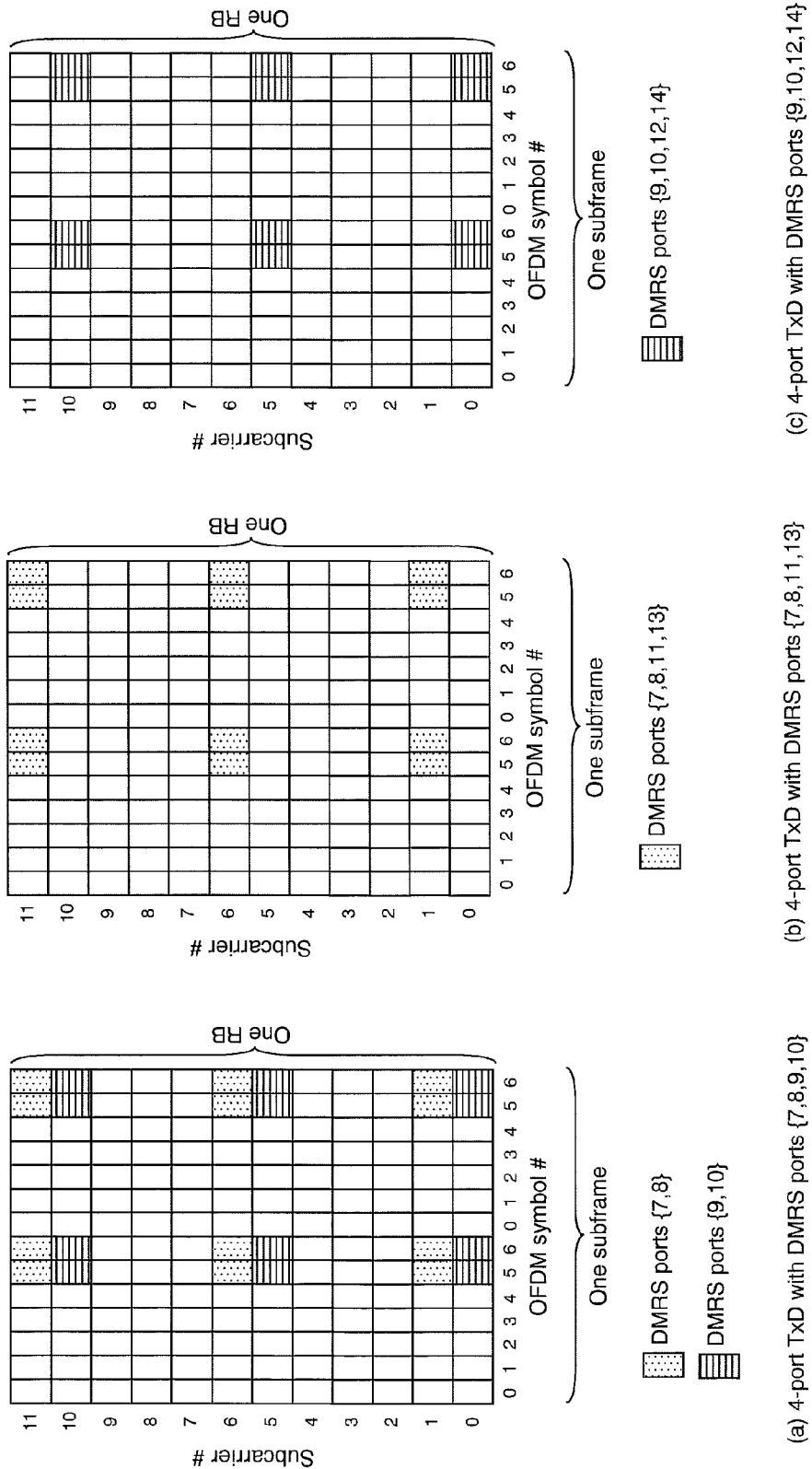
FIGS. 10a, 10b, and 10c are diagrams of examples of four-port transmit diversity with different DMRS ports, according to an embodiment of the disclosure.

FIG. 10 shows some examples of different DMRS port groupings for four-port TxD. FIG. 10(a) shows a DMRS port configuration that can provide good performance for both low and high mobility UEs, but more RS resource overhead may be required in this configuration. FIG. 10(b) and FIG. 10(c) use fewer resources for DMRS and may provide good performance for low mobility UEs.

Figure 11:
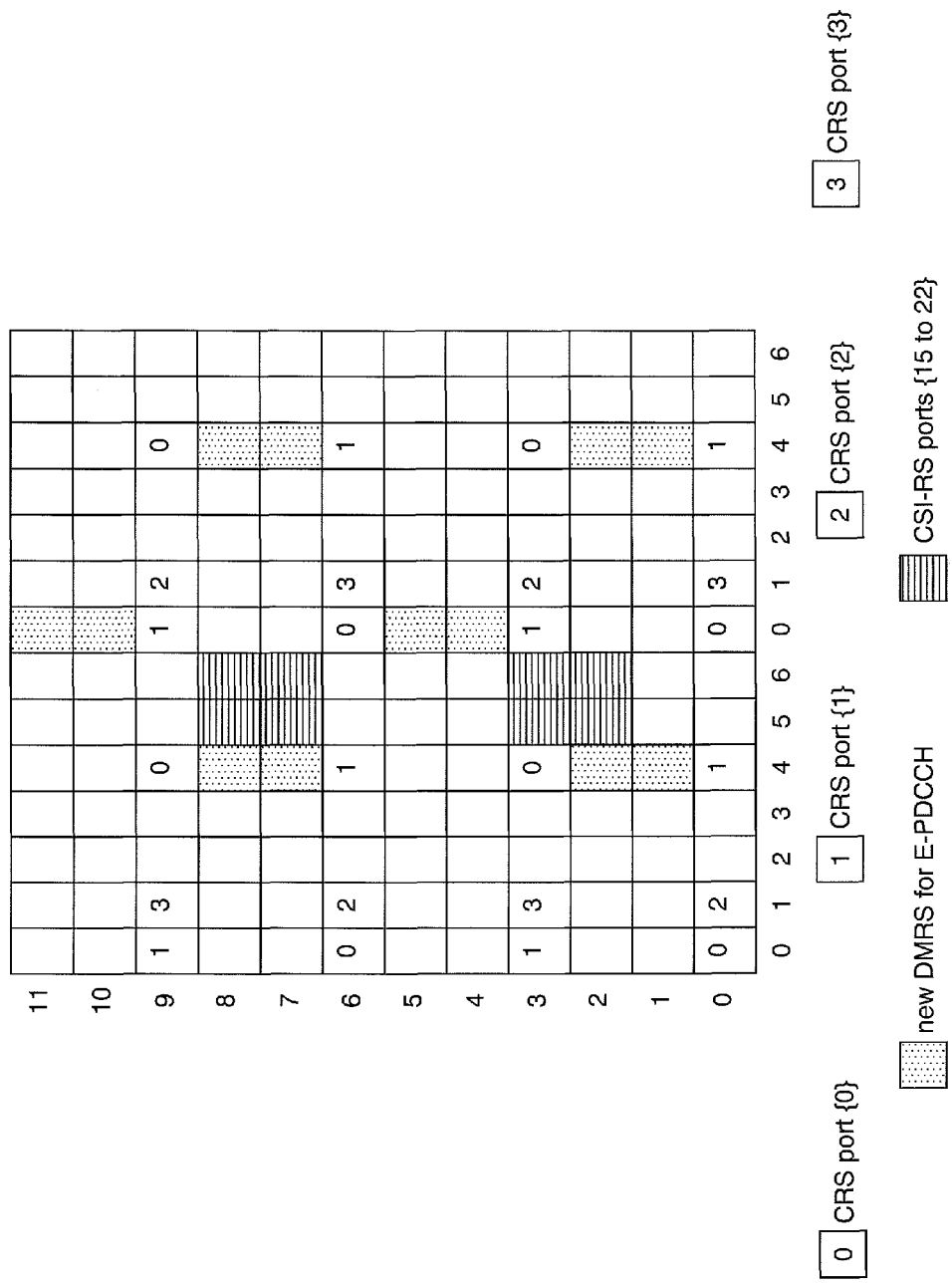
FIG. 11 is a diagram of an example of a new DMRS for E-PDCCH, according to an embodiment of the disclosure.

The TxD schemes provided herein may be applied to an E-PDCCH with DMRSs that are different from the ones defined in LTE Rel-10. In fact, new DMRSs may be introduced for the E-PDCCH. Such an example is shown in FIG. 11, where two DMRS ports could be code division multiplexed (CDM) over the allocated DMRS resources along the subcarrier indices. It should be noted that such a DMRS might be used for TxD demodulation of an E-PDCCH for a particular UE or a group of UEs. Therefore, unlike the CRS, the DMRS might be transmitted only in assigned RBs for E-PDCCH transmission for a particular UE or a group of UEs.

Figure 12:
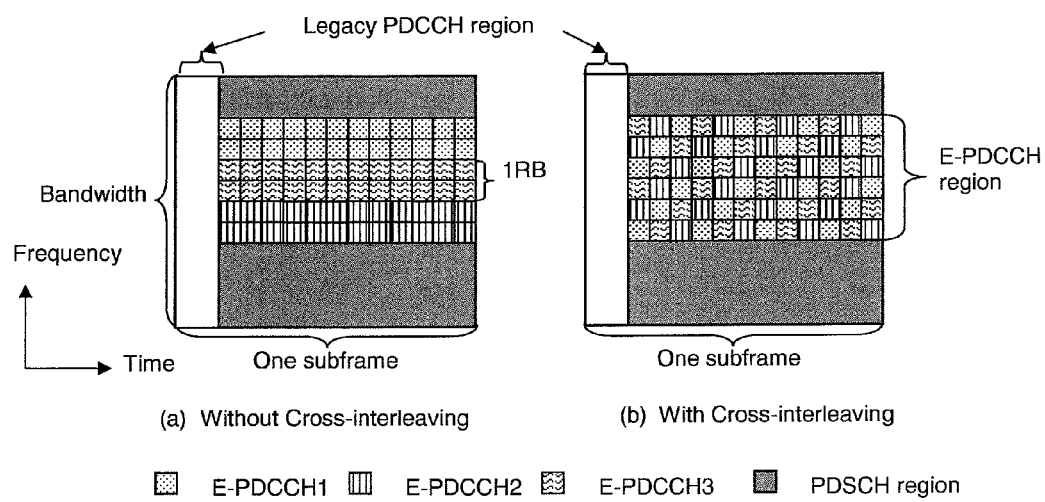
FIGS. 12a and 12b are diagrams of examples of E-PDCCH with and without cross-interleaving, according to an embodiment of the disclosure.

In some implementations, a set of $N_{RB}^{E-PDCCH}$ RBs could be configured for potential E-PDCCH transmission by Radio Resource Control (RRC) signaling. The configured RBs may or may not be adjacent in frequency. The location of a configured RB in the two slots of an LTE subframe may or may not be the same. These RBs are referred to as virtual RBs (VRBs) and the mapping from VRBs to physical RBs (PRBs) in a subframe may be semi-statically configured by RRC. The configured VRBs may be continuously numbered $n_{VRB}^{E-PDCCH}=0, 1, \ldots, N_{RB}^{E-PDCCH}-1$ such that the smallest VRB number of $n_{VRB}$ corresponds to $n_{VRB}^{E-PDCCH}=0$ and the largest VRB number of $n_{VRB}$ corresponds to $n_{VRB}^{E-PDCCH}=N_{RB}^{E-PDCCH}-1$. In some implementations, an E-PDCCH may be transmitted on one or several VRBs without being cross-interleaved with other E-PDCCHs. Alternatively, multiple E-PDCCHs may be cross-interleaved in one or several VRBs. A conceptual diagram is shown in FIG. 12, where VRB=PRB. E-PDCCH without cross-interleaving is shown in FIG. 12(a) and E-PDCCH with cross-interleaving is shown in FIG. 12(b).

Without cross-interleaving, an E-PDCCH can be transmitted on an aggregation of one or several VRBs. For the E-PDCCH example without cross-interleaving shown in FIG. 12(a), one PRB or a number of PRBs in the region are allocated to each E-PDCCH.

In the case of E-PDCCH with cross-interleaving, as shown in FIG. 12(b), an RB in the E-PDCCH region can be used by multiple E-PDCCHs in different symbols across a subframe. With cross-interleaving, E-PDCCHs can be multiplexed in a manner similar to that used for the PDCCH in the legacy LTE systems, with the following exceptions: for the purpose of REG-to-RE mapping, the downlink system bandwidth can be determined as $N_{RB}^{E-PDCCH}$; a DMRS may be present in a PRB with or without a CRS and may be used for E-PDCCH demodulation; and the REs used for DMRS transmission can be assumed to be unavailable for E-PDCCH traffic transmission.

The possible E-PDCCH transmission schemes that a UE can assume under different E-PDCCH configurations are summarized in Table 2 below. The E-PDCCH transmission scheme for a UE could be semi-statically configured through demodulation RS configuration.

TABLE 2

Relationship between E-PDCCH transmission scheme and E-PDCCH demodulation reference signal configuration

| E-PDCCH demodulation RS configuration | E-PDCCH transmission scheme |
|---|---|
| Single DMRS port | Single antenna port transmission |
| Two or four DMRS ports | TxD |
| CRS port {0} | Single antenna port transmission |
| CRS port {0,1} or {0,1,2,3} | TxD |

When a UE is configured with a single CRS or DMRS port for E-PDCCH demodulation, a single port transmission could be assumed by the UE. When a UE is configured with two or four CRS or DMRS ports, TxD could be assumed by the UE for its E-PDCCH demodulation. The relation between the number of CRS and DMRS ports and the transmission scheme could be used to save additional signaling for E-PDCCH transmission scheme configuration.

Alternatively, when more than one DMRS port is configured for E-PDCCHs, the use of either TxD or MIMO for the E-PDCCHs could be explicitly signaled. For example, a TxD scheme or a multiple layer spatial multiplexing or beamforming scheme could be configured when multiple DMRS ports are configured.

Figure 13:
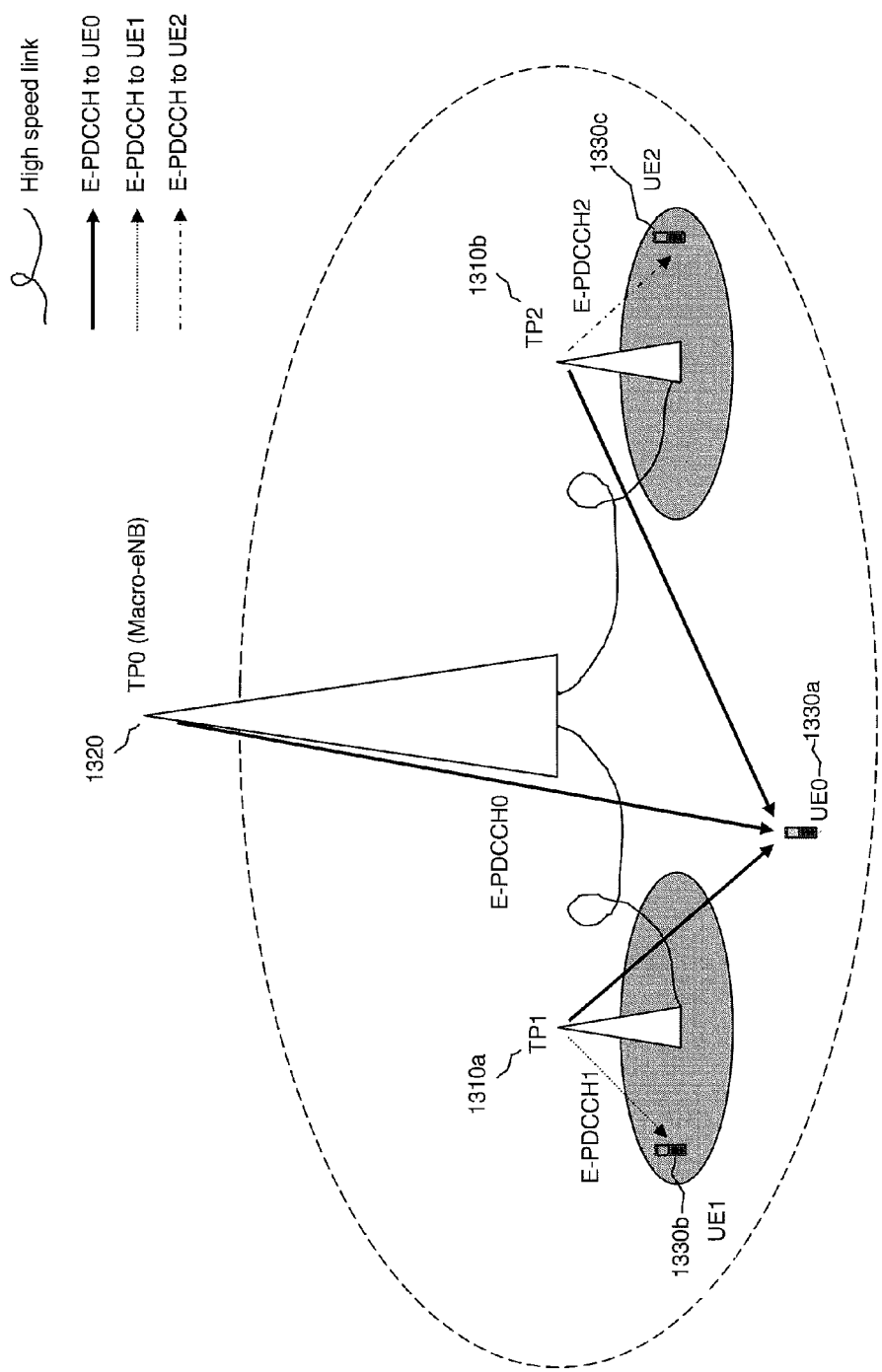
FIG. 13 is a diagram of an example of PDCCH transmission in a cell with multiple LPNs sharing the same cell ID, according to an embodiment of the disclosure.

An example of E-PDCCH transmission is shown in FIG. 13, where two LPNs 1310a and 1310b are deployed in a cell covered by a macro-eNB 1320 sharing the same cell ID. The E-PDCCH for UE0 1330a, which is covered by the macro-eNB 1320, could be configured with one of two options. In the first option, a CRS is used as the E-PDCCH demodulation RS. In this case, E-PDCCHs to UE0 1330a could be sent over the CRS ports using one of two transmission methods. In the first method, single CRS port transmission is used if a single CRS port is configured in a cell. In the second method, TxD is used if two or four CRS ports are configured in a cell.

In the second option, DMRS is used as the E-PDCCH demodulation RS. In this case, E-PDCCHs to UE0 1330a could be sent over the configured DMRS ports using one of two transmission methods. In the first method, single DMRS port transmission is used if one DMRS port is configured. In the second method, TxD is used if two or four DMRS ports are configured.

In the case of E-PDCCH transmission with cross-interleaving, UE0 1330a can be cross-interleaved with UEs whose E-PDCCHs are also transmitted from the same macro-cell. However, UE0 1330a cannot be cross-interleaved with UE1 1330b or UE2 1330c if their E-PDCCHs are transmitted from different TPs and their demodulation reference signals are thus not the same.

It may be desirable to transmit an E-PDCCH to UE1 1330b, which is close to TP1 1310a, only from TP1 1310a. In such a case, the DMRS could be configured as the only E-PDCCH demodulation reference signal. The E-PDCCH to UE1 1330b could then be transmitted with one of two options: single DMRS port transmission or transmit diversity. When single DMRS port transmission is used, the E-PDCCH could be transmitted over one antenna port without precoding or over more than one antenna with open-loop precoding or close-loop precoding if DL CSI for UE1 1330b is available at TP1 1310a. If there are two or more antennas in TP1 1310a, the use of transmit diversity could allow robust E-PDCCH transmission with two or four DMRS ports from TP1 1310a to UE1 1330b.

An approach similar to that used for UE1 1330b and TP1 1310a could be used for E-PDCCH transmission from TP2 1310b to UE2 1330c, which is close to TP2 1310b.

Figure 14:
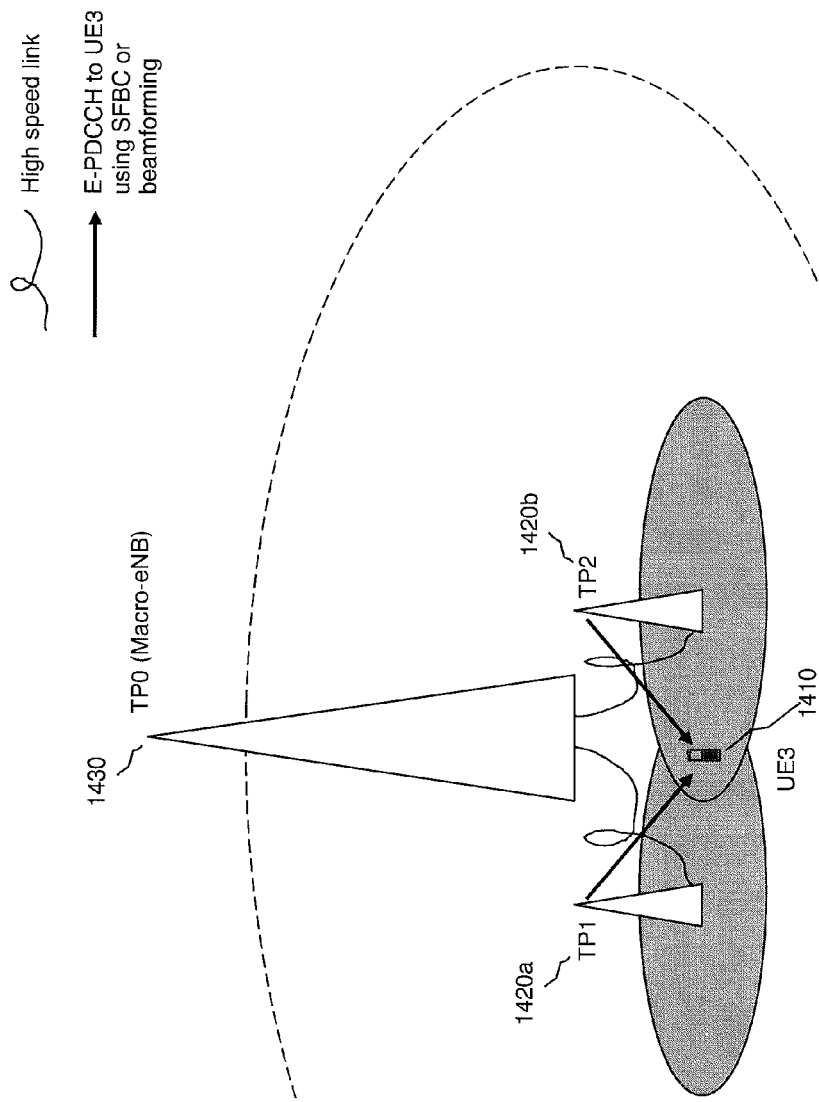
FIG. 14 is a diagram of another example of PDCCH transmission in a cell with multiple LPNs sharing the same cell ID, according to an embodiment of the disclosure.
Figure 15:
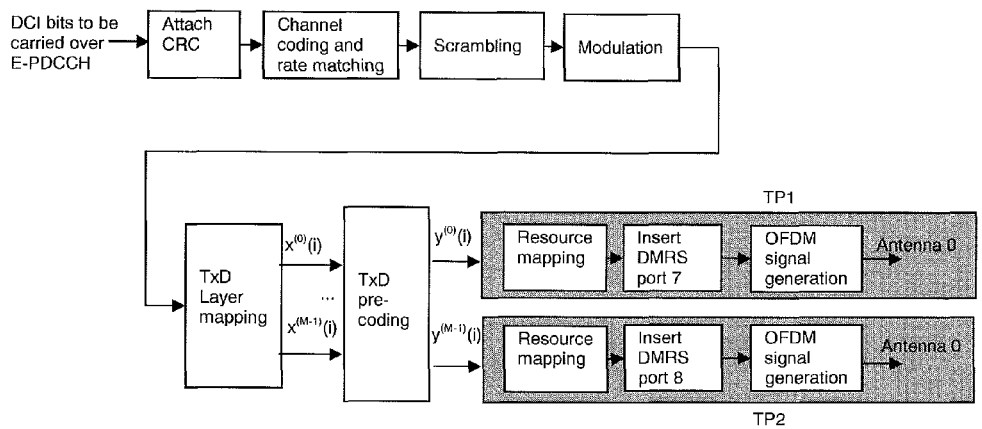
FIG. 15 is a diagram of an example of E-PDCCH transmission from two transmission points, each with one transmission antenna, according to an embodiment of the disclosure.

Another example is shown in FIG. 14, where UE3 1410 is covered by both TP1 1420a and TP2 1420b. In this case, different DMRS ports could be configured for TP1 1420a and TP2 1420b to support different transmission schemes. At least three different configurations are possible in this deployment scenario. In the first configuration, DMRS ports support cross-TP TxD transmission. In this configuration, one DMRS port (e.g., port 7) could be transmitted from TP1 1420a and a different DMRS port (e.g., port 8) could be transmitted from TP2 1420b. UE3 1410 could be configured with both DMRS ports (e.g., ports 7 and 8) for E-PDCCH demodulation. E-PDCCHs to UE3 1410 could be sent from both TP1 1420a and TP2 1420b using two-port TxD for increased diversity and robustness, as shown in FIG. 15.

Figure 16:
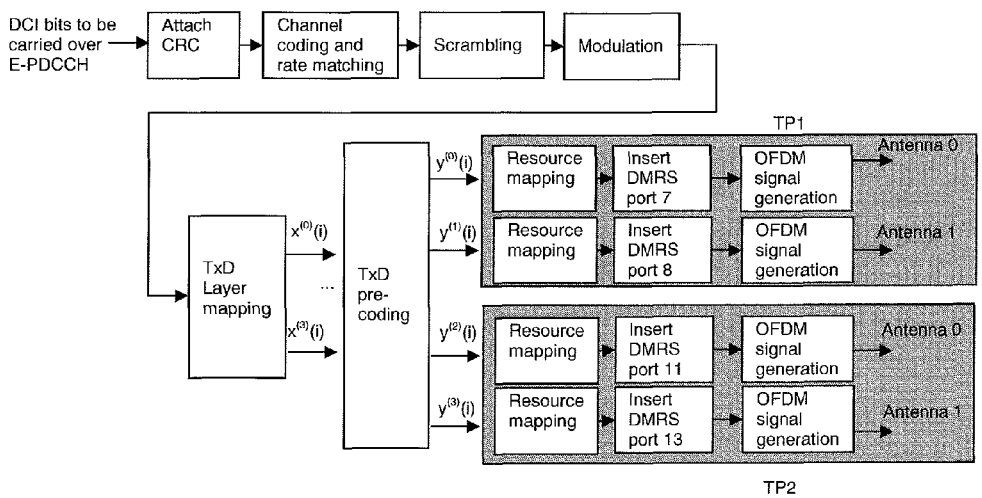
FIG. 16 is a diagram of an example of E-PDCCH transmission with cross-transmission point transmit diversity, with each transmission point having two transmission antennas, according to an embodiment of the disclosure.

Similarly, if TP1 1420a and TP2 1420b have two antenna ports each, then TP1 1420a could transmit DMRS ports 7 and 8, and TP2 1420b could transmit DMRS ports 11 and 13. UE3 1410 could be configured with DMRS ports {7, 8, 11, 13} and four-port TxD could be used for E-PDCCH transmission to the UE 1410 from the two TPs 1420. Such an implementation is shown in FIG. 16.

Figure 17:
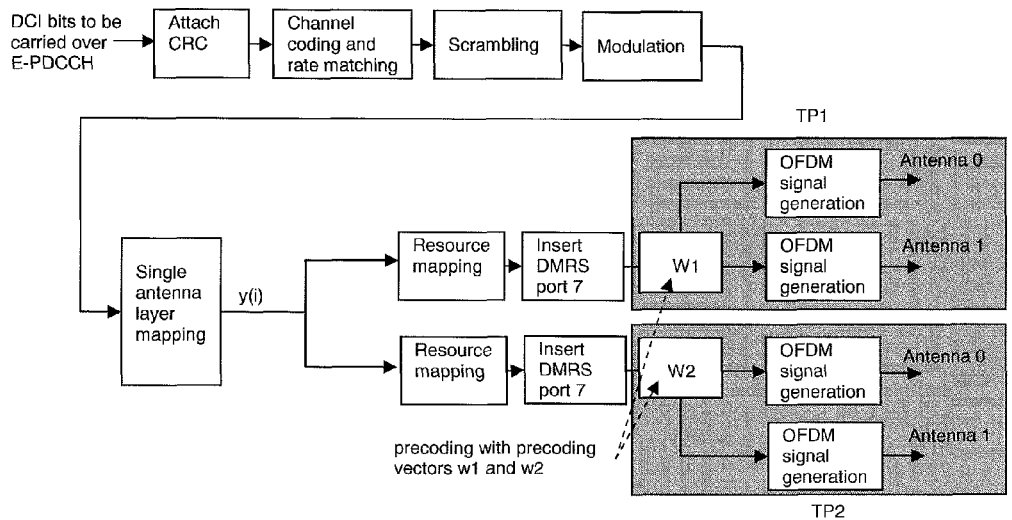
FIG. 17 is a flow chart of E-PDCCH transmission from two transmission points with beamforming, according to an embodiment of the disclosure.

In the second configuration, DMRS ports support joint beamforming transmission. In this configuration, if E-PDCCH without cross-interleaving is configured, then beamforming could be used to transmit E-PDCCHs to the UE 1410 from the two TPs 1420 with precoded DMRS if DL CSI regarding the two TPs 1420 to the UE 1410 is available at the eNB 1430. In this case, the UE 1410 could feed back a precoding matrix indicator (PMI) for each of the two TPs 1420 and a single DMRS port could be configured for the UE 1410. An example is shown in FIG. 17, where w1 and w2 are the precoding vectors applied at TP1 1420a and TP2 1420b, respectively. For better received E-PDCCH signal quality at the UE 1410, phase information between the two PMIs may be fed back and applied at the TPs 1420 for coherent addition of the E-PDCCH signals from the two TPs 1420 at the UE 1410.

Figure 18:
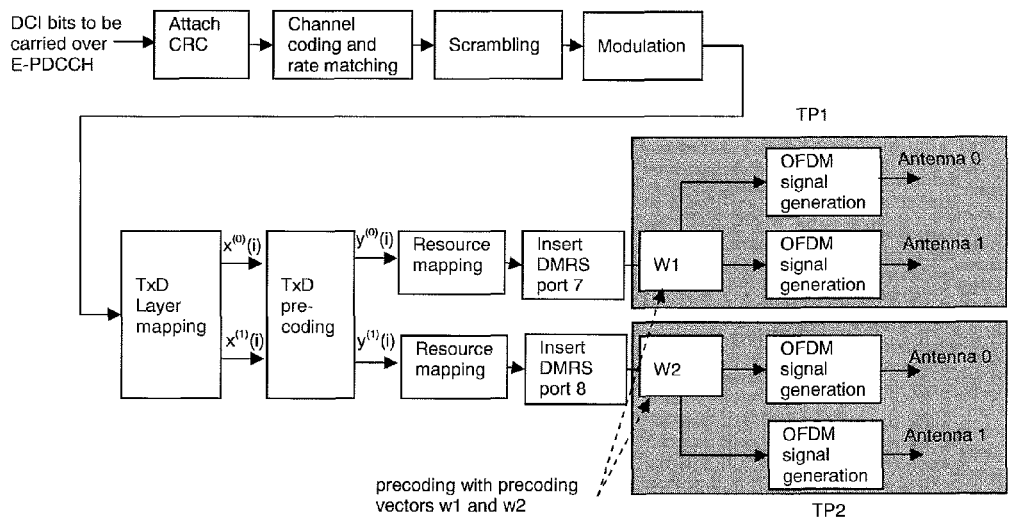
FIG. 18 is a diagram of an example of E-PDCCH transmission with cross-transmission point transmit diversity and per transmission point beamforming, according to an embodiment of the disclosure.

In the third configuration, DMRS ports support joint beamforming and TxD transmission. In this configuration, a two-port TxD can be used for E-PDCCH transmission to the UE 1410 from the two TPs 1420, as shown in FIG. 18. At each TP 1420, TxD precoded symbols together with the DMRS could be further precoded over two antennas at each TP 1420 before transmission. A different DMRS port may need to be configured for each TP. The UE 1410 could be configured with the two DMRS ports and could decode the E-PDCCH data assuming two-port TxD. The precoding vector at each TP 1420 may be obtained from UE feedback. Because the precoding operation at each TP is generally beneficial for a specific UE, this option may be applicable only to E-PDCCH without cross-interleaving.

TxD resource mapping for E-PDCCH will now be considered. Let $\{y^{(p)}(i), i=0, 1, \ldots, M_{symb}^{ap}-1\}$ be the output modulation symbols after TxD precoding at port p, where p is one of the two DMRS ports configured for two-port TxD, or p is one of the four DMRS ports configured for four-port TxD. Then for each of the DMRS ports used for the TxD transmission, the block of complex symbols $\{y^{(p)}(i), i=0, 1, \ldots, M_{symb}^{ap}-1\}$ can be mapped to resource element (k, l) in OFDM symbols not containing DMRS.

Unlike LTE Rel-8 to Rel-10, where DMRS is not present in RBs over which TxD is performed, to support TxD with DMRS for E-PDCCH transmission, new mapping may need to be defined in OFDM symbols containing DMRS. Some mapping options will now be discussed. TxD resource mapping for E-PDCCH without cross-interleaving will be considered first, and then TxD resource mapping for E-PDCCH with cross-interleaving will be considered.

Figure 19:
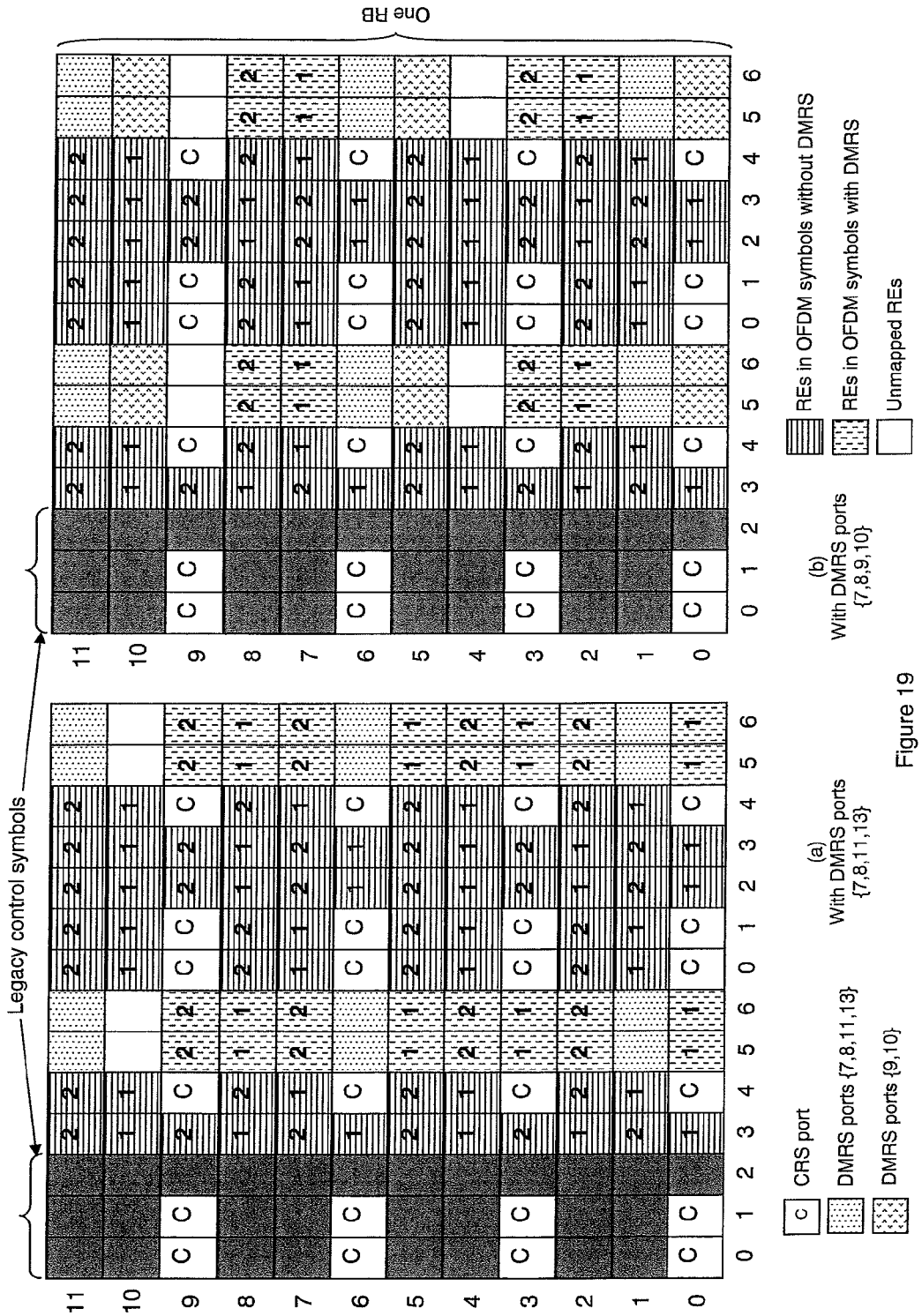
FIGS. 19a and 19b are diagrams of resource mapping based on SFBC, according to an embodiment of the disclosure.

An example of mapping of TxD precoded symbols $\{y^{(p)}(i), i=0, 1, \ldots, M_{symb}^{ap}-1\}$ to REs for two-port or four-port TxD with DMRS ports using resource mapping based on space frequency block code (SFBC) is shown in FIG. 19. TxD with DMRS ports $\{7, 8, 11, 13\}$ is shown in FIG. 19(*a*), and TxD with DMRS ports $\{7, 8, 9, 10\}$ is shown in FIG. 19(*b*). The mapping in the OFDM symbols without DMRS is the same as that for the PDSCH in LTE Release-8. In the OFDM symbols containing DMRS, the REs used for DMRS transmission are assumed unavailable for TxD mapping. The rest of the REs in the OFDM symbols containing DMRS may or may not be used for TxD transmission. The TxD precoded symbol pair $\{y^{(p)}(i), y^{(p)}(i+1)\}$ is mapped to neighbor REs labeled "1" and "2" in each OFDM symbol respectively, where i is an even number. The mapping starts from the RE (k, l) with the lowest symbol index l in the even numbered slot and the lowest frequency index k, and increments first from frequency and then from time in the allocated RBs. The maximum allowed separation between the RE for y(i) and the RE for y(i+1) is one RE in this example.

Figure 20:
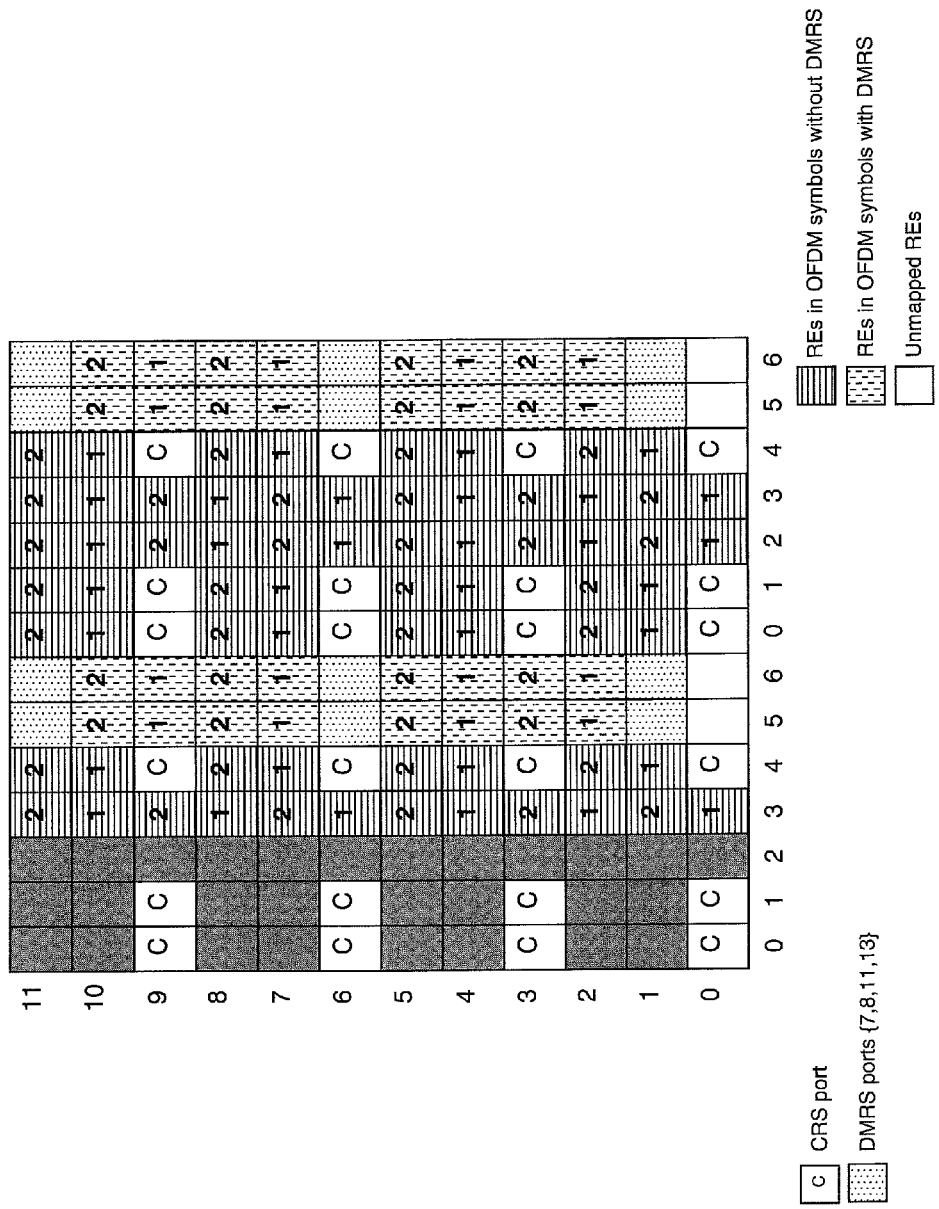
FIG. 20 is a diagram of another example of resource mapping based on SFBC, according to an embodiment of the disclosure.
Figure 21:
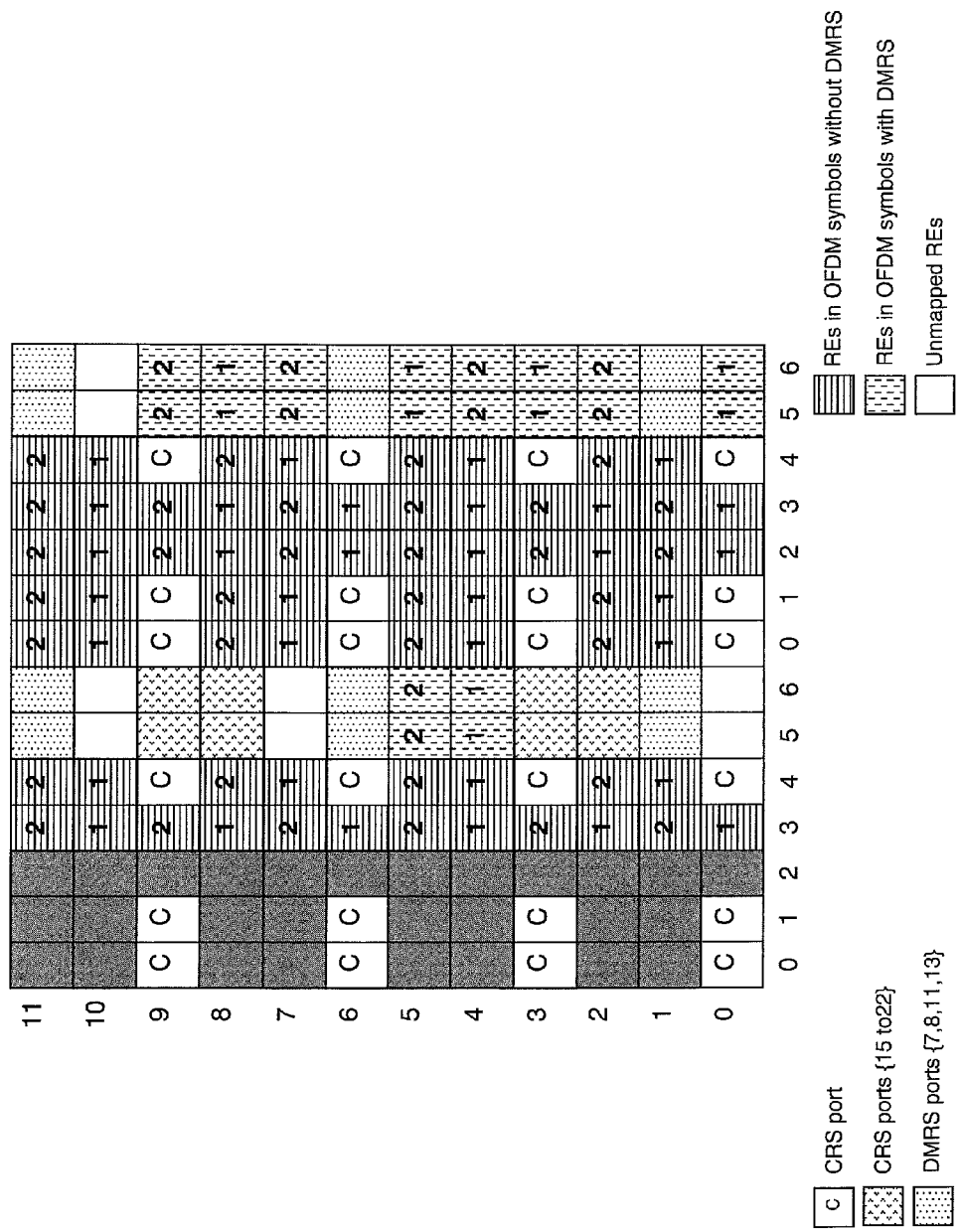
FIG. 21 is a diagram of an example of resource mapping based on SFBC when both DMRS and CSI-RS are present, according to an embodiment of the disclosure.

Another option is that y(i) and y(i+1) are only allowed to be mapped to adjacent REs. In this case, the unmapped REs would be at the lowest frequency index in the OFDM symbols containing DMRS. An example is shown in FIG. 20. An example of resource mapping when CSI-RSs are present in a subframe is shown in FIG. 21.

In these SFBC-based TxD options, resource elements (k, l) in an OFDM symbol containing DMRS can be used in the mapping if those resource elements are not used for transmission of DMRS, if those resource elements are not used for transmission of CSI-RS, and if the complex symbols $y^{(p)}(i)$ and $y^{(p)}(i+1)$, where i is an even number, are mapped to resource elements (k, l) and (k+n, l) in the same OFDM symbol with, for example, n<3.

With the above mapping rules, some REs in the OFDM symbols containing DMRS are left un-mapped to any TxD precoded symbols, resulting in some overhead. The overhead due to unmapped REs could be reduced or eliminated by using STBC (space time block code) based mapping in the OFDM symbols containing DMRS.

Figure 22:
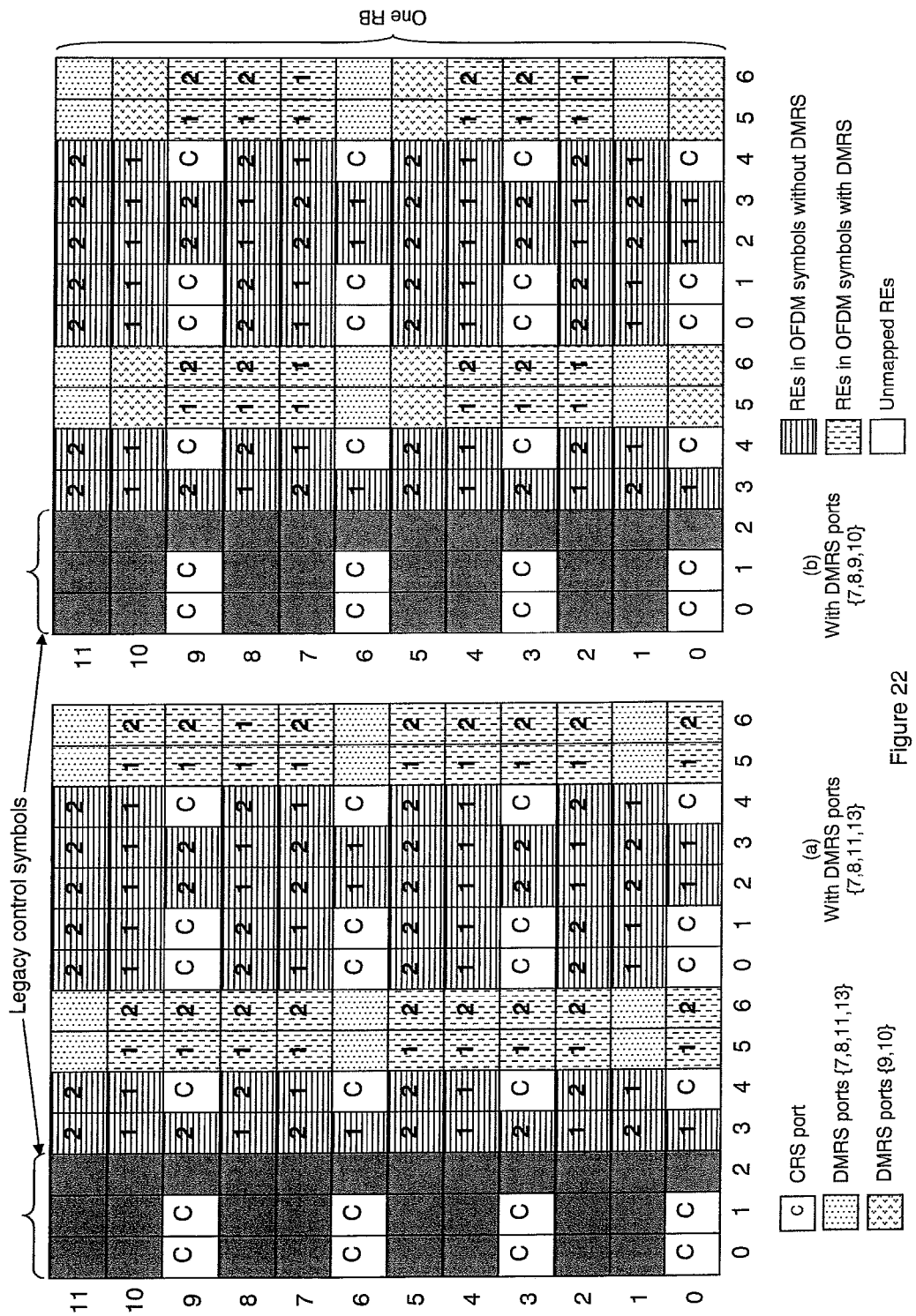
FIGS. 22a and 22b are diagrams of resource mapping based on hybrid SFBC and STBC, according to an embodiment of the disclosure.
Figure 23:
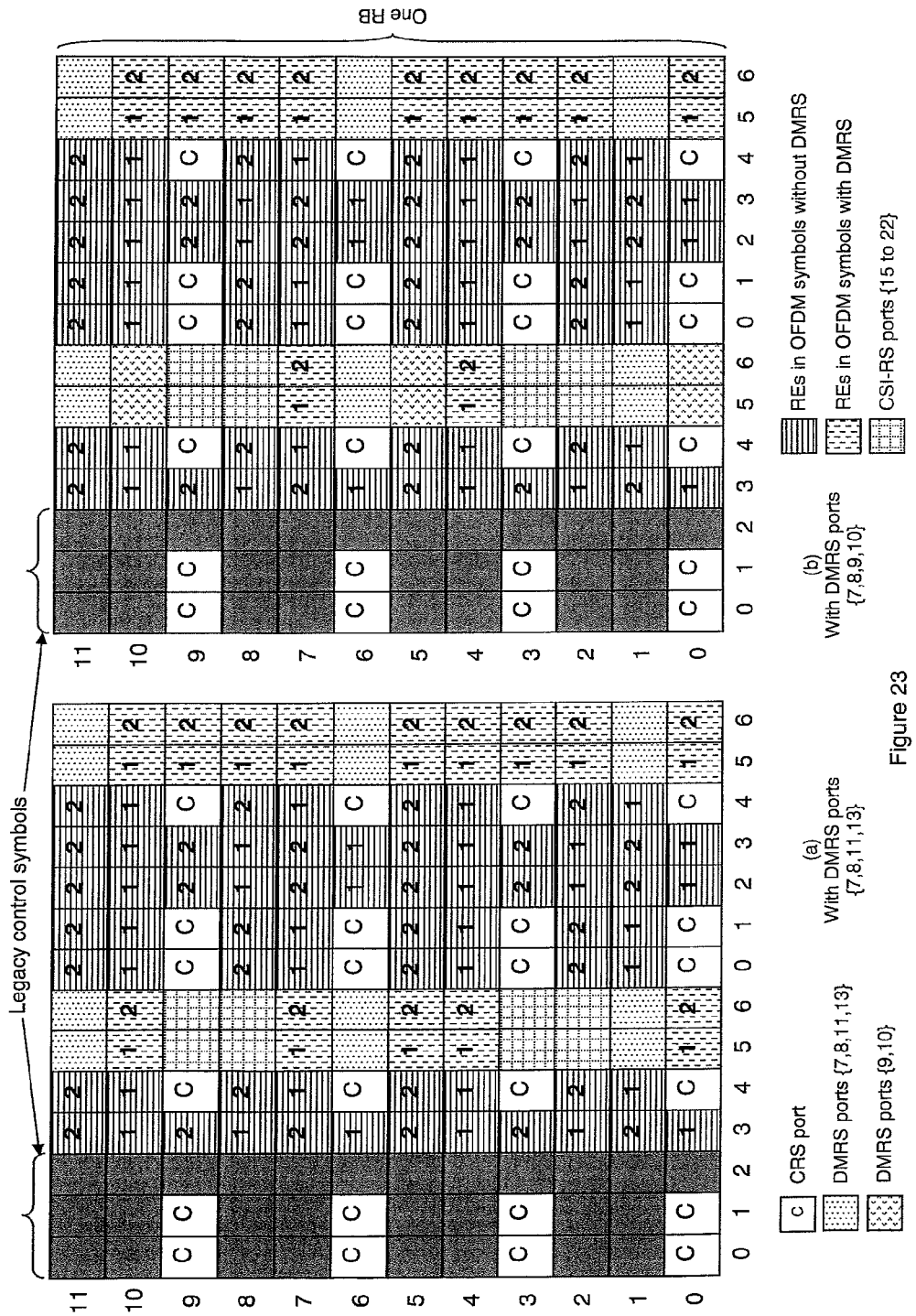
FIGS. 23a and 23b are diagrams of other examples of resource mapping based on hybrid SFBC and STBC in the presence of CSI-RS, according to an embodiment of the disclosure.

An example of such a mapping scheme for two-port or four-port TxD with DMRS ports is shown in FIG. 22, where TxD with $\{7, 8, 11, 13\}$ is shown in FIG. 22(*a*) and TxD with ports $\{7, 8, 9, 10\}$ is shown in FIG. 22(*b*). Symbol $y^{(p)}(i)$ is mapped to RE (k, l) (i.e., an RE labeled "1") in the first OFDM symbol containing DMRS and $y^{(p)}(i+1)$ is mapped to RE (k, l+1) (i.e., an RE labeled "2") in the next OFDM symbol containing DMRS. The mapping continues to the next resource element (k+1, l) and so on. With this mapping, it can be seen that there are no longer any unmapped REs. Another example of hybrid SFBC- and STBC-based resource mapping in the presence of CSI-RS is shown in FIG. 23.

In these hybrid SFBC- and STBC-based resource mapping options, resource elements (k, l) in an OFDM symbol containing DMRS can be used in the mapping if those resource elements are not used for transmission of DMRS and if those resource elements are not used for CSI-RS.

In this hybrid SFBC- and STBC-based resource mapping option, the mapping to resource element (k, l) in the OFDM symbols containing DMRS on antenna port p not reserved for other purposes can be in increasing order with first the index l over the adjacent two OFDM symbols and then the index k over the assigned RBs for the transmission.

TxD resource mapping for E-PDCCH with cross-interleaving will now be considered. An REG may be defined in each OFDM symbol in an E-PDCCH region supporting cross-interleaving. In OFDM symbols that do not contain DMRS or CSI-RS, the same REG definition in Rel-8 may be used. That is, an REG is composed of four consecutively available REs in one OFDM symbol in an RB configured for potential E-PDCCH transmission counted in ascending order of subcarriers. An RE is assumed to be unavailable with respect to mapping the E-PDCCH if the RE is used for transmission of CRS. If CRS is configured for port 0, it can be assumed that REs for transmission of CRS on antenna port 1 are unavailable for an REG. Precoded TxD symbols for 2-tx and 4-tx could be mapped as defined in Rel-8 within each REG. For example, a TxD precoded symbol pair could be mapped to RE 1 and 2.

In OFDM symbols containing DMRS or CSI-RS, at least two options for REG definition may exist. In the first option, an REG is composed of four consecutively available REs in one OFDM symbol in an RB configured for potential E-PDCCH transmission counted in ascending order of subcarriers. An RE is assumed to be unavailable with respect to mapping the E-PDCCH if the RE is used for the transmission of DMRS or if the RE is configured for CSI-RS. For an REG={RE(k0), RE(k1), RE(k2), RE(k3)}, where ki (i=0, 1, 2, 3) are the subcarrier indices of the REs, the following conditions may be satisfied:

$$k1-k0<3 \text{ and } k3-k3<3.$$

Figure 24:
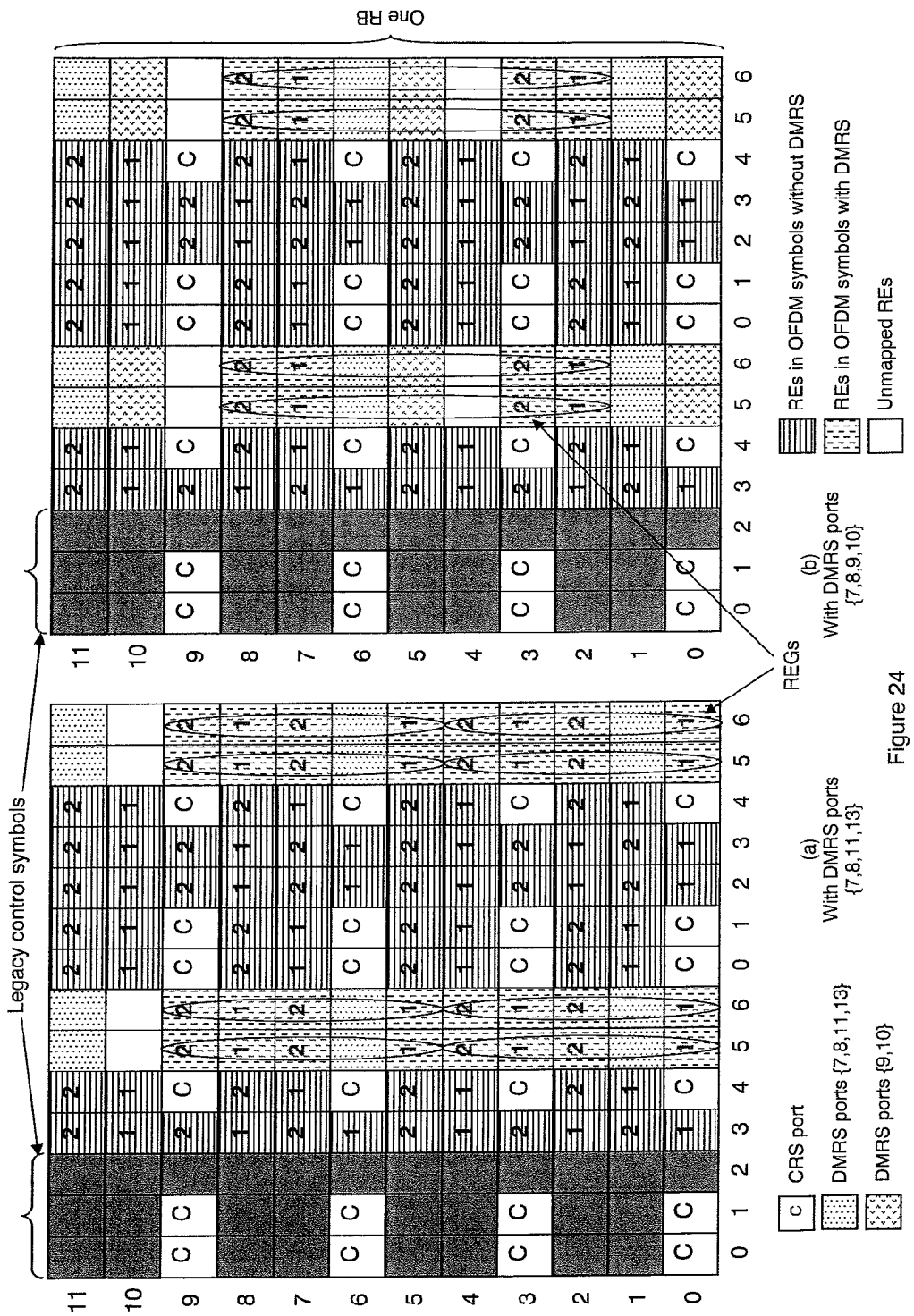
FIGS. 24a and 24b are diagrams of examples of RE to REG mapping in OFDM symbols containing DMRS, according to an embodiment of the disclosure.

One such example is shown FIG. 24. Alternatively, for an REG={RE(k0), RE(k1), RE(k2), RE(k3)}, where ki (i=0, 1, 2, 3) are the subcarrier indices of the REs, the following conditions may be satisfied:

$$k1-k0=1 \text{ and } k3-k3=1.$$

Figure 25:
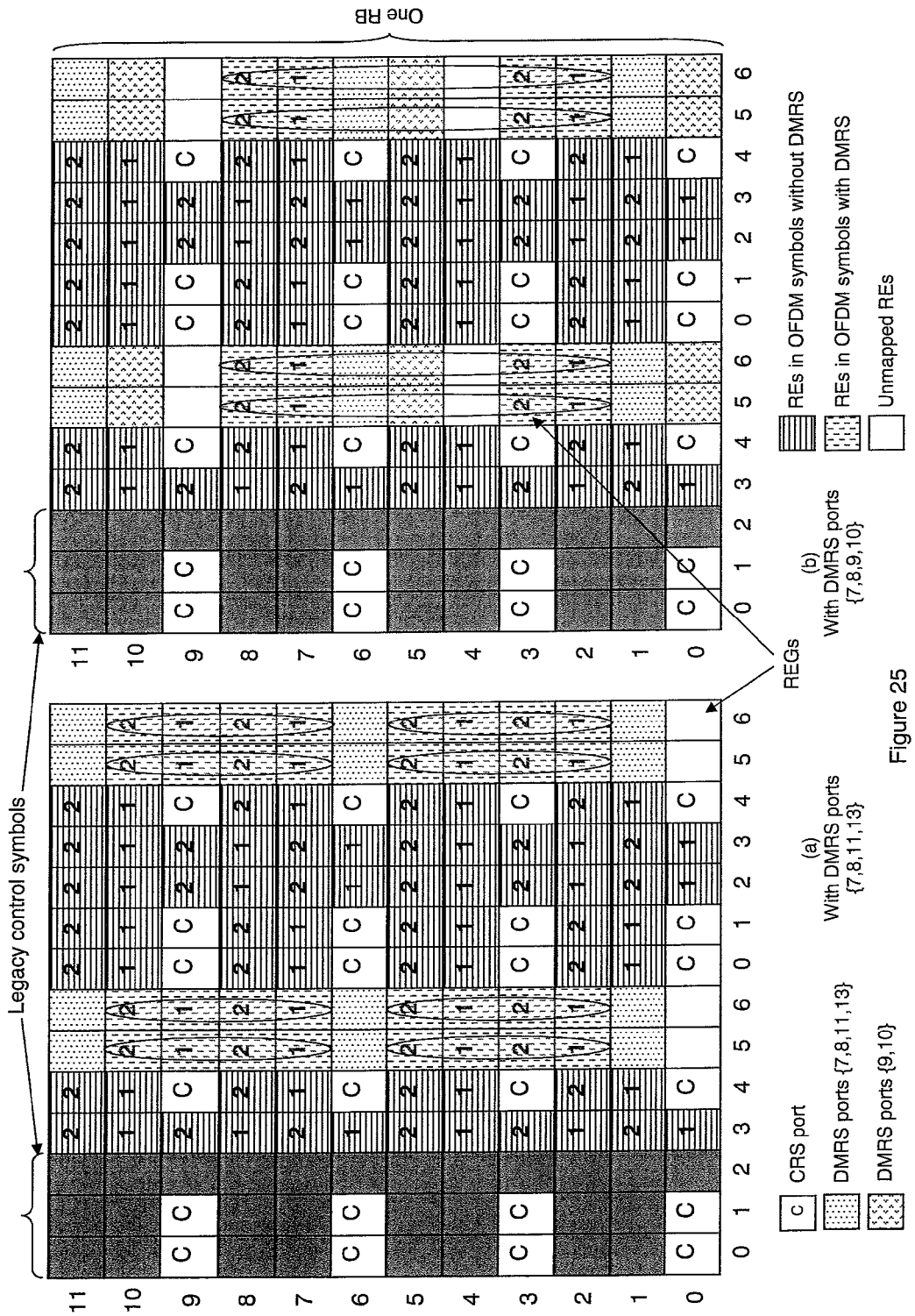
FIGS. 25a and 25b are diagrams of other examples of RE to REG mapping in OFDM symbols containing DMRS, according to an embodiment of the disclosure.

One such example is shown FIG. 25.

Figure 26:
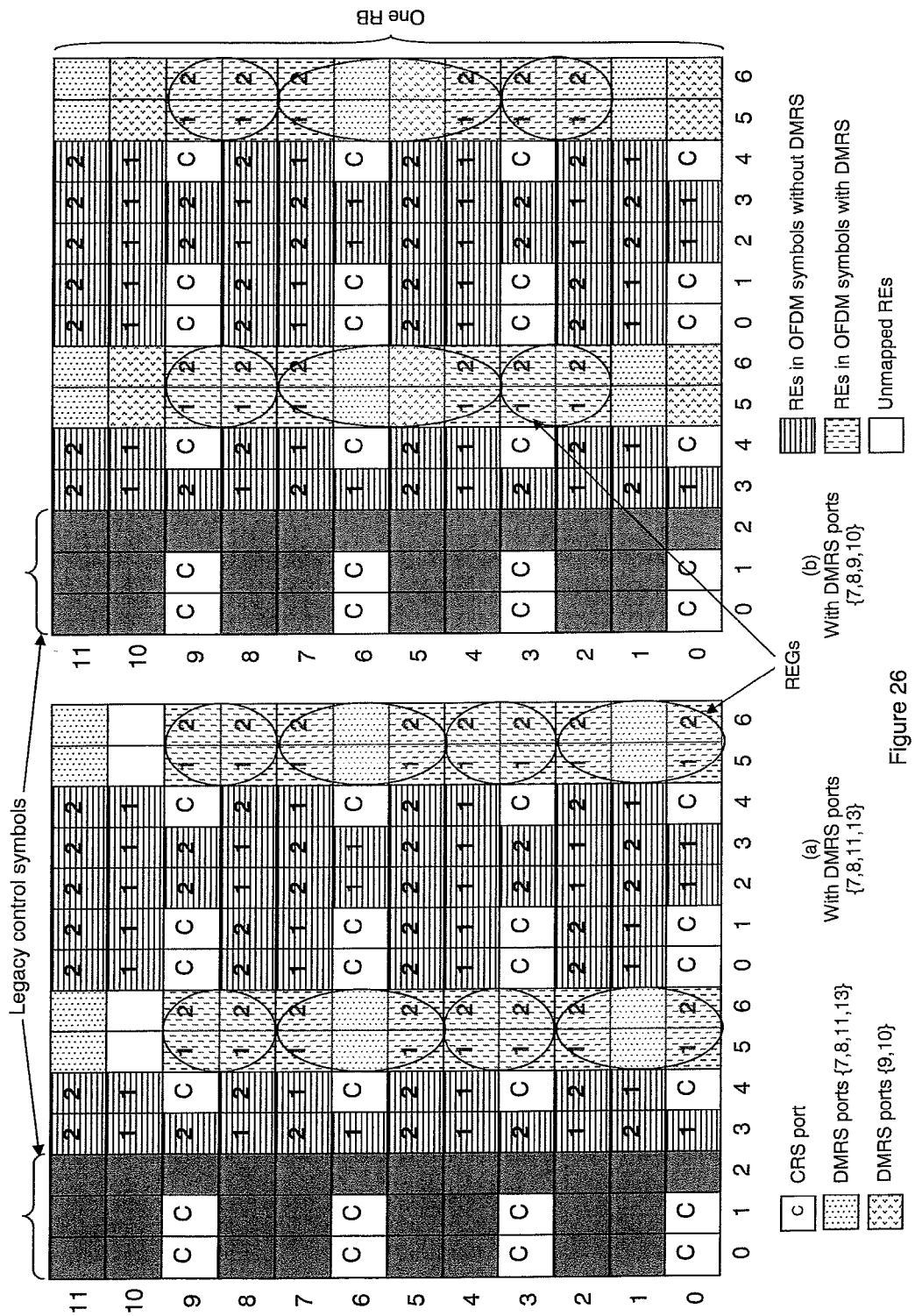
FIGS. 26a and 26b are diagrams of other examples of RE to REG mapping in OFDM symbols containing DMRS, according to an embodiment of the disclosure.

In the second option, an REG is composed of four neighboring available REs in a RB in two consecutive OFDM symbols containing DMRS and configured for potential E-PDCCH transmission counted in ascending order of OFDM symbols first and then subcarriers. An RE is assumed to be unavailable with respect to mapping the E-PDCCH if the RE is used for the transmission of DMRS or if the RE is configured for CSI-RS. One such example is shown FIG. 26.

With the above resource mapping, E-PDCCHs may be multiplexed, scrambled, modulated, and/or mapped to layers and precoded in a manner similar to that used for the legacy PDCCH, with the following exceptions: TxD transmission uses DMRS ports for demodulation; for the purpose of REG-to-RE mapping, the downlink system bandwidth can be determined as $N_{RB}^{E\text{-}PDCCH}$; $N_{REG}$ is the number of REGs in the E-PDCCH region; and $n_{PDCCH}$ is the number of transmitted E-PDCCHs in the E-PDCCH region.

It should be noted that for 4-tx TxD, the two pairs of TxD precoded symbols of two pairs of antennas could be transmitted in the same REG in E-PDCCH with cross-interleaving. In the case of E-PDCCH transmission without cross-interleaving, the two pairs of TxD precoded symbols of two pairs of antennas could be transmitted alternatively along frequency and/or time.

The above examples show the mapping within an RB. If multiple consecutive RBs are assigned for a UE or a group of UEs for the E-PDCCH transmission, the mapping could be extended to include all assigned RBs. For example, the mapping of a pair of precoded TxD symbols does not need to be limited at the RB boundary, and thus unused orphan REs at the RB boundary can be avoided.

When E-PDCCH without cross-interleaving is configured in a cell and DMRSs are configured as the E-PDCCH demodulation reference signals for a UE, DMRS signals might be transmitted only on the resource blocks where the corresponding E-PDCCH is transmitted for the UE. The UE can perform channel estimation based on the configured DMRS in the resources over which E-PDCCH detection is performed.

When E-PDCCH with cross-interleaving is configured in a cell, different E-PDCCHs could be multiplexed and transmitted on the same E-PDCCH region. If DMRSs are configured as the E-PDCCH demodulation reference signals, the same DMRS ports could be used throughout a whole E-PDCCH region, and the DMRS signals may need to be transmitted in the E-PDCCH region as long as there is E-PDCCH transmission in the region. The DMRSs in this case can be shared among UEs and can be considered TP-specific. As used herein, the term "TP-specific" refers to a signal that is transmitted from a transmission point but is not transmitted from other transmissions points near that transmission point.

So when DMRSs are configured as E-PDCCH demodulation reference signals for a UE and E-PDCCH with cross-interleaving is configured in a cell, the UE can assume the same DMRS configuration in the E-PDCCH region when performing channel estimation for E-PDCCH detection. If CRS is configured for E-PDCCH demodulation at a UE, the UE can assume that there is no DMRS transmission in the RBs over which E-PDCCH detection is performed.

Each TP can be configured to have its own E-PDCCH region. This configuration could reduce the required blind decodes at a UE since only one E-PDCCH region would need to be searched. It is generally desirable that the E-PDCCH regions configured with cross-interleaving are non-overlapping with each other. A benefit of non-overlapping E-PDCCH regions is that E-PDCCH interference between TPs could be reduced. The E-PDCCH regions from different TPs could have overlaps if the coverage of the TPs are non-overlapping, i.e., there is no or very small interference with each other. E-PDCCH regions configured with DMRS and without cross-interleaving could overlap, and the interference among them could be reduced or avoided through coordinated E-PDCCH scheduling.

It may be preferable that an E-PDCCH region configured with cross-interleaving and with CRS as the E-PDCCH demodulation RS do not overlap with regions configured with DMRS as the E-PDCCH demodulation RS, since a region configured with CRS as the E-PDCCH demodulation RS might have UEs attached to the macro-eNB and interference could occur with E-PDCCHs transmitted from LPNs due to the large coverage of the macro-eNB.

Figure 27:
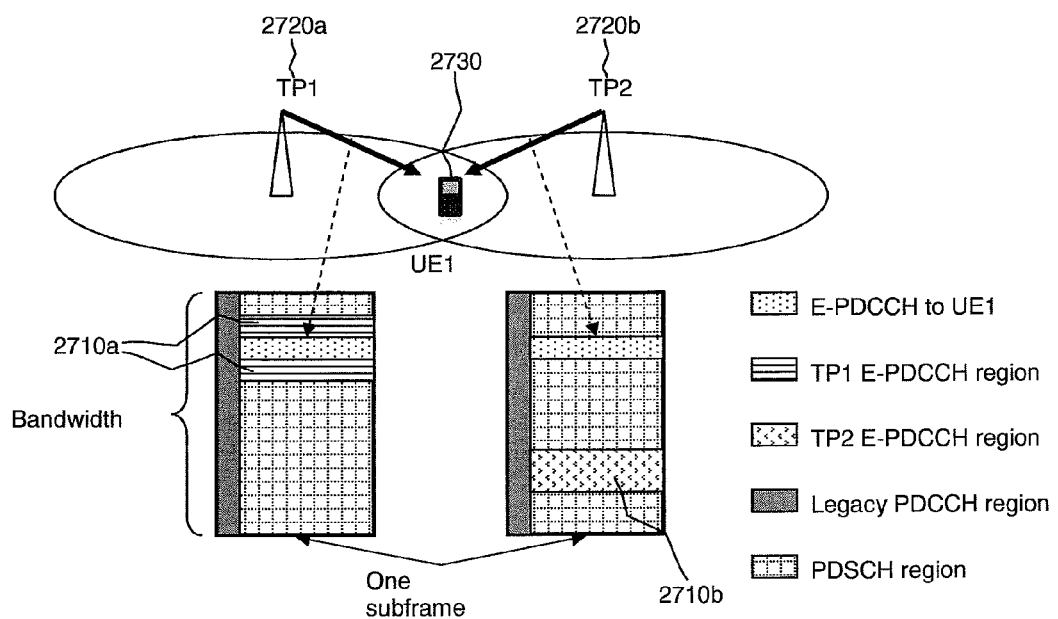
FIG. 27 is a diagram of transmission of an E-PDCCH from two transmission points to a UE during UE transition from a first transmission point to a second transmission point, according to an embodiment of the disclosure.

When a UE leaves the coverage area of one TP and enters the coverage of another TP, a reconfiguration of the E-PDCCH for the UE may be needed. The reconfiguration could be done by higher layer signaling, such as RRC signaling. Alternatively, the eNB could transmit an E-PDCCH to the UE from the targeting TP when E-PDCCH without cross-interleaving is used. Such mobility scenarios are shown in FIG. 27, where two different E-PDCCH regions 2710 are configured in TP1 2720a and TP2 2720b. TP1 2720a is the serving TP while TP2 2720b is the targeting TP. During the UE's transition period from TP1 2720a to TP2 2720b, the E-PDCCHs to the UE 2730 could be sent from both the TPs 2720 using the same DMRS ports and on the same E-PDCCH region. It should be noted that such an E-PDCCH could be transmitted in the PDSCH region of TP2 2720b, as before handover to the targeting TP 2720b, UE1 2730 may not be aware of the E-PDCCH region of the targeting TP 2720b. To achieve that, TP 2720b may need to avoid scheduled PDSCH on this region to avoid collision with the E-PDCCH for UE1 2730. After handover is completed for UE1 2730, the E-PDCCH region of TP 2720b could be signaled to UE1 2730 where it will expect to receive its E-PDCCH in the future. This transmission could be transparent to UE1 2730 as well as other UEs served by TP2 2720b.

The SFBC-based or hybrid SFBC- and STBC-based transmit diversity as described above can apply Alamouti coding on the symbols of an E-PDCCH transmitted from multiple antennas, and therefore can improve spatial diversity gain due to the fact that after coding, the two data streams transmitted from each antenna are orthogonal to each other. However, such transmit diversity may require mapping for pairs of coded symbols onto neighbor REs.

Alternatively, channel independent beamforming or random beamforming (RBF) can be used, in which precoding vectors (or matrices) are randomly selected from a known codebook and applied to an E-PDCCH. As in the situation of high mobility and a highly dispersive channel, the feedback wideband CSI may be aging and not able to match the variations of the channels. Therefore, instead of relying on such unreliable and inaccurate CSI for the precoding, some randomly chosen precoding vectors can be used to achieve some spatial diversity gain. Several variations of RBF can be used for E-PDCCH transmission, as follows.

In a first variation, symbol-based RBF may be used. In such a method, each modulated symbol or a group of modulated symbols of an E-PDCCH for a UE is precoded with a known precoding vector (matrix) before transmission over multiple antennas. Different precoding vectors (matrices) may be applied to different symbols or different groups of symbols, and precoding vectors (matrices) in a codebook can be cyclically used to precode different symbols or groups of symbols.

For example, if there are $N_w$ precoding vectors $\{w_1, w_2, \ldots w_{N_w}\}$ in a predefined codebook known to both the transmitter and receiver, let $\{x(0), x(1), \ldots x(k), \ldots, x(M_{symb}-1)\}$ be the $M_{symb}$ modulated symbols of the E-PDCCH to be sent to a UE over P transmit antennas from an eNB or access point. The precoded symbols with random beamforming to be mapped onto resources on each of the antennas are given by:

$$\begin{bmatrix} y^{(0)}(i) \\ y^{(1)}(i) \\ \ldots \\ y^{(P-1)}(i) \end{bmatrix} = v(i) \cdot x(i), i = 0, 1, \ldots, M_{symb}-1.$$

where $y^{(P)}(i)$ is the ith precoded symbol to be transmitted over the pth antenna. The precoding vector v(i) is of the size of P×1 and is defined in one scenario as follows:

$$v(i) = w_k, k = i \bmod N_w + 1$$

where mod is a modular function. In another scenario, v(i) can be defined as:

$$v(i) = w_k, k = (\mathrm{floor}(i/L)) \bmod N_w + 1$$

where L is the size of a group of symbols over which the same precoding vector is applied. L is known to both the eNB and the UE.

The mapping of the precoded symbols to REs can be along the frequency direction first followed by the time direction or vice versa. The starting precoding vector at the first symbol can vary from subframe to subframe and/or from cell to cell to further randomize possible interference in adjacent cells. One such example of precoding vector selection is given below:

$$v(i)=w_k, k=(\text{floor}(i/L)+f(n_s+\text{CellID}))\bmod N_w+1$$

where $n_s$ is a subframe number, cellID is a cell identifier, and $f(\ )$ is a predefined function of $n_s$ and cellID.

This symbol-based RBF scheme can create a channel variation from symbol to symbol and therefore can bring some potential spatial diversity gain.

The precoding vector selection and mapping to the symbols can be pre-defined so that the UE knows exactly the precoding vector that is applied on each symbol for channel estimation purposes. Alternatively, either dynamic or semi-static signaling can be used to convey the pre-coding vector pattern to the UE.

When such RBF is used, any reference signals used for channel estimation and E-PDCCH demodulation should not be precoded. This may allow the UE to estimate the channel for each symbol through the channel information from such reference signals and corresponding precoding on each symbol. For example, if the estimated channel for the ith symbol at a receive antenna corresponding to the pth transmit antenna is $\hat{h}^{(p)}(i)$ and the known precoding vector is $v(i)$, then the channel after precoding for the ith symbol can be estimated as:

$$\hat{h}(i)=[\hat{h}^{(0)}(i),\hat{h}^{(1)}(i),\ldots,\hat{h}^{(P-1)}(i)]\cdot v(i), i=0,1,\ldots,M_{symb}-1.$$

This channel estimate can then be used for equalization and demodulation. An RS port is required for each of the transmit antennas. CRS can be used for this purpose as it is not precoded. Alternatively, DMRS without precoding can also serve this purpose.

In a second variation, PRB-based RBF may be used. That is, as an alternative to the per-symbol-based RBF, the random BF can also be applied on a per-PRB basis for an E-PDCCH. Namely, the same precoding vector (matrix) can be applied to the symbols of the E-PDCCH to be mapped onto the same PRB (or PRB pair). A different precoding vector is used for symbols of the E-PDCCH allocated to a different PRB or PRB pair.

Alternatively, a single precoding vector can be applied to symbols of the E-PDCCH to be mapped to a number of neighboring PRBs. For example, if a number of consecutive PRBs are used for E-PDCCH transmission for a UE or a group of UEs, the same randomly selected precoding vector can be applied to the whole group of PRBs.

A benefit of PRB-based RBF is that only one port of RS is needed for channel estimation if the RS in a PRB is also precoded with the same precoding vector used for the E-PDCCH in the PRB, assuming one layer transmission for the E-PDCCH.

If DMRS is used for demodulation and the same precoding vector applied to the E-PDCCH is also applied to the DMRS in the same PRB, then the UE does not need to be informed separately of the actual precoding vector used by the eNB, as such information is carried by the DMRS already. Therefore such RBF may be totally transparent to the UE.

However, if the RS used for demodulation cannot be precoded, such randomly selected precoding vector information may need to be conveyed to the UE. One way to do that is to pre-define the precoding vectors for each PRB and PRB pair (or a group of PRBs and PRB pairs). For example, a number of precoding vectors in a codebook can be cyclically used over the PRB/PRB pairs (or a group of PRBs/PRB pairs) starting from the lowest frequency to the highest frequency of the system bandwidth. In order to provide more patterns for precoding vectors for each PRB, there can be different patterns based on subframe number or frame number. This order can be pre-defined or signaled.

Such PRB-based RBF can be used in conjunction with other diversity schemes such as frequency diversity. For example, in frequency diversity transmission, the E-PDCCH from the same UE can be distributed and transmitted over a number of non-consecutive PRBs, and different precoding vectors can be applied to each of such PRBs. To achieve more diversity gain, different precoding vectors in the codebook can be selected cyclically for these PRBs.

In a third variation, E-PDCCH-based RBF may be used. That is, when multiple E-PDCCHs for different users need to share the same resources (PRBs or PRB pairs), different precoding vectors can be used for each E-PDCCH. For each E-PDCCH, the precoding vector can be selected either randomly or using a pre-determined pattern which may depend on the UE ID, subframe, PRB number, etc.

When the precoding vector for each E-PDCCH in a PRB or PRB pair is either randomly selected (which the UE is unaware of) or is determined based a predetermined pattern (which the UE is aware of), a single port of precoded RS may be used for each E-PDCCH for channel estimation and E-PDCCH demodulation. When a predetermined pattern is used for precoding vector selection for each E-PDCCH, un-precoded RS, one for each transmit antenna, can be shared by all the E-PDCCHs for E-PDCCH demodulation. The precoding vector in this case can vary from PRB to PRB or from symbol to symbol.

The multiplexing of multiple E-PDCCHs on a PRB (or PRB pair) can be based on frequency division multiplexing (FDM), time division multiplexing (TDM) or a mix of both. In one FDM case, each PRB (or PRB pair) can be divided into three resource units. Each resource unit includes four consecutive subcarriers in frequency and all OFDM symbols in a slot or a subframe in time. Each of the three resource units can be allocated to a different E-PDCCH, and the modulated symbols in each resource unit can be precoded independently. The DMRS symbols in each resource unit can be precoded the same as the E-PDCCH transmitted on that resource unit and used for E-PDCCH demodulation.

To summarize, randomly selected precoding vectors (matrices) can be applied to an E-PDCCH on a modulated symbol or PRB (PRB pair) or per-E-PDCCH channel basis. The precoding vectors can be cyclically selected from a codebook and applied to modulated symbols or PRB pairs. Both CRS and DMRS without channel independent precoding can be used as RS for E-PDCCH demodulation.

Antenna port configuration for an E-PDCCH with non-precoded RS will now be considered. Even though an E-PDCCH is transmitted in the legacy PDSCH region, the number of transmit antennas configured for E-PDCCH transmission may not follow that of the PDSCH. This is because E-PDCCH transmission may have different requirements from that of the PDSCH. In an embodiment, the same number of transmit antenna ports is used as is used in the legacy PDCCH rather than following that for the PDSCH transmission. By doing this, the transmission of the E-PDCCH may be more in line with that of the legacy PDCCH. For example, if the number of transmit antenna ports for legacy PDCCH transmission as detected from the PBCH is two, then the number of transmit antenna ports assumed for E-PDCCH transmission is two. If the number of transmit antenna ports for legacy PDCCH transmission as detected from the PBCH is four, then the number of transmit antenna ports assumed for E-PDCCH transmission is four. The number of transmit antenna ports can determine the precoding vectors (matrices) used for precoding operation. Alternatively, the number of transmit antenna ports of the E-PDCCH can be independently configured and signaled to the UE by higher layer signaling, such as RRC signaling. It may be preferable that a maximum of four transmit antenna ports be configured for E-PDCCH transmission.

After the number of transmit antenna ports for the E-PDCCH is determined, other information that may need to be conveyed to the UE might include the transmission mode to be used, whether BF transmission or diversity transmission is to be used, and whether such transmission modes are supported for E-PDCCH transmission. Such transmission modes can be implicitly signaled to the UE through the number of demodulation RS ports. For example, if one demodulation RS port (CRS or DMRS) is configured for the E-PDCCH, then BF transmission can be assumed, but if multiple demodulation RS ports are configured, a diversity scheme such as SFBC-based transmit diversity can be assumed by the UE. Alternatively, the E-PDCCH transmission mode and the RS ports for a UE may be explicitly signaled. Here, it is assumed that there is only one layer transmission for the E-PDCCH. It should be mentioned that if PRB-based RBF is used as the diversity scheme, then there is no distinction between closed-loop BF and RBF from the UE's perspective. In this case, switching between BF and RBF is totally transparent to the UE (if DMRS with precoding is used for E-PDCCH demodulation).

In summary, if non-precoded RS is used for demodulation of the E-PDCCH, the number of transmit antennas used for E-PDCCH transmission can be the same as that used for legacy PDCCH transmission. Such a configuration can be inherited from that of the legacy PDCCH transmission or can be signaled through a higher layer. Beamforming or diversity transmissions can be either implicitly signaled by the configured number of demodulation RS ports or explicitly signaled to a UE. When non-precoded RS is used for E-PDCCH demodulation, a UE can assume the same number of transmit antennas as the legacy PDCCH transmission.

E-PDCCH multiplexing in a PRB pair will now be considered. Sub-PRB pair resource unit partitioning will be considered first, and then procedures for E-PDCCH resource assignment will be considered.

Regarding sub-PRB pair resource unit partitioning, when multiple E-PDCCHs are multiplexed in the same PRBs or PRB pairs, one problem may be how to assign or allocate the DMRS to UEs. When the symbol-based RBF approach is used, a non-precoded DMRS can be used, and the DMRS can be shared by all UEs in a PRB. In this case, the number of DMRS ports required equals the number of transmit antennas at the eNB. In addition, the precoding vectors used for RBF may need to be known at the UEs. An advantage is that an E-PDCCH for a UE would be spread over multiple RBs, and thus both potential spatial diversity and frequency diversity can be achieved. In contrast, when the PRB-based RBF method is used, only a single DMRS port with the same precoding may be needed, and the precoding can be transparent to a UE. A drawback is that there may not be enough spatial and frequency diversity because the resources of one PRB pair may not be large enough for many E-PDCCHs.

On the other hand, the minimum resource allocation for the legacy PDCCH is one CCE, which equals to 36 REs, or about the size of a third of a PRB pair. So it may not be efficient in terms of resource utilization when the minimum resource allocation for the E-PDCCH is PRB pair-based. For example, in some high SNR and small DCI scenarios, the required E-PDCCH performance may be achieved with a resource allocation of one CCE, meaning that assigning one PRB pair to one E-PDCCH may be a waste of resources. Therefore, it may be more efficient to define a sub-PRB partition. Possible ways of partitioning a PRB or PRB pair for E-PDCCH multiplexing and transmission include a horizontal sub-PRB pair resource unit partition and a vertical sub-PRB pair resource unit partition.

Figure 31:
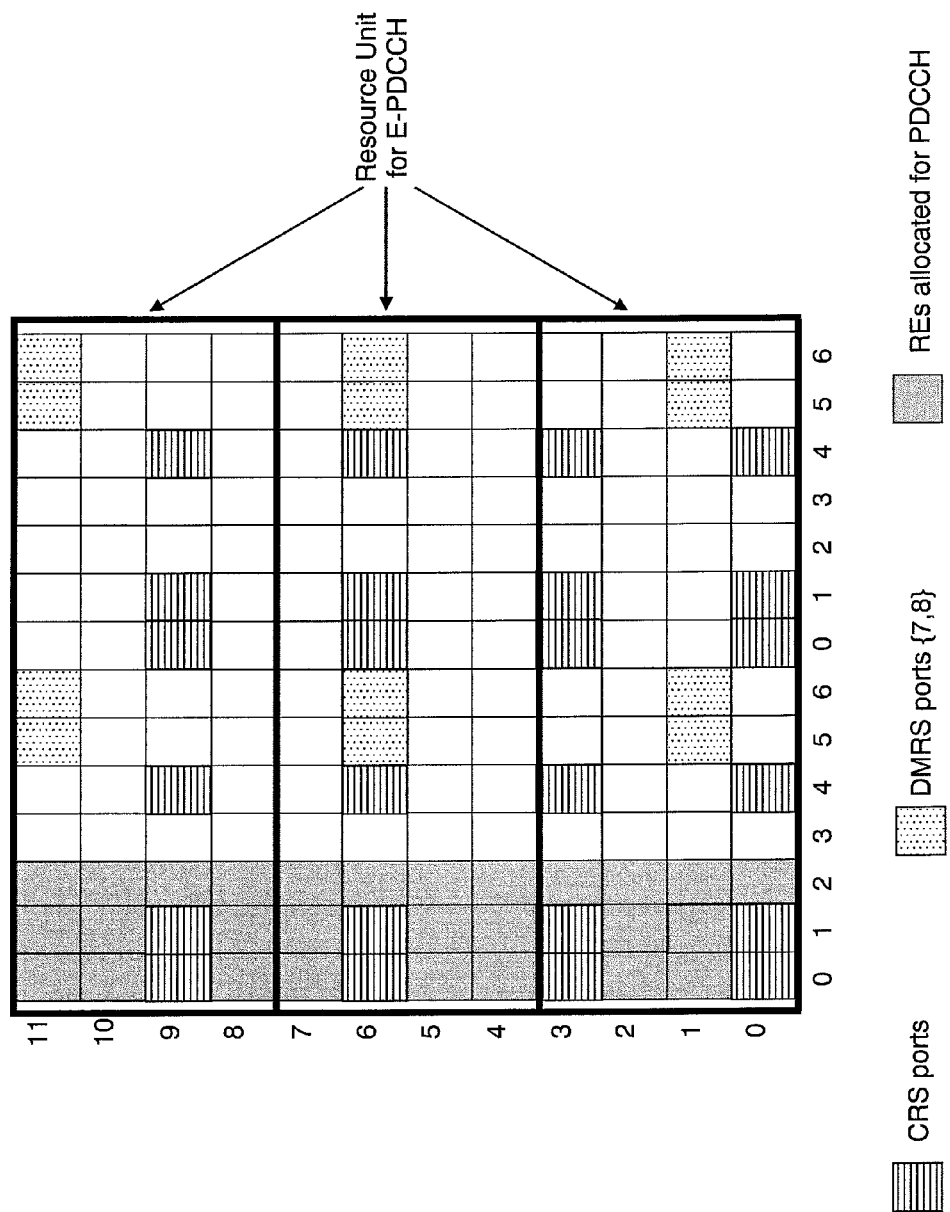
FIG. 31 is a block diagram illustrating horizontal sub physical resource block pair partition according to one embodiment.

Regarding horizontal sub-PRB pair resource unit partitioning, a PRB pair can be partitioned along frequency into different resource units. In one embodiment, the PRB pair can be partitioned into three resource units with equal size in frequency as depicted in FIG. 31, where each resource unit takes four REs in frequency. Roughly speaking, each resource unit contains resources about the size of one CCE, i.e., 36 REs, which is the minimum resource unit for PDCCH assignment.

An advantage of such a partition is that, in each resource unit, a set of DMRS symbols can be precoded independently from those in other resource units and thus can be used for E-PDCCH demodulation transmitted in that resource unit.

Figure 32:
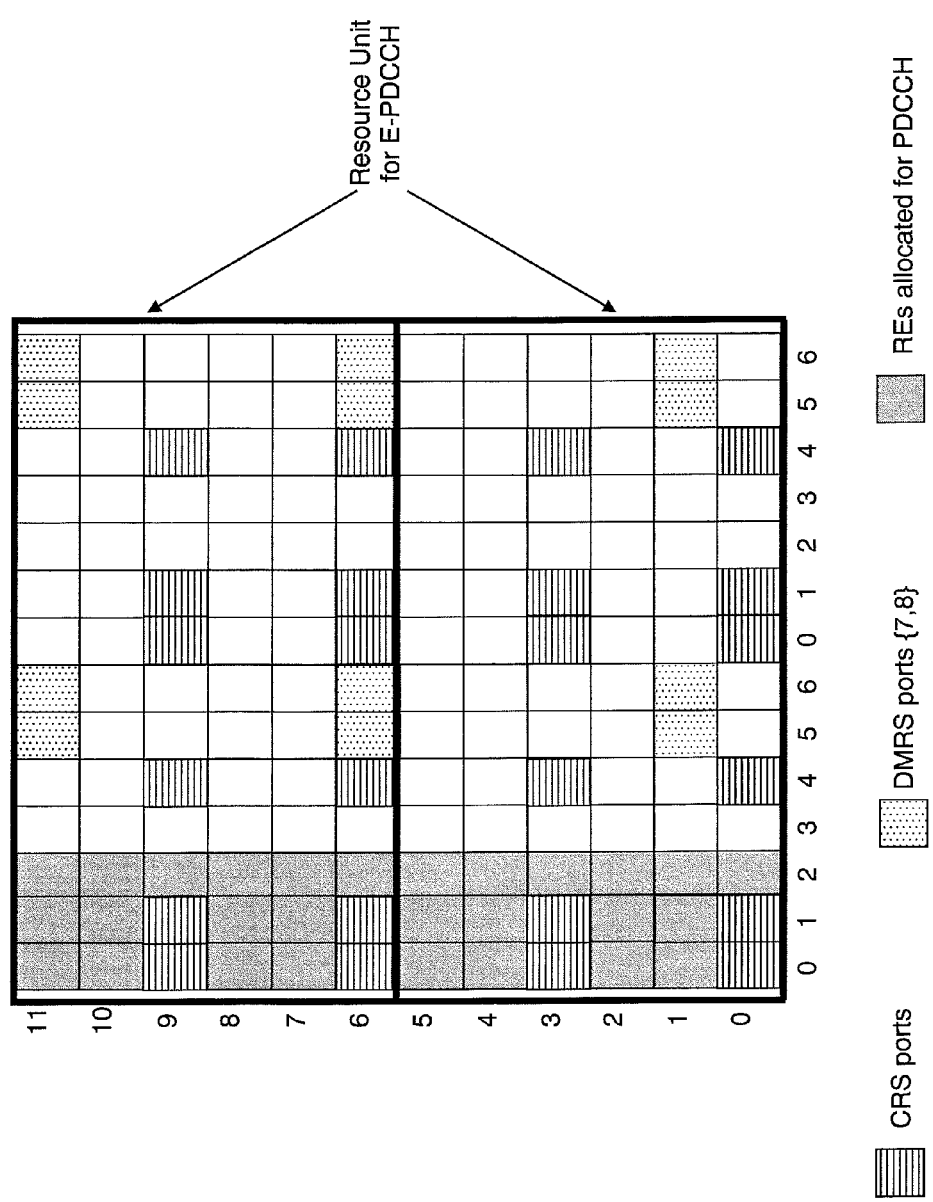
FIG. 32 is a block diagram illustrating horizontal sub physical resource block pair partition according to another embodiment.

In another embodiment, the PRB pair can be partitioned into two resource units with equal size in frequency as depicted in FIG. 32, where each resource unit takes six REs in frequency. One or more of such resource units may be allocated to an E-PDCCH. A UE may be assigned with one DMRS port for E-PDCCH demodulation. When a PRB or PRB pair is allocated to transmit two E-PDCCHs, one for a different UE, two orthogonal DMRS ports can be allocated, one DMRS port for each UE. For example, one UE could be assigned with DMRS port 7 and the other UE with DMRS port 8. Channel estimation for E-PDCCH demodulation can be performed using the DMRS REs over the whole PRB or PRB pair. An advantage of this approach is that better channel estimation can be achieved.

Figure 33:
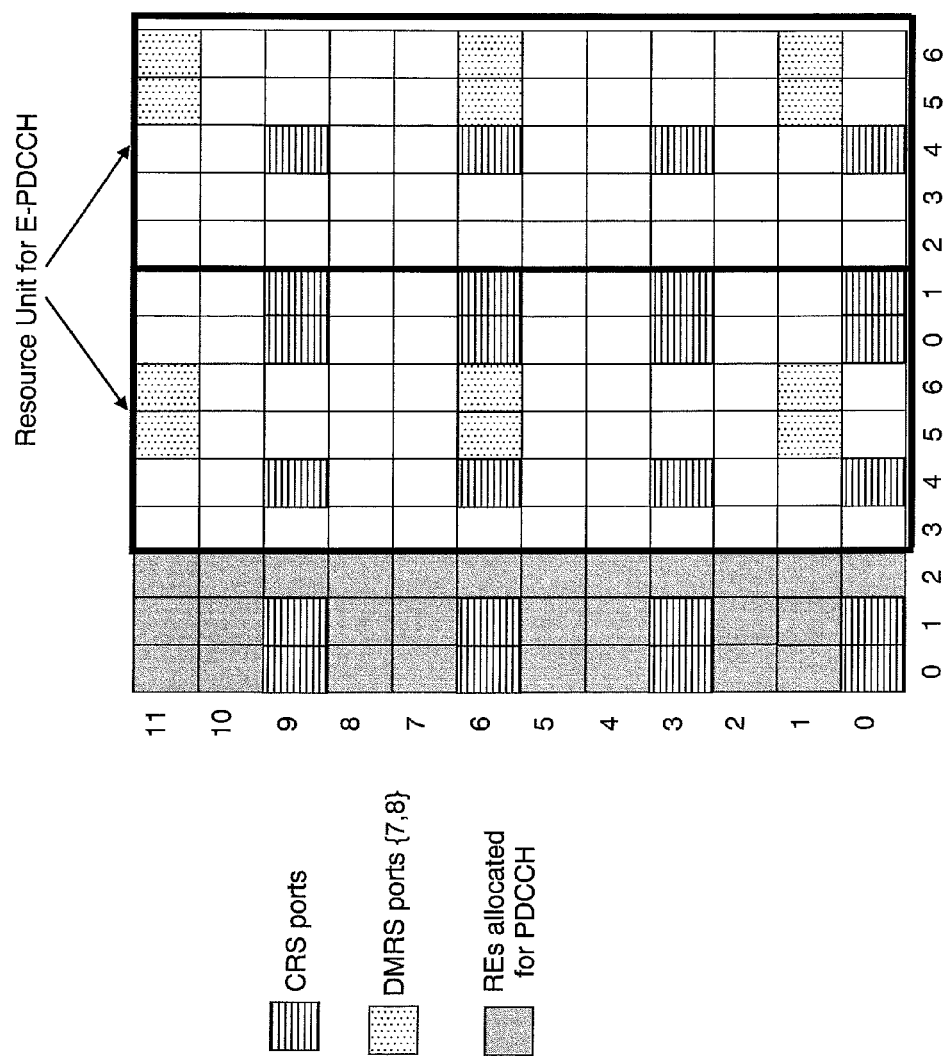
FIG. 33 is a block diagram illustrating vertical sub physical resource block pair partition according to yet another embodiment.

In another embodiment, vertical sub-PRB pair resource unit partitioning may be used. That is, a PRB pair can be partitioned into different resource units in the time domain. In one embodiment, the PRB can be partitioned into two resource units in time as depicted in FIG. 33. According to different lengths for the legacy PDCCH region, different partitioning patterns are also possible. This pattern can be fixed according to different PDCCH lengths. As also depicted in the FIG. 33, the sub-PRB resource unit may not be limited to a slot boundary.

Both types of partitioning can be used for close-loop beamforming (CL-BF), RBF, DMRS-based TxD, and MU-MIMO transmissions.

In summary, a PRB or PRB pair can be partitioned along either the frequency domain or the time domain to create smaller resource units. DMRS symbols in each resource unit can be used as demodulation RS for the E-PDCCH transmitted in that resource unit. If precoding is used, the same precoding vectors may be used as those for the E-PDCCH transmitted in the same resource unit.

Procedures for E-PDCCH resource assignment will now be considered. Partitioning a PRB pair in frequency or time to smaller resource units provides finer granularity in terms of resource mapping for the E-PDCCH compared to PRB pair-based resource allocation. Each resource unit can be precoded individually and can be allocated to different UE. In other words, when mapping and multiplexing E-PDCCHs of different UEs, each UE can be assigned with a number of resource units just as it was assigned with a number of CCEs for a legacy PDCCH. The resource mapping of the E-PDCCH for each UE can be localized or distributed. These partitions may be particularly beneficial for CL-BF, as a smaller resource may be needed for the E-PDCCH in many cases due to the beamforming gain.

Similar to the CCE concept used for legacy PDCCH resource allocation, the resource unit can be used in Rel-11 for E-PDCCH resource assignment. The assignment procedure of the E-PDCCH for a UE can follow a similar PDCCH assignment procedure as defined in Rel-8. Namely, each resource unit can be viewed as a CCE and assigned with an index. The assignment procedure of the E-PDCCH for a particular UE can be determined by the possible number of resource units used for the E-PDCCH, the number of E-PDCCH candidates, and/or UE ID.

The DMRS symbols in those resource units can be used as demodulation RS for the E-PDCCH transmitted in those resource units. For example, frequency domain partitioning may be used to partition a PRB pair into three resource units, and one resource unit may be assigned to one UE while the remaining two resource units may be assigned to another UE. Then, if DMRS port 7 is used for demodulation of the E-PDCCH, the first UE can use DMRS symbols of port 7 in the first resource unit for demodulation of its E-PDCCH transmission, while the second UE can use DMRS symbols of port 7 in the other two resource units for demodulation of its E-PDCCH transmission.

Alternatively, each UE can be assigned with a different DMRS port. For the previous example, DMRS port 7 within a PRB pair can be assigned to the first UE for its E-PDCCH transmission, and DMRS port 8 within a PRB pair can be assigned to the second UE for its E-PDCCH transmission. With such assignments, a channel can be estimated based on the DMRS symbols from the same port in the whole PRB pair, which may improve the channel estimation accuracy, even if the E-PDCCH of each UE is only transmitted from part of a PRB or PRB pair. If E-PDCCHs from more than two UEs are transmitted in one PRB pair, two additional scrambling sequences can be used to scramble each DMRS port (such as port 7 and 8), as in the case of MU-MIMO in Rel-10. That can allow the support of up to four E-PDCCHs from different UEs in one PRB pair.

In summary, resources of an E-PDCCH for a UE can be assigned based on resource units partitioned from a PRB pair. The resource units can be used for E-PDCCH assignment, and the same assignment procedure of the PDCCH in Rel-8 can be used for E-PDCCH assignment. DMRS symbols of a DMRS port in a resource unit or in the whole PRB pair can be assigned for demodulation of an E-PDCCH.

Several topics related to E-PDCCH operations will now be considered. The topics include E-PDCCH configuration and signaling, resource units for the E-PDCCH and their multiplexing, DMRS port assignment for E-PDCCH demodulation, E-PDCCH transmission modes, and the E-PDCCH search space and blind decoding.

Regarding E-PDCCH configuration and signaling, an E-PDCCH region can be configured by an eNB and signaled by the eNB to a UE semi-statically, for example using higher layer signaling such as RRC signaling. Alternatively, the E-PDCCH region can be signaled by the eNB to a UE dynamically, i.e., on a subframe-by-subframe basis using, for example, PHY level signaling. The region can be configured either UE-specifically or cell-specifically. There can be more than one E-PDCCH region in the same subframe. Different E-PDCCH regions could be configured together or separately.

Resource allocation for an E-PDCCH region can be either localized or distributed. In a localized case, consecutive PRBs or PRB pairs can be allocated. In a distributed case, non-consecutive PRBs or PRB pairs can be allocated. In either a localized or distributed case, a set of N_VRB Virtual RBs (VRBs) can be allocated for an E-PDCCH region and for potential E-PDCCH transmission. The resource allocation can be signaled using one of the three existing resource allocation methods for the PDSCH as specified in 3GPP TS 36.213, section 7.1.6.

The allocated VRBs can be indexed from 0 to N_VRB-1. For resource allocation type 0 or type 1, the mapping from VRB to PRB can be derived according to 3GPP TS 36.211, section 6.2.3. For resource allocation type 2, the mapping can be configured through RRC signaling.

More than one E-PDCCH region can be allocated in a subframe. In one embodiment, if two E-PDCCH regions are allocated in the same subframe and one has a localized resource allocation and the other has a distributed resource allocation, some UEs can be configured to use the E-PDCCH region with localized E-PDCCH resources, while other UEs can be configured to use the E-PDCCH region with distributed E-PDCCH resources. A UE may then only need to search for its E-PDCCH in the E-PDCCH region for which it is configured. In another embodiment, a UE may be configured with two E-PDCCH regions, one region for carrying UE-specific E-PDCCHs and the other region for carrying non-UE-specific information, such as E-PDCCHs intended for multiple UEs or an E-PHICH.

Similar to the RRC signaling for an R-PDCCH, an example of RRC signaling for an E-PDCCH region is shown below:

```
E-PDCCH-Config-r11         SEQUENCE {
    resourceAllocationType-r11      ENUMERATED {type0, type1,
type2Localized, type2Distributed, spare4, spare3, spare2, spare1},
    resourceBlockAssignment-r11     CHOICE {
        type01-r11                  CHOICE {
            nrb6-r11                BIT STRING (SIZE(6)),
            nrb15-r11               BIT STRING (SIZE(8)),
            nrb25-r11               BIT STRING (SIZE(13)),
            nrb50-r11               BIT STRING (SIZE(17)),
            nrb75-r11               BIT STRING (SIZE(19)),
            nrb100-r11              BIT STRING (SIZE(25))
        },
        type2-r11                   CHOICE {
            nrb6-r11                BIT STRING (SIZE(5)),
            nrb15-r11               BIT STRING (SIZE(7)),
            nrb25-r11               BIT STRING (SIZE(9)),
            nrb50-r11               BIT STRING (SIZE(11)),
            nrb75-r11               BIT STRING (SIZE(12)),
            nrb100-r11              BIT STRING (SIZE(13))
        },
        ...
    },
    multiplexingMethod-r11     CHOICE{ CCE, VRB, eCCE with
interleaving, eCCE without interleaving}
    demodulationRS-r11         CHOICE{
        CCEbased-r11           ENUMERATED {crs,dmrs},
        VRB based-r11          ENUMERATED {dmrs}
        eCCEbased-r11          ENUMERATED {dmrs}
    }
    TxMode     CHOICE {Txd, BF}
}
```

The parameter or information element "resourceAllocationType" represents the resource allocation used: type 0, type 1, or type 2. Value type0 corresponds to type 0, value type 1 corresponds to type 1, value type2Localized corresponds to type 2 with localized virtual RBs and type2Distributed corresponds to type 2 with distributed virtual RBs.

The parameter or information element "resourceBlockAssignment" indicates the resource block assignment bits according to 3GPP TS 36.213, section 7.1.6. Value type01 corresponds to type 0 and type 1, and the value type2 corresponds to type 2. Value nrb6 corresponds to a downlink system bandwidth of 6 RBs, value nrb15 corresponds to a downlink system bandwidth of 15 RBs, and so on.

In some embodiments, the existing RRC signaling method for R-PDCCH configuration can be reused as semi-static signaling of an E-PDCCH region configuration. The E-PDCCH region can contain localized resource allocation or distributed resource allocation or both. Multiple E-PDCCH regions can be configured in the same subframe.

Resource units for the E-PDCCH and their multiplexing will now be considered. The resource units are defined here as REs for E-PDCCH transmission. Similar to the PDCCH, an E-PDCCH can include one or multiple of such resource units. In this set of embodiments, at least three options are available: a CCE-based option, a VRB- or VRB pair-based option, and an eCCE-based or sub-PRB-based option.

In the CCE-based option, the existing definition of CCE in Rel-8 may be reused, where one CCE includes nine REGs and one REG includes four consecutive REs in an OFDM symbol, excluding REs for reference signals.

For E-PDCCH purposes, REGs may be defined over only the VRBs allocated to an E-PDCCH region and indexed from the VRB with the lowest index to the VRB with the highest index in each OFDM symbol, and may then continue in the next OFDM symbol. An E-PDCCH channel sent to a UE may include one or more CCEs.

RS for E-PDCCH demodulation are common to all UEs in the corresponding VRBs. In this option, the VRBs allocated for an E-PDCCH region cannot be shared with a PDSCH transmission unless there is no E-PDCCH transmission in a subframe.

This CCE-based option can provide good frequency diversity and can be good for carrying non-UE-specific E-PDCCHs.

Another option is to use either a VRB or a VRB pair as the minimum E-PDCCH unit for E-PDCCH transmission. An E-PDCCH for a UE may use one or more VRBs or VRB pairs. This option can be advantageous for providing both frequency selective gain and beamforming gain if channel state information is available at an eNB. It is also good for resource utilization because a VRB that is not scheduled for an E-PDCCH in a subframe can be used for PDSCH transmission. A constraint of this option is that a VRB pair is roughly equivalent to three CCEs, so it may be too coarse for E-PDCCH resource allocation.

Instead of using a CCE or a VRB/VRB pair as the minimum E-PDCCH unit for E-PDCCH transmission, a new unit may be defined, which may be referred to herein as an extended CCE, an enhanced CCE, or an eCCE. An eCCE has a finer granularity and occupies a smaller time/frequency region compared to a VRB or VRB pair. This may make it easy to use DMRS as demodulation reference signals for the E-PDCCH. It may also allow multiple E-PDCCHs to be multiplexed in a VRB/VRB pair.

There are a few options for eCCE definition in a VRB/VRB pair. In one option, a VRB/VRB pair can be divided into a number of eCCEs along the frequency domain. That is, eCCEs may be frequency division multiplexed in a VRB/VRB pair as shown in FIG. 31. In another option, eCCEs may be time division multiplexed in a VRB/VRB pair as shown in FIG. 33.

Figure 34:
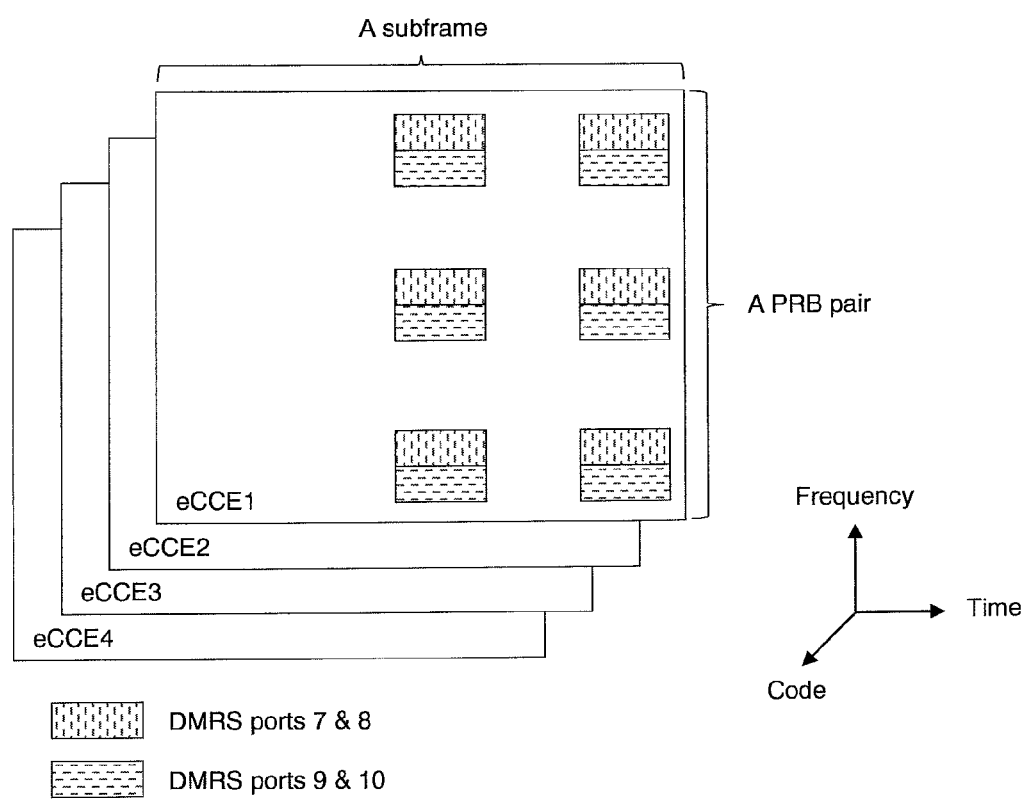
FIG. 34 is a block diagram illustrating an example of eCCE multiplexing with CDM in a PRB pair according to one embodiment.

In yet another option, the eCCEs can be code division multiplexed (CDM) in a VRB/VRB pair. In this case, each eCCE is assigned with an orthogonal cover code (OCC) over a VRB/VRB pair. When an eCCE is allocated to an E-PDCCH, every symbol of the E-PDCCH is spread by the corresponding OCC assigned to the eCCE and mapped to a group of closely located REs in the VRB/VRB pair. The groups of closely located REs for OCC spreading can be pre-defined, using similar mapping options for REG description as described above in connection with TxD resource mapping for the E-PDCCH. For convenience, such groups of REs can be called a REG. A conceptual example is shown in FIG. 34, where different eCCEs are separated by an OCC.

Figure 35:
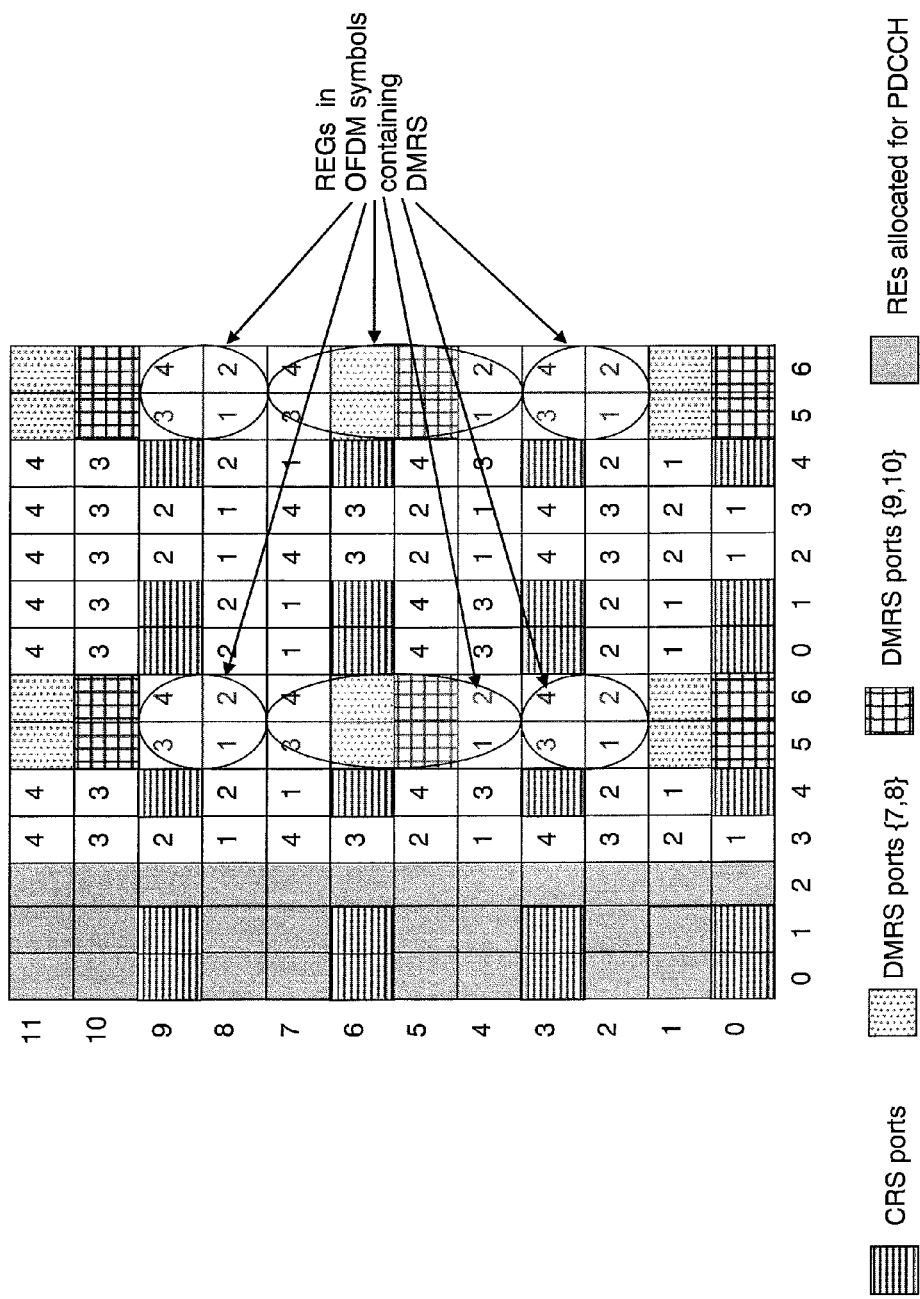
FIG. 35 is a block diagram illustrating an example of REGs in a RB pair according to one embodiment.

Although multiplexing three eCCEs in one PRB is possible, multiplexing two or four eCCEs in one PRB in CDM fashion can also be possible, as the orthogonal code only has 1 or −1 element, thus simplifying the computation in both the transmission and reception sides. An example of REG groups for the case of multiplexing four eCCEs in a RB pair is shown in FIG. 35, where a REG includes four consecutive REs marked with "1," "2," "3," and "4" in an OFDM symbol that does not contain any DMRS REs. For OFDM symbols containing DMRS REs, REGs include the REs marked in the circles. Four OCC codes can be defined for each E-PDCCH symbol to be mapped to each REG. An example of such codes is shown in Table 3. The index in each OCC code $\{w(1), w(2), w(3), w(4)\}$ can also be used to map spread symbols to the REG shown in FIG. 35. In the situation where some OFDM symbols contain REs for CSI-RS, the above mapping can be used, or alternatively, these OFDM symbols may not be used to transmit the E-PDCCH.

TABLE 3

| An example of OCC code | |
| --- | --- |
| OCC code index | OCC code: w = [w(1), w(2), w(3), w(4)] |
| 1 | [+1 +1 +1 +1] |
| 2 | [+1 −1 +1 −1] |
| 3 | [+1 +1 −1 −1] |
| 4 | [+1 −1 −1 +1] |

One advantage of the CDM-based eCCE multiplexing is that all the eCCEs can have exactly the same number of resource elements in each RB, and this may lead to simplified rate matching during encoding. That is, only the information about the number of eCCEs allocated to an E-PDCCH may be needed for rate matching during channel encoding of the E-PDCCH. In addition, better diversity over a PRB and similar channel estimation performance for each eCCE can be achieved if the CDM method of eCCE multiplexing is used.

eCCEs in an E-PDCCH region can be indexed, i.e., $\{eCCE(0), eCCE91), \ldots, eCCE(N_{eCCE}-1)\}$, where $N_{eCCE}$ is the total number of eCCEs available in the E-PDCCH region. Within a VRB/VRB pair, the index of an eCCE can ascend from lower time/frequency to higher time/frequency in the case of FDM- or TDM-based eCCE allocation within an RB. For CDM-based allocation, the index of an eCCE can be linked to the OCC code index.

An E-PDCCH for a UE may include one or more eCCEs. In cases where more than one eCCE is used, at least one of two options may be used. In a first option, consecutive eCCEs are allocated to an E-PDCCH, e.g., in closed-loop beamforming mode to achieve beamforming gain. In a second option, interleaving may be performed on the eCCEs first. That is, the indices of the eCCEs for an E-PDCCH may not be contiguous after interleaving, e.g., in open-loop beamforming or TxD mode to achieve frequency diversity gain.

In some embodiments, E-PDCCH resource units can be defined based on a CCE, a VRB/VRB pair, or an eCCE. The E-PDCCH resource units can be multiplexed based on the FDM, TDM, or CDM methods. Multiple eCCEs can be multiplexed with the CDM method in a PRB/PRB pair with an orthogonal cover code.

DMRS port assignment for E-PDCCH demodulation will now be considered. For the eCCEs defined in a VRB/VRB pair, at least three options are available in assigning or associating DMRS ports to the eCCEs. In the first option, DMRS ports are associated with UEs, in the second option, DMRS ports are associated with eCCEs, and in the third option, a DMRS RE is associated with its embedded eCCE.

In the first option, each UE can be configured with one or multiple DMRS ports. A UE performs channel estimation based on the assigned DMRS port for each of its eCCEs. The assigned DMRS port can be precoded with the same precoder as that used for the E-PDCCH data in each eCCE allocated for the E-PDCCH.

Figure 36:
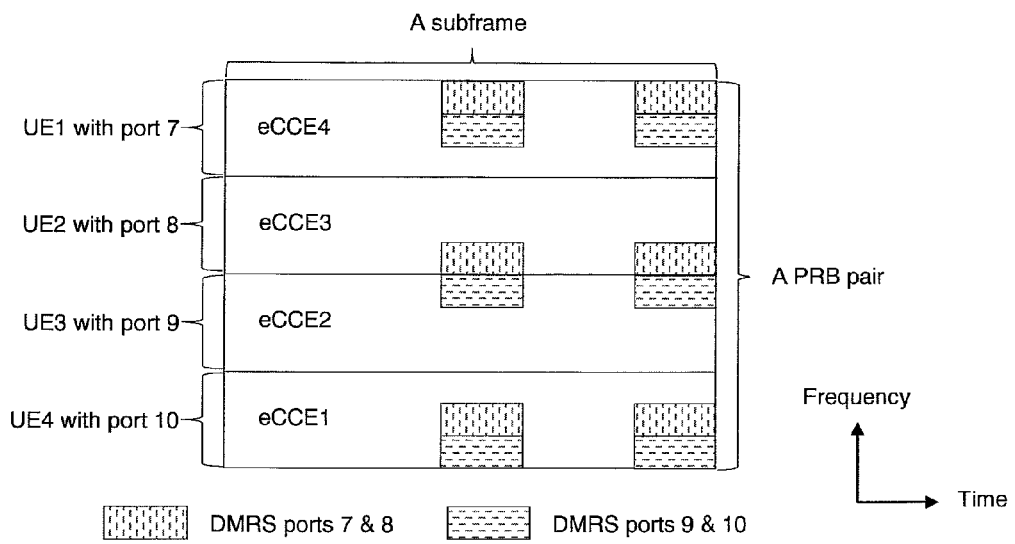
FIG. 36 is a block diagram illustrating an example of DMRS port assignment in which each eCCE in a PRB pair is allocated to a different UE and each UE is assigned with a DMRS port according to one embodiment.

An example is shown in FIG. 36, where four eCCEs are defined in a PRB pair in a FDM fashion and the four eCCEs are allocated to four E-PDCCHs, each for a different UE. In this case, each of the four eCCEs is allocated to a different UE and thus is allocated with a different DMRS port. In this option, the eNB may need to ensure that UEs allocated in the same PRB pair are assigned with different DMRS ports. In demodulation of the E-PDCCH, each UE can use all DMRS REs of the assigned DMRS port in the PRB/PRB pair for the channel estimation.

In the second option, instead of signaling the DMRS port to the UE, a fixed association can be used between a DMRS port and an eCCE in a RB/RB pair. For example, each DMRS port can be associated with an eCCE within a PRB or PRB pair. In the case of four eCCEs per PRB pair, each of the four eCCEs in a PRB pair may be associated with one of the four DMRS ports, e.g., DMRS ports 7-10. In the case of two eCCEs in a PRB pair, each of the two eCCEs may be associated with one of the two DMRS ports, e.g., DMRS ports 7 and 8. In such an embodiment, a UE can use the DMRS port associated with the eCCE to perform E-PDCCH demodulation during blind decoding.

Figure 37:
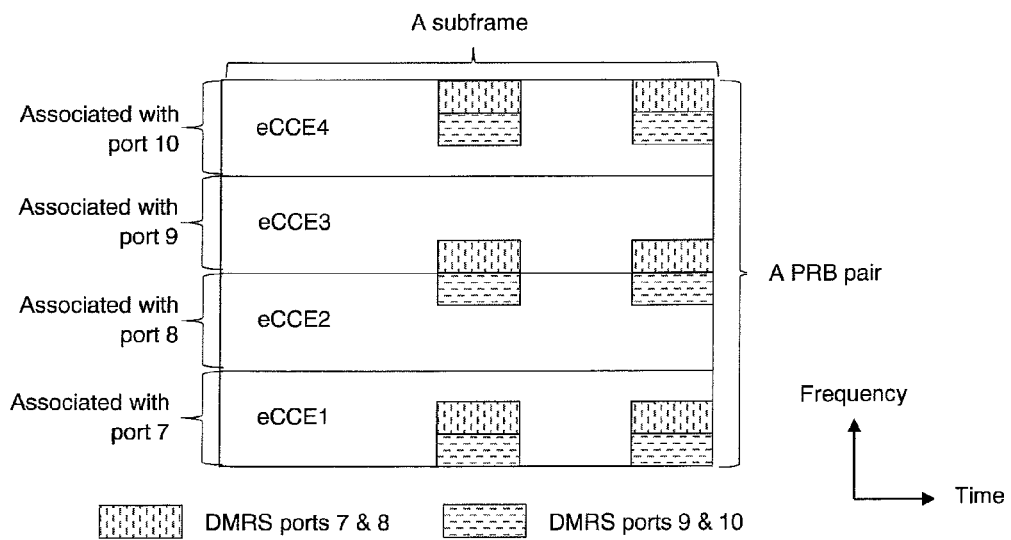
FIG. 37 is a block diagram illustrating an example of resource dependent DMRS port assignment in a PRB pair in which each eCCE is associated with a different DMRS port according to one embodiment.

In each PRB pair, the DMRS can be precoded with the same precoder as that for the E-PDCCH data in each associated eCCE. More than one eCCE in one PRB or PRB pair can be allocated to one UE. An example of this second option is shown in FIG. 37.

The first and second DMRS assignment options can also be applied to eCCEs with CDM multiplexing, though the second option can provide more flexibility in E-PDCCH scheduling in terms of E-PDCCH multiplexing in a PRB/PRB pair. In addition, there is no need to signal the DMRS port to a UE in the second option.

A difference between the first and second options may be noted. In the first option, all DMRS REs of the DMRS port assigned to a UE in a PRB/PRB pair can be used for channel estimation and demodulation of the E-PDCCH in the PRB or PRB pair for that UE. This means that the same precoding vector may be applied to all eCCEs within the same PRB/PRB pair and assigned to that UE.

For the second option, however, either the same or different precoding vectors can be applied to different eCCEs allocated to the same UE within that PRB/PRB pair, as a different DMRS port is associated with different eCCEs. Another merit of the second option, as mentioned above, is that no signaling is needed to inform the UE which DMRS port it can use. The UE may assume the corresponding DMRS ports for the demodulation of an assigned eCCE.

In the first two options, a total of four DMRS ports in a PRB or PRB pair may be needed if four eCCEs are defined in a PRB/PRB pair. For each eCCE, a DMRS port is used for its demodulation. In the third option, the demodulation of the E-PDCCH for each eCCE may use only the DMRS REs embedded in that eCCE. As a result, only one legacy DMRS port may be needed for demodulation of all eCCEs in a PRB/PRB pair, for example, DMRS port 7 as defined in Rel-10.

The DMRS transmitted in the DMRS REs within an eCCE is precoded with the same precoder as that used for the E-PDCCH data in the eCCE. The DMRS transmitted in the DMRS REs in different eCCEs of a PRB may be precoded differently if the eCCEs are allocated to different UEs or even to the same UE.

A benefit for this option is that DMRS RE overhead can be reduced compared to the first two options, as only the DMRS RE for one DMRS port is used. If necessary, two DMRS ports (for example, ports 7 and/or 8) can be assigned to each eCCE without additional overhead. The two DMRS ports may be used for supporting two-port TxD or for supporting MU-MIMO transmission for E-PDCCH.

Figure 38:
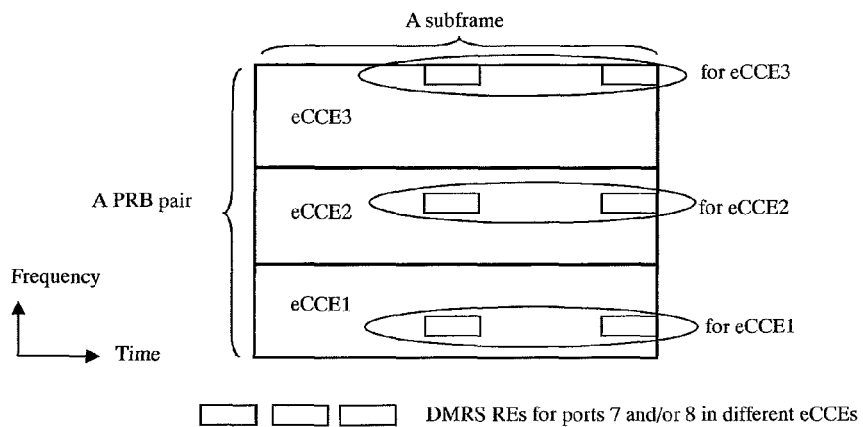
FIG. 38 is a block diagram illustrating an example of common DMRS port assignment for all UEs, in which only the DMRS within each eCCE is used for demodulation of the eCCE according to one embodiment.
Figure 39:
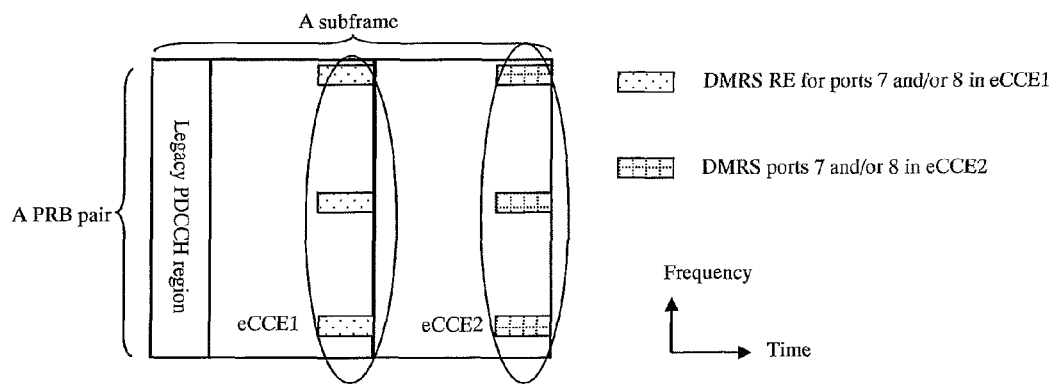
FIG. 39 is a block diagram illustrating another example of common DMRS port assignment for all UEs, where only the DMRS within each eCCE is used for demodulation of the eCCE according to one embodiment.

One possible constraint for this option is that DMRS REs may need to be present in each eCCE. So this option may be appropriate only for the case of three eCCEs per PRB pair as shown in FIG. 38 as an example, or two eCCEs per PRB pair as shown in FIG. 39.

In some embodiments, a DMRS port for E-PDCCH demodulation can be configured for a UE. In other embodiments, a unique DMRS port is associated with each eCCE in a PRB or PRB pair for the demodulation of E-PDCCH. In yet other embodiments, DMRS REs of a DMRS port embedded in an eCCE can be used for the demodulation of that particular eCCE.

E-PDCCH transmission modes will now be considered. Two possible transmission modes can be used for E-PDCCH transmission: beamforming (either close-loop or open-loop) and TxD.

For beamforming, a DMRS-based reference signal may be used. The E-PDCCH and the corresponding DMRS are precoded with the same precoder(s). This may be applicable to either VRB/VRB pair-based or eCCE-based resource allocation.

For TxD, either CRS or un-precoded DMRS may be used. This can be used for all three of the E-PDCCH resource allocation methods, i.e., CCE, VRB/VRB pair, or eCCE based approaches. For eCCE-based E-PDCCH resource allocation, either CRS or un-precoded DMRS may be used as well. The REGs within an eCCE used for 2-antenna or 4-antenna TxD can be pre-defined following the principle of using the closest neighboring REs in one block. A similar approach for REG definition as described above can be used.

The transmission mode for a UE may be semi-statically configured through RRC signaling. The configuration can be either explicit or implicit. In the case of implicit signaling, the transmission mode can be linked to, for example, the resource allocation type or resource unit for E-PDCCH scheduling. For example, the reference signal for demodulation and the transmission mode can be associated with the resource unit for E-PDCCH scheduling in the following ways. If the resource unit for scheduling is CCE-based, the reference signal for demodulation may be CRS or DMRS and the transmission mode may be TxD. If the resource unit for scheduling is VRB-based, the reference signal for demodulation may be DMRS and the transmission mode may be beamforming or TxD. If the resource unit for scheduling is eCCE-based, the reference signal for demodulation may be DMRS and the transmission mode may be beamforming or TxD.

The E-PDCCH search space and blind decoding will now be considered. In one embodiment, after being configured with an E-PDCCH region, a UE can try to detect a possible E-PDCCH in the E-PDCCH region in each subframe. Similarly to what is done for the legacy PDCCH, to reduce the number of blind decodings, a UE-specific search space can be defined for each UE in the E-PDCCH region. A UE-specific search space may include all the possible resource allocations that may be used for E-PDCCH transmission to the UE. In addition, a non-UE-specific search space may be defined in the same E-PDCCH region or in a designated different E-PDCCH region over which a multi-cast or broadcast E-PDCCH may be transmitted to a group of or all UEs in a cell. The search space may be defined according to different E-PDCCH resource allocations.

For a search space for CCE-based resource allocation, the same approach used for the PDCCH defined in Rel-8 and for the R-PDCCH defined in Rel-10 can be used. This may include the following: Four CCE aggregation levels (1, 2, 4, 8) can be defined. The number of E-PDCCH candidates for each aggregation level and the corresponding CCEs for each E-PDCCH candidate can be specified, for example, (6, 6, 2, 2) E-PDCCH candidates for aggregation levels (1, 2, 4, 8), respectively. At each CCE aggregation level, a search space can be defined to search for all the E-PDCCH candidates for the aggregation level. The CCEs of an E-PDCCH candidate for each aggregation level may be a function of the total number of CCEs in the E-PDCCH region, the subframe index, and a UE's Radio Network Temporary Identity (RNTI).

For a search space for VRB-based resource allocation, the same RB-based search space approach used for the R-PDCCH defined in Rel-10 can be used. This may include the following: Four VRB aggregation levels (1, 2, 4, 8) may be defined. The number of E-PDCCH candidates for each aggregation level and the corresponding VRBs can be specified. At each aggregation level, a search space may be defined for all the E-PDCCH candidates for the aggregation level. The VRBs of an E-PDCCH candidate for each aggregation level may be a function of the total number of VRBs in the E-PDCCH region, the subframe index, and a UE's RNTI.

For a search space for eCCE-based resource allocation, the search space can be defined using the following steps: In a first step, assume a set of $N_{VRB}^{E-PDCCH}$ VRBs is configured for an E-PDCCH region for potential E-PDCCH transmission by higher layers. The VRBs can be continuously numbered as $\{VRB_0, VRB_1, \ldots, VRB_{N_{VRB}^{E-PDCCH}-1}\}$, where $VRB_0$ corresponds to the configured VRB with the lowest index and $VRB_{N_{VRB}^{E-PDCCH}-1}$ corresponds to the configured VRB with the highest index. In a second step, the available eCCEs in the E-PDCCH region may be indexed from 0 to $N_{eCCE}-1$, i.e., $\{eCCE(0), eCCE(1), \ldots, eCCE(N_{eCCE}-1)\}$. In a third step, an E-PDCCH is transmitted on an aggregation of one or several consecutive eCCEs. An E-PDCCH consisting of L eCCEs may only start on an eCCE i fulfilling i mod L=0, where i is the eCCE number. For example, L=1, 2, 4, 8 may be defined. In a fourth step, for each aggregation level L, a number of E-PDCCH candidates, denoted as M(L) can be defined. For example, {6, 6, 2, 2} candidates may be defined for L=1, 2, 4, 8, respectively. The set of the E-PDCCH candidates to monitor at an aggregation level defines a search space at the aggregation level. In a fifth step, a search space can be a function of the aggregation level, the subframe number, the UE identity, and the total number of eCCEs in the E-PDCCH region. For example, the eCCEs corresponding to E-PDCCH candidates m of the search space at aggregation level L and subframe k can be defined as follows:

$$L\{(Y_k+m) \bmod \lfloor N_{eCCE}/L \rfloor\}+i, \ i=0, 1, \ldots, L-1; \ m=1, 2, \ldots, M(L)$$

where $Y_k$ is a variable depending on UE ID and subframe index k.

Figure 40:
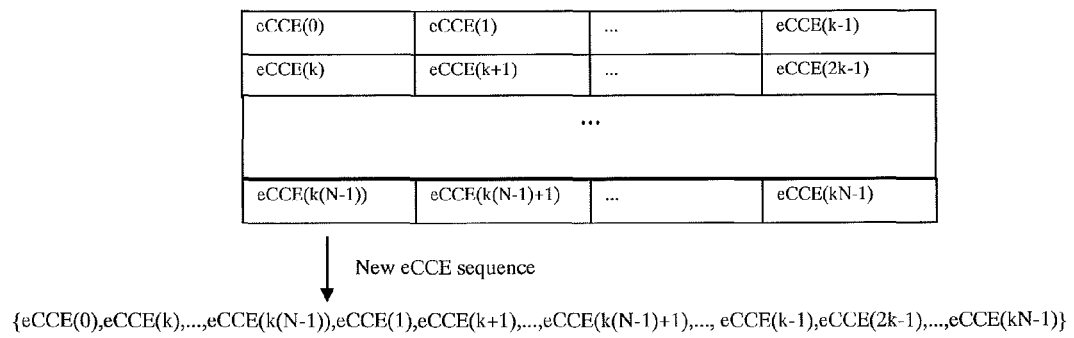
FIG. 40 is a table illustrating an example of eCCE interleaving with $N_{eCCE}=kN$ according to one embodiment.

In some embodiments, an eCCE based interleaving method for the E-PDCCH can be used to exploit a higher level of frequency diversity gain. The eCCEs may be interleaved or permuted such that eCCEs for an E-PDCCH are spread over different VRBs for increased frequency and time diversity. For example, the eCCEs can be arranged into a matrix with N rows and k columns as shown in FIG. 40, where k and N are configurable numbers that satisfy the condition of k(N−1) <$N_{eCCE}$≤kN. That is, kN is greater than or equal to the total number of eCCEs in an E-PDCCH region that is signaled to a UE. The eCCEs are written into the matrix row by row starting with eCCE(0) in column 0 of row 0. When kN>$N_{eCCE}$, "Null"s are written in the rest of the last row of the matrix after eCCE($N_{eCCE}$−1). The eCCEs are then read out column by column from the matrix starting with eCCE(0) in row 0 of column 0. Any "Null" in the matrix is ignored during the read-out. The newly rearranged eCCEs are {eCCE(p(0)), eCCE(p(1)), . . . , eCCE(p($N_{eCCE}$−1))}, where p(i) ∈ {0, 1, . . . , $N_{eCCE}$−1} is the eCCE index at the ith location of the new eCCE sequence. The eNB can then follow the above procedure in transmitting an E-PDCCH to a UE. At the UE side, the UE can follow the same procedure to search and detect the E-PDCCH.

The eCCEs {eCCE(p(i)), i=0, 1, . . . , $N_{eCCE}$−1}, after interleaving, can be mapped in increasing order of i to the VRBs in the E-PDCCH region, where, if four eCCEs are configured in a PRB, {eCCE(p(0)), . . . , eCCE(p(3))} are mapped to $VRB_0$ {eCCE(p(4)), . . . , eCCE(p(7))} are mapped to $VRB_1$, and so on, and {eCCE(p($N_{eCCE}$−4))), . . . , eCCE(p($N_{eCCE}$−1)))} are mapped to $VRB_{N_{VRB}^{E-PDCCH}-1}$.

The VRBs can be mapped to PRBs either through localized resource allocation or distributed resource allocation. In localized resource allocation, the VRBs are mapped to contiguous PRBs, while in distributed resource allocation, the VRBs are mapped to distributed PRBs across the system bandwidth.

In addition to the semi-static signaling of the E-PDCCH region to a UE as discussed previously, the E-PDCCH multiplexing method, the DMRS port assignment, and/or the E-PDCCH transmission mode can be signaled to a UE semi-statically. For example, two bits can be used to indicate the multiplexing method. That is, one of the four options can be indicated: CCE-based, VRB-based, eCCE with interleaving, or eCCE without interleaving. If CCE-based multiplexing is selected, then one bit can be used to indicate one of the two reference signals. That is, CRS or DMRS and TxD is assumed as the transmission mode. Otherwise, if VRB-based or eCCE-based multiplexing is selected, DMRS may be assumed as the reference signal and one bit may be used to indicate one of the two transmission modes, i.e., beamforming or TxD.

Figure 41:
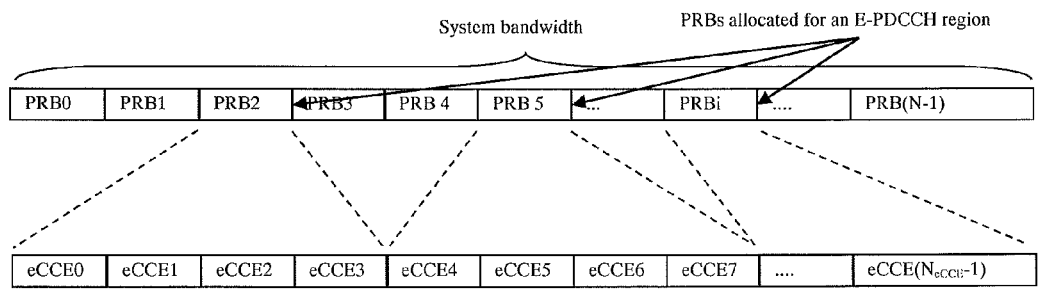
FIG. 41 illustrates an E-PDCCH region and corresponding allocated eCCEs according to one embodiment.

Further considerations regarding DMRS port assignment for the E-PDCCH will now be provided. In some embodiments, similar to the legacy PDCCH, an E-PDCCH can be transmitted on an aggregation of one or several consecutive eCCEs, which may be indicated by E-PDCCH formats. As shown in Table 4, multiple E-PDCCH formats can be supported, and this may provide enough flexibility between performance and resources. As shown in FIG. 41, the eCCEs available in an E-PDCCH region can have an index from 0 to N_eCCE−1, i.e., {$eCCE_0$, $eCCE_1$, . . . , $eCCE_{N_{eCCE}-1}$}, where N_eCCE is the total number of eCCEs in an E-PDCCH region configured for the UE. An E-PDCCH consisting of L consecutive eCCEs, which is also called aggregation level L, may only start at an eCCE fulfilling i mod L=0, where i is the eCCE index.

TABLE 4

Example of E-PDCCH formats

| E-PDCCH format | Number of eCCEs |
|---|---|
| 0 | 1 |
| 1 | 2 |
| 2 | 4 |
| 3 | 8 |

In one embodiment, a UE can monitor a set of E-PDCCH candidates for control information in every non-DRX subframe, where monitoring implies attempting to decode each of the E-PDCCHs in the set according to all the monitored DCI formats. A search space is defined for each UE, which includes a set of E-PDCCH candidates with different aggregation levels in the range of $\{1, 2, 4, 8\}$.

The starting eCCE position of an E-PDCCH candidate for a UE could be linked to its UE ID, i.e., RNTI, and the subframe index. When an UE is configured to monitor the E-PDCCH, it can determine the starting eCCE position of each E-PDCCH candidate first, and then it will try to decode each of the E-PDCCH candidates.

One difference between decoding a legacy PDCCH and decoding an E-PDCCH is related to the reference signals. For a PDCCH, CRS may be used for channel estimation, while for eCCE, DMRS ports may be used.

There can be generally two ways to assign the DMRS ports to eCCEs; one is explicit and the other is implicit. In the case of explicit assignment, RRC signaling can be used to tell a UE which DMRS port or ports to use for E-PDCCH decoding. In this approach, the same DMRS port or ports can be used by a UE during the configuration. A drawback of this approach is that UEs assigned with the same DMRS port or ports cannot be scheduled to transmit an E-PDCCH on the same PRBs. This could introduce some scheduling constraints and thus prevent efficient use of the eCCE resources.

In the case of implicit assignment, a DMRS port can be linked to the eCCE resources. For example, when an UE is trying to decode an E-PDCCH on an eCCE, the UE may automatically know which DMRS port it should use to decode the eCCE. Some implicit ways of signaling DMRS ports will now be described.

The assignment of DMRS to eCCE may need to consider a number of requirements, such as whether such an assignment is implicit or explicit and the support of SU-MIMO and MU-MIMO. A goal may be to provide enough flexibility and yet maximize the usage of the DMRS ports.

Figure 42:
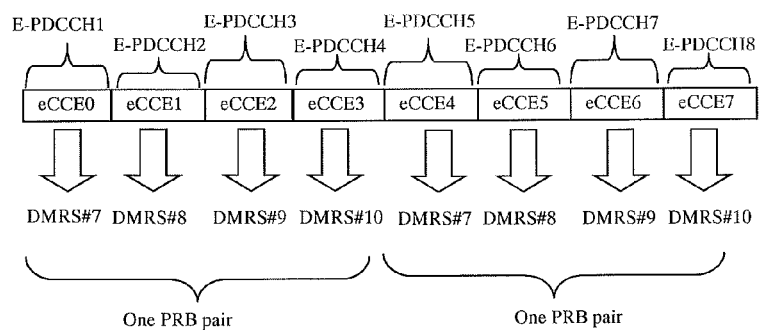
FIG. 42 illustrates an example of DMRS port and eCCE association according to one embodiment.

In the following description, it is assumed that there are four DMRS ports in one PRB pair as well, namely DMRS port 7-10. It should be noted that the DMRS ports mentioned here are transmitted in each PRB pair containing the eCCEs allocated to an UE. Considering that multiple eCCEs could be allocated to one E-PDCCH, in which one DMRS port is enough to decode the E-PDCCH, an implicit signaling of the DMRS port for decoding such an E-PDCCH could be that, for aggregation level L=1, i.e., if one eCCE, $eCCE_m$ ($m\in\{0, 1, \ldots, N_{eCCE}-1\}$) is allocated to an E-PDCCH, the DMRS port could be allocated as follows:

$$\text{DMRS port number} = m \bmod M_{eCCE} + 7$$

where $M_{eCCE}$ is the number of eCCEs in a PRB pair, which could be four, for example. With this implicit assignment rule, if each E-PDCCH is allocated with one eCCE, then the association between DMRS port and corresponding eCCE could be as shown in FIG. 42, where each eCCE is associated with a distinct DMRS port.

For aggregation level L>=2, i.e., if a set of $\{eCCE_m, eCCE_{m+1}, \ldots, eCCE_{m+L-1}\}$ are allocated to an E-PDCCH, where $m\in\{0, 1, \ldots, N_{eCCE}-1\}$ and m mod L=0, the DMRS ports could be assigned as $$\text{DMRS port number} = f(m, m+1, \ldots, m+L-1) \bmod M_{eCCE} + 7$$

where the aggregation level L can be, for example, 1, 2, 4, 8, ..., $2^n$, wherein n is an integer. $f(\ldots)$ is a function of eCCE indices allocated to an E-PDCCH.

At least two options are available for implicit DMRS port signaling. In a first option, the max(...) function is used in the above implicit association to derive the DMTS port as follows:

$$\text{DMRS\_port} = \max(m, m+1, \ldots, m+L-1) \bmod M_{eCCE} + 7$$

$$= (m+L-1) \bmod M_{eCCE} + 7$$

where the aggregation level L can be, for example, 1, 2, 4, 8, ..., $2^n$, wherein n is an integer. m is the eCCE index, $m\in\{0, 1, \ldots, N_{eCCE}-1\}$ and m mod L=0. $M_{eCCE}$ is the number of eCCEs in a PRB pair and $M_{eCCE}=4$ is assumed in the following discussion.

Figure 43:
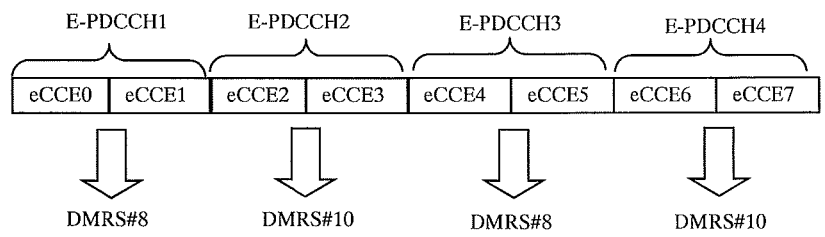
FIG. 43 illustrates an example of DMRS port assignment for L=2 with different eCCE allocations for an E-PDCCH according to one embodiment.

In the case when multiple eCCEs are allocated to the same E-PDCCH, according to the above relation, one DMRS port may be assigned, which may correspond to the eCCE with the largest index. An example for L=2 is shown in FIG. 43 and for L=4 in FIG. 44.

Figure 45:
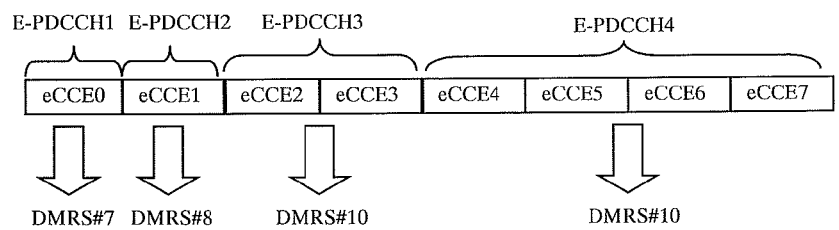
FIG. 45 illustrates an example of DMRS port assignment for L=1/2/4 with different eCCE allocations for an E-PDCCH according to one embodiment.

An example of DMRS port assignments for E-PDCCHs with different aggregation levels is shown FIG. 45.

Figure 46:
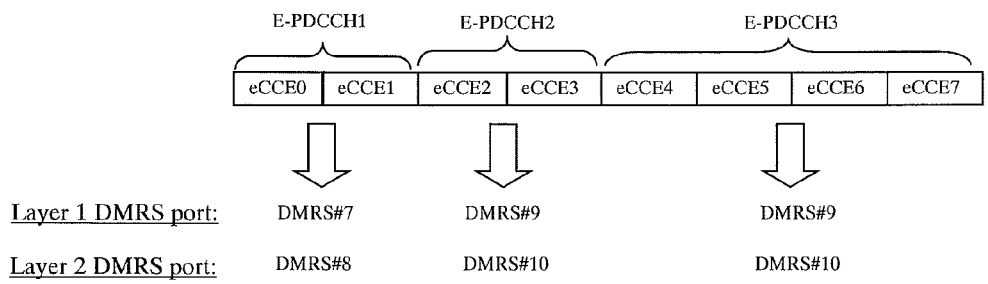
FIG. 46 illustrates an example of DMRS ports assignment for E-PDCCHs supporting SU-MIMO according to one embodiment.

When L>=2, if SU-MIMO with two layers is supported for E-PDCCH transmission, then the above formula could be extended to include both layers:

$$\text{DMRS\_port}^k = \max(m, m+1, \ldots, m+L-1) \bmod M_{eCCE} + 6 + k - 1$$

$$= (m+L-1) \bmod M_{eCCE} + 5 + k$$

where $\text{DMRS\_port}^k$ is the DMRS port for layer k, k=1, 2. The aggregation level L can be, for example, 1, 2, 4, 8, ..., $2^n$, wherein n is an integer. m is the eCCE index, $m\in\{0, 1, \ldots, N_{eCCE}-1\}$ and m mod L=0. $M_{eCCE}$ is the number of eCCEs in a PRB pair and $M_{eCCE}=4$ is assumed in the following discussion. An example is shown in FIG. 46, where two-layer SU-MIMO transmission is performed by all three E-PDCCHs.

It can be seen that, in the situation where there is only one eCCE assigned to an E-PDCCH, it may be difficult to assign different orthogonal DMRS ports for different layers according to the implicit DMRS assignment rule, and therefore, SU-MIMO transmission may not be scheduled.

Figure 47:
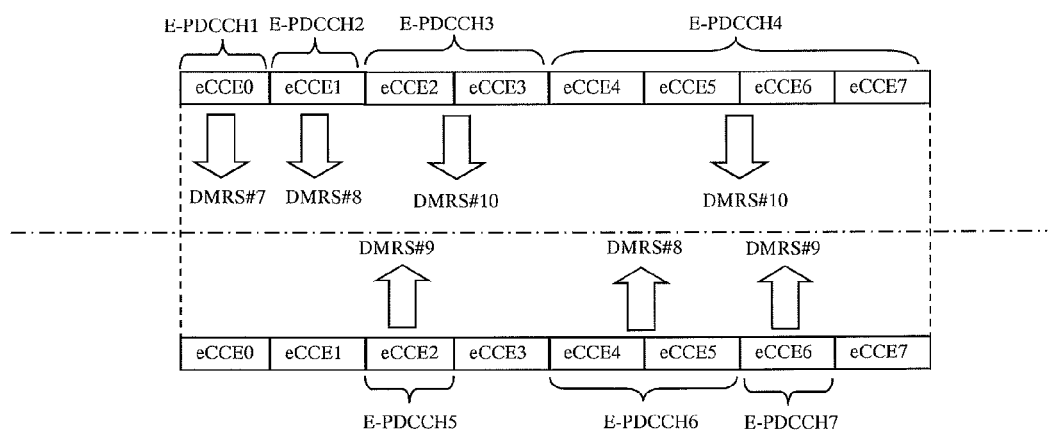
FIG. 47 illustrates an example of MU-MIMO for E-PDCCH according to one embodiment.

Multi-user MIMO (MU-MIMO) may also be supported for E-PDCCH transmission. That is, two or more UEs may share or partially share the same eCCE or eCCEs for E-PDCCH transmission. The same DMRS port assignment rule can be used, and the MU-MIMO operation is transparent to a UE. That is, a UE may not be aware of the eCCE sharing with other UEs. An example is shown in FIG. 47, where eCCE2 is shared by both E-PDCCH3 and E-PDCCH5. Similarly, eCCE4 and eCCE5 are shared by E-PDCCH4 and E-PDCCH6, and eCCE6 is shared by E-PDCCH4 and E-PDCCH7.

In a second option for implicit DMRS port signaling, min( . . . ) could be used to derive the DMRS ports as follows:

$$\text{DMRS\_port} = \min(m, m+1, , , , m+L-1) \mod M_{eCCE} + 7$$

$$= (m+L-1) \mod M_{eCCE} + 7$$

where the aggregation level L can be, for example, 1, 2, 4, 8, . . . , $2^n$, wherein n is an integer. m is the eCCE index, m∈{0, 1, . . . , $N_{eCCE}$−1} and m mod L=0. $M_{eCCE}$ is the number of eCCEs in a PRB pair and $M_{eCCE}$=4 is assumed in the following discussion.

For this case, if multiple eCCEs are allocated to one E-PDCCH, the DMRS port corresponding to the smallest eCCE index could be used for decoding the E-PDCCH.

Figure 48:
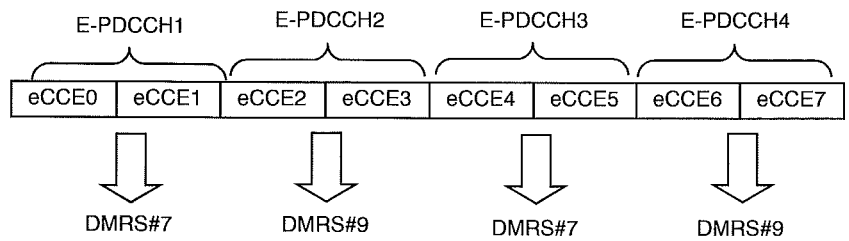
FIG. 48 illustrates an example of DMRS port assignment for L=2 with different eCCE allocations for an E-PDCCH according to one embodiment.

An example for L=2 is shown in FIG. 48. Compared to FIG. 43, it can be seen that DMRS port #7 is used for E-PDCCH1 and E-PDCCH3 instead of DMRS port #8. Similarly, DMRS port #9 is used for E-PDCCH2 and E-PDCCH4 instead of DMRS port#10.

Figure 44:
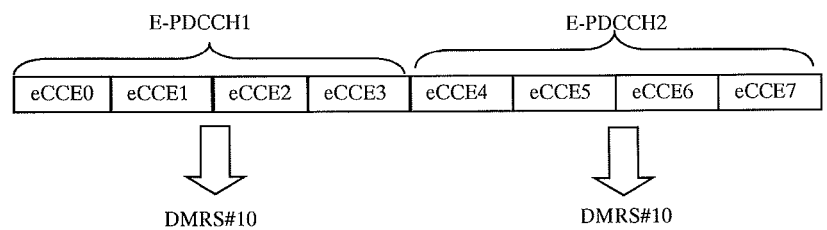
FIG. 44 illustrates an example of DMRS port assignment for L=4 with different eCCE allocations for an E-PDCCH according to one embodiment.
Figure 49:
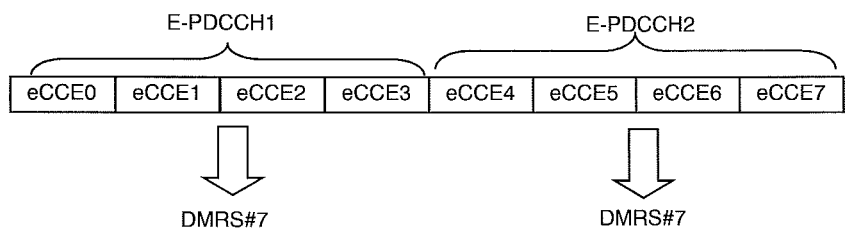
FIG. 49 illustrates an example of DMRS port assignment for L=4 with different eCCE allocations for an E-PDCCH according to one embodiment.

FIG. 49 shows an example of DMRS port allocation for aggregation level 4, i.e., L=4, with this second option. It can be seen that DMRS port #7 is allocated to E-PDCCH1 and E-PDCCH2 instead of DMRS port#10 as shown in FIG. 44 for the first option.

Figure 50:
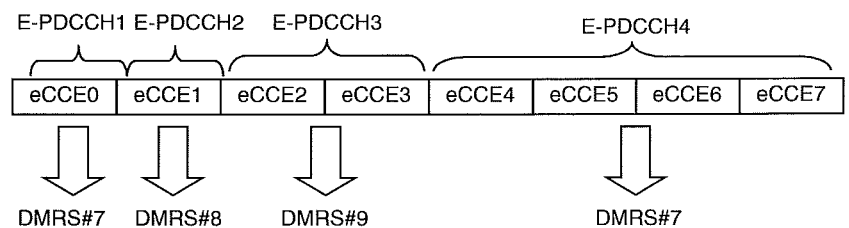
FIG. 50 illustrates an example of DMRS port assignment for L=1/2/4 with different eCCE allocations for an E-PDCCH according to one embodiment.

An example of DMRS port assignments with the second option for E-PDCCHs with different aggregation levels is shown in FIG. 50.

Figure 51:
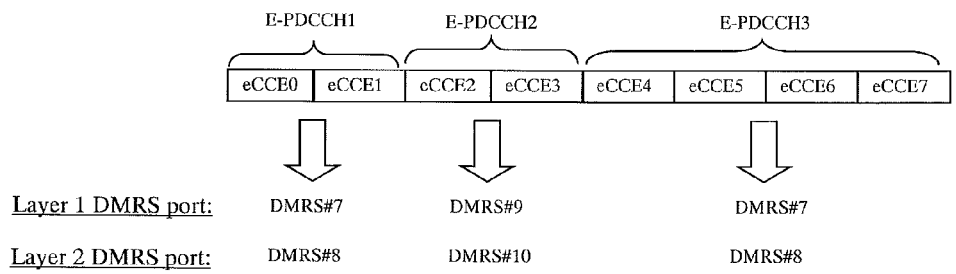
FIG. 51 illustrates an example of DMRS port assignment for E-PDCCHs supporting SU-MIMO according to one embodiment.

To support SU-MIMO transmission for E-PDCCH, the formula can be extended for L>1 as follows:

$$\text{DMRS\_port}^k = \min(m, m+1, \ldots, m+L-1) \mod M_{eCCE} + 6+k = (m) \mod M_{eCCE}+6+k;\ k=1,2.$$

where DMRS_port$^k$ is the DMRS port for layer k, k=1,2. The aggregation level L can be, for example, 1, 2, 4, 8, . . . $2^n$, wherein n is an integer. m is the eCCE index, m∈{0, 1, . . . , $N_{eCCE}$−1} and m mod L=0. $M_{eCCE}$ is the number of eCCEs in a PRB pair and $M_{eCCE}$=4 is assumed in the following discussion. An example is shown in FIG. 51.

Figure 52:
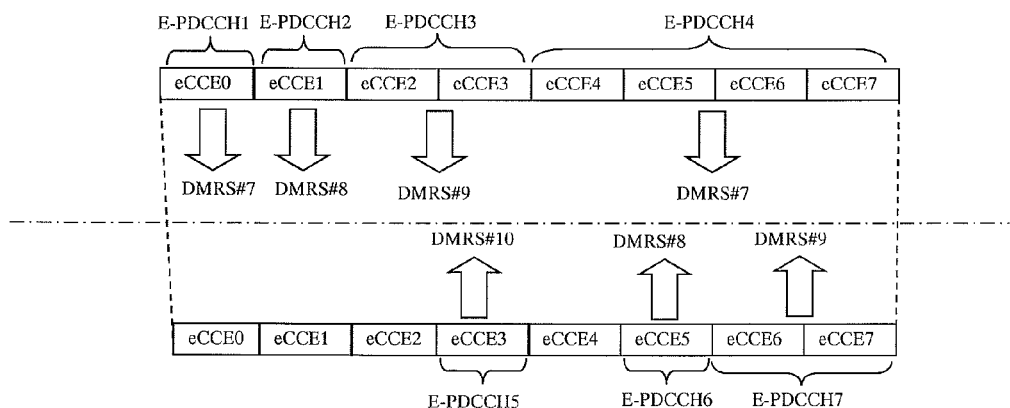
FIG. 52 illustrates an example of MU-MIMO for E-PDCCH according to one embodiment.

MU-MIMO transmission for E-PDCCH could also be scheduled for this option. An example is shown in FIG. 52, where eCCE3 is shared by E-PDCCH3 and E-PDCCH5, eCCE5 is shared by E-PDCCH4 and E-PDCCH6, and eCCE6 and eCCE7 are shared by E-OPDCCH4 and E-PDCCH7. Compared with FIG. 47, it can be seen that the eCCEs used for pairing two E-PDCCHs are different. This is because the implicit rules for DMRS assignment that need to be followed to assign different DMRS ports for each E-PDCCH are different.

Figure 53:
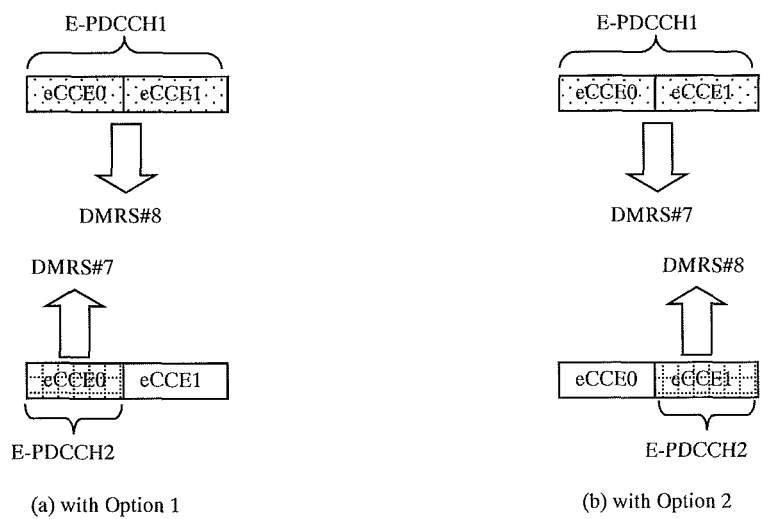
FIG. 53 illustrates a comparison between implicit DMRS signaling options according to one embodiment.

A comparison between the first and second options for implicit DMRS port signaling is now provided. As described above, the two options can be used as implicit signaling rules to associate a DMRS port for decoding an E-PDCCH. They can also be used to support SU-MIMO and MU-MIMO transmission of an E-PDCCH. There are some subtle differences between these two options. One example is shown in FIG. 53, where in MU-MIMO transmission of two E-PDCCHs, E-PDCCH1 contains two eCCEs (i.e., aggregation level 2) and E-PDCCH2 contains one eCCE (i.e., aggregation level 1). If the implicit rule in the first option is used, E-PDCCH2 could be scheduled on eCCE0 and could use DMRS port 7. However, for the second option, as DMRS port 7 is already used for E-PDCCH1, E-PDCCH2 can only be scheduled on eCCE1 and use DMRS port 8. As for AL=1, the E-PDCCH candidates may start from eCCE0. The second option may require the UE with E-PDCCH2 to conduct blind decoding on eCCE0 first and then on eCCE1, resulting in one more blind decoding in order to detect its E-PDCCH on eCCE1. In the case of the first option, E-PDCCH2 would be decoded on eCCE0. Therefore, it seems that the first option may be better than the second option.

In some embodiments, other methods can be used for allocating DMRS ports. Assume that $N_{eCCE}$ is the total number of eCCEs configured in a subframe for a UE and that L is the aggregation level. In addition, assume that $P_L$ is the number of E-PDCCH candidates at the aggregation level L. The indices of eCCEs {$eCCE_m, eCCE_{m+1}, \ldots, eCCE_{m+L-1}$} contained in the E-PDCCH candidate p p=0, 1, . . . , $P_L$−1) at the aggregation level L in subframe k are given by:

$$m = L \cdot (Y_k + p) \mod \lfloor N_{eCCE}/L \rfloor$$

where $Y_k = (A \cdot Y_{k-1}) \mod D$, $Y_{k-1} = n_{RNTI}$, A=39827, D=65537 k=⌊$n_s$/2⌋. $n_{RNTI}$ is the UE ID, i.e., RNTI, and $n_s$ ($n_s$=0, 1, . . . , 19) is the slot number.

For aggregation L>1, a DMRS port associated with an E-PDCCH can be derived by a combination of E-PDCCH resource and UE configuration as follows:

$$\text{DMRS port\#} = m \mod(M_{eCCE}) + 7 + P_{offset}$$

where $P_{offset} \in \{0,1\}$ can be either implicitly or explicitly signaled to a UE.

Figure 58:
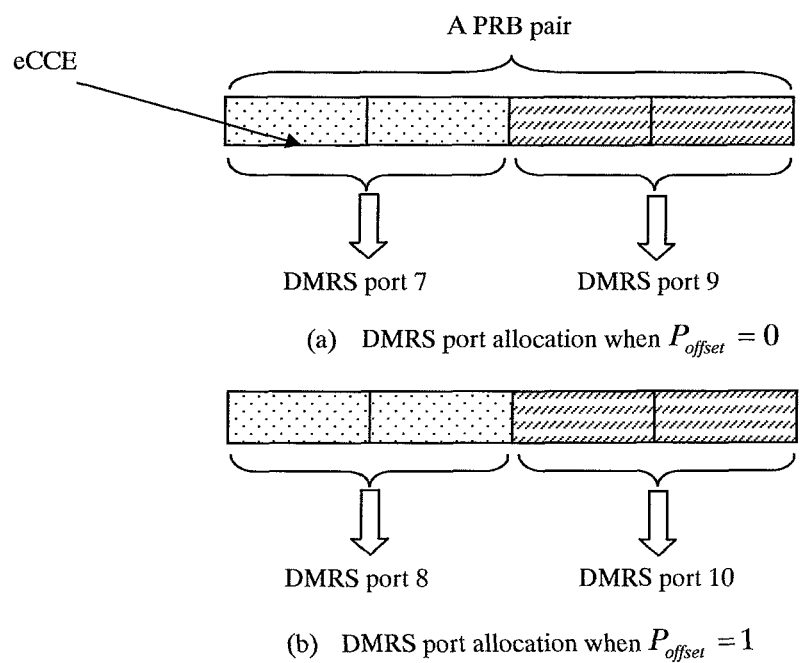
FIG. 58 illustrates DMRS port allocation for L=2 according to one embodiment.

If $P_{offset}$=0 is configured, for L=2, either DMRS port 7 or port 9 would be allocated to an E-PDCCH, depending on the staring eCCE location of the E-PDCCH in a PRB pair, i.e., the value of m mod($M_{eCCE}$). On the other hand, if $P_{offset}$=1 is configured, then either DMRS port 8 or port 10 would be allocated to an E-PDCCH candidate. This is shown in FIG. 58. Note that the allocation for $P_{offset}$=0 is equivalent to the first option discussed above, and the allocation for $P_{offset}$=1 is equivalent to the second option discussed above.

Figure 59:
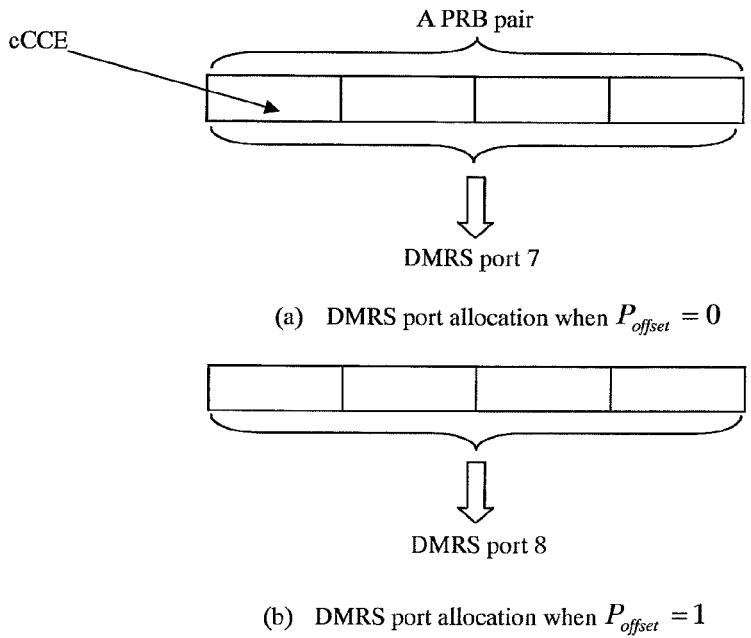
FIG. 59 illustrates DMRS port allocation for L=4 according to one embodiment.
Figure 60:
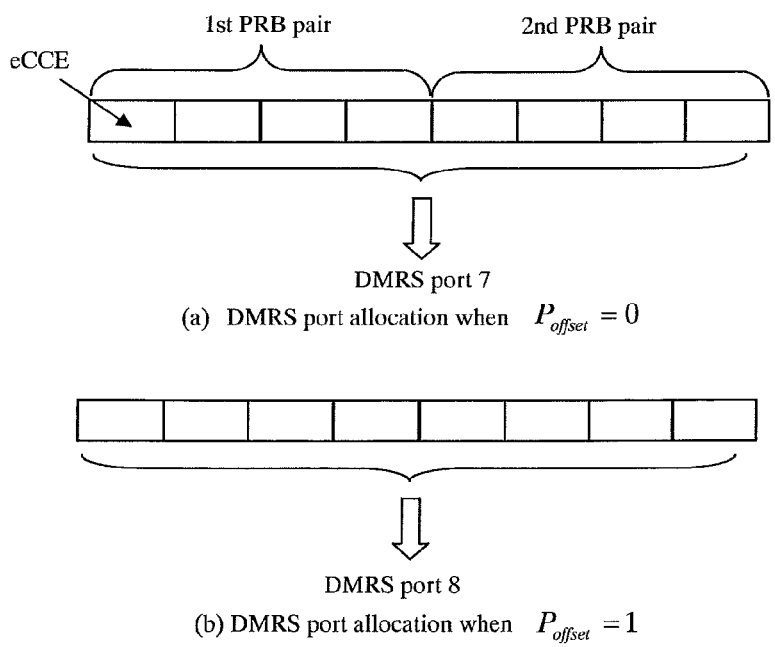
FIG. 60 illustrates DMRS port allocation for L=8 according to one embodiment.

For L=4 and L=8, the allocation is shown in FIG. 59 and FIG. 60, respectively. It can be seen that either DMRS port 7 or port 8 is allocated, depending on whether $P_{offset}$=0 or $P_{offset}$=1.

There can be a number of alternatives to determine and/or signal the UE configuration $P_{offset}$. In a first alternative, $P_{offset}$ (or 7+$P_{offset}$) is explicitly signaled to a UE by RRC. In this case, the eNB directly controls the DMRS port assignment to a UE, and the assignment can be changed semi-statically.

In a second alternative, $P_{offset}$ is implicitly derived from UE ID as follows:

$$P_{offset} = n_{RNTI} \mod 2$$

where $n_{RNTI}$ is assigned by the eNB. In this alternative, there is no additional signaling required. In certain cases, since the assignment is linked to the RNTI, the assignment may not be changed after the RNTI is assigned. Some UEs may not be paired for MU-MIMO transmission for E-PDCCH if they have the same $P_{offset}$ value.

In a third alternative $P_{offset}$ is implicitly derived from $Y_k$ as follows:

$$P_{offset} = Y_k \mod 2$$

This option may not require additional signaling. Furthermore, since $Y_k$ changes from subframe to subframe, the DMRS port assignment can also change from subframe to subframe. If two UEs cannot be paired in one subframe for MU-MIMO transmission for E-PDCCH, they can be paired for such operation in a different subframe, where they have different $P_{offset}$ values and their search spaces overlap. This may be an improvement to the second alternative.

Note that, instead of signaling a value of $P_{offset}$ that corresponds to a DMRS port number, a value of $P_{offset}$ may be signaled to a UE to indicate the pre-defined set of DMRS ports. For example, with $P_{offset}=0$ and $P_{offset}=1$, two sets of DMRS ports can be defined at each aggregation level, and one bit can be used to signal which set is to be used by a UE for E-PDCCH transmission. For aggregation level two, the two sets of DMRS ports are {7,9} and {8,10}. One of the two sets can be signaled to a UE by using one bit. If the bit is zero, {7,9} is selected; otherwise {8,10} is selected. One of the two DMRS ports within the selected set is then assigned to an E-PDCCH according to the resource location of the E-PDCCH.

Similarly, for an aggregation level greater than two, the two sets of DMRS ports are {7} and {8}. In this case, each set contains only one port. One of the two sets can be signaled to a UE by using the same one bit. If the bit is zero, {7} is selected; otherwise if the bit equals to one, {8} is selected.

Figure 61:
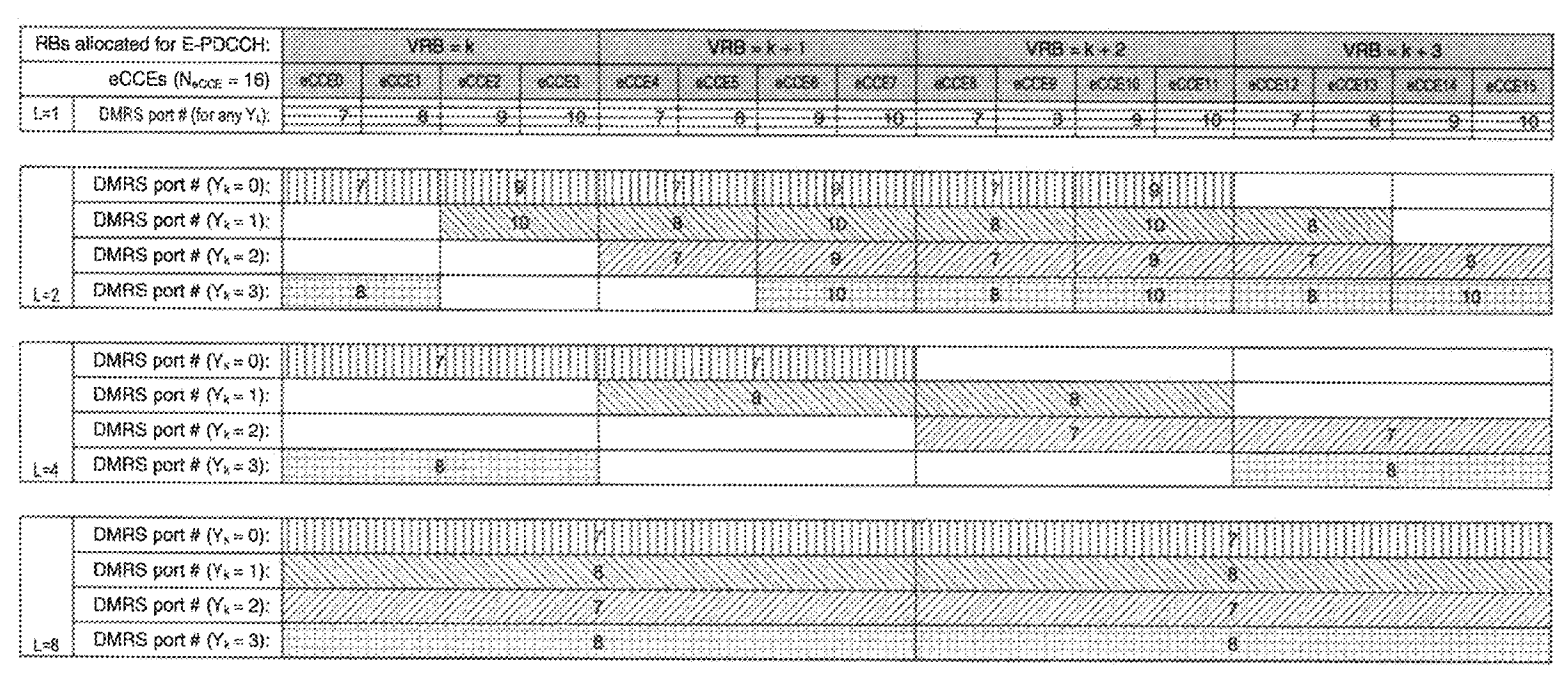

An example of DMRS port allocation based on the third alternative is shown in FIG. 61, where for aggregation levels greater than one, the DMRS port allocation depends on $Y_k$.

In summary, for an aggregation level greater than one, three UE configurations can be used to determine the DMRS port association with a corresponding an E-PDCCH transmission in conjunction with an E-PDCCH resource. In a first alternative, the UE configuration is semi-statically signaled to a UE through RRC signaling, in a second alternative, the UE configuration is derived from the UE's RNTI, and in a third alternative, the UE configuration is derived from the UE's RNTI and subframe index.

Based on the above implicit DMRS signaling rules, the eNB could schedule E-PDCCH transmission on different eCCEs, and also use the associated DMRS ports for its transmission. That means the same beamforming vector could be applied to all eCCEs assigned to the E-PDCCH and corresponding DMRS ports. SU-MIMO and MU-MIMO transmission of the E-PDCCH could also be scheduled. It should be noted that, as seen from previous examples, SU-MIMO and MU-MIMO transmission of the E-PDCCH may not always be able to be scheduled on every eCCE, as orthogonal DMRS ports within a resource block or resource block pair may not be available for that purpose due to limited DMRS port resources and the implicit DMRS allocation rules. But it is believed that loss due to such a limitation could be small. In general, there may be a compromise between complexity in DMRS port signaling and flexibility in scheduling the E-PDCCH. The options discussed above can achieve such a compromise in a favorable manner.

At the UE side, the UE may need to decode the E-PDCCH using the associated DMRS port inferred by the implicit rule. The UE is not aware of how many eCCEs are used for its E-PDCCH. That is, the UE may not know the AL of the E-PDCCH and whether or not MU-MIMO transmission is used for its E-PDCCH. The UE may need to try to decode all candidate E-PDCCHs at every aggregation level. For SU-MIMO transmission of the E-PDCCH, the UE could be configured semi-statically or could find out this information blindly by trying to decode the E-PDCCH in both cases, i.e., when SU-MIMO is used or when SU-MIMO is not used.

Figure 54:
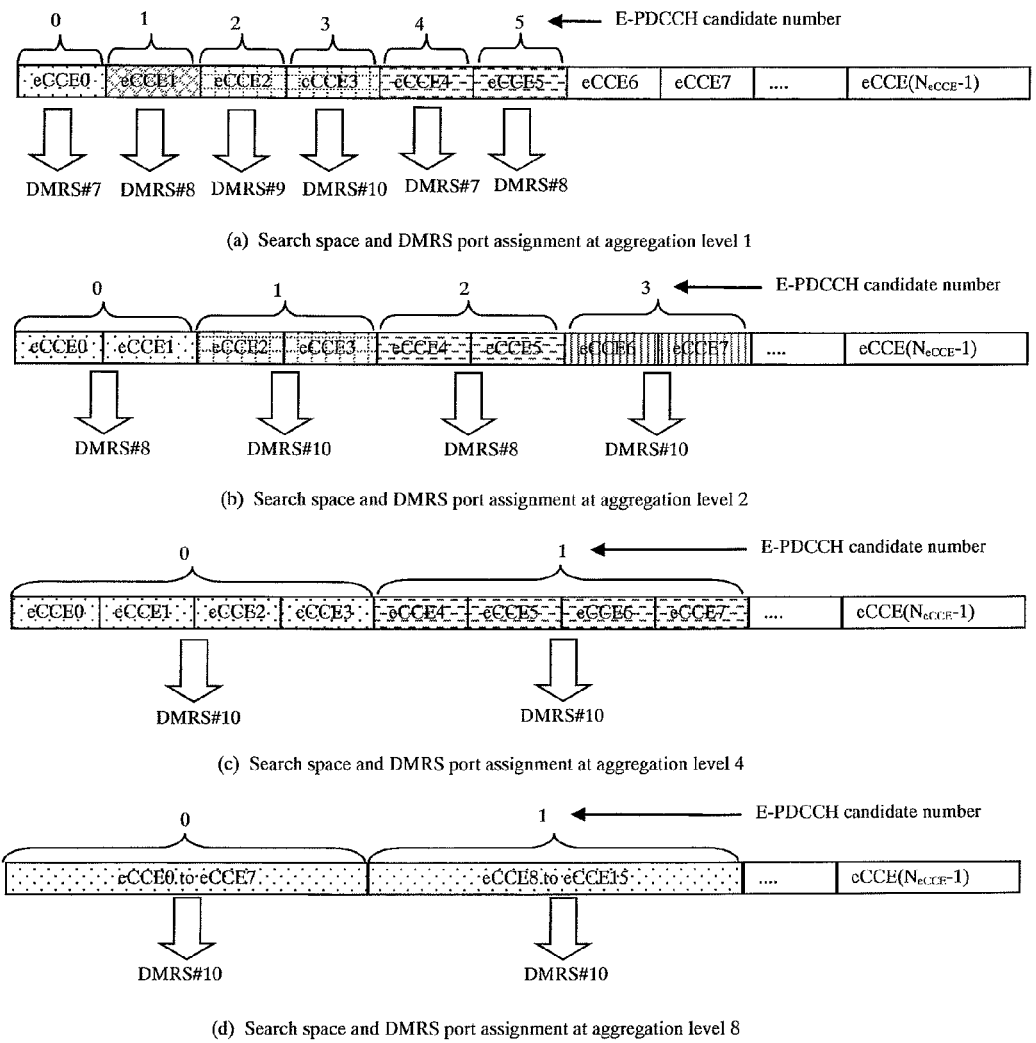
FIG. 54 illustrates an E-PDCCH search space and DMRS port assignment for different ALs according to one embodiment.

All the E-PDCCH candidates at an aggregation level form a search space for a UE at the aggregation level. The size of each search space, i.e., the number of E-PDCCH candidates, may be predefined. For example, six E-PDCCH candidates may be specified for aggregation level 1, four candidates may be specified for aggregation level 2, and two candidates may be specified for aggregation levels 4 and 8. The size of the search spaces determines the total number of blind decodings a UE may need to perform in order to receive an E-PDCCH. FIG. 54 illustrates an example of a search space of an E-PDCCH for a UE at different ALs. Option 1 is applied for DMRS port assignment. There can be six E-PDCCH candidates for AL=1, four E-PDCCH candidates for AL=2, and two E-PDCCH candidates for AL=4 and AL=8. The UE could search such candidates and use a corresponding DMRS port to decode its E-PDCCH based on the implicit rule.

To facilitate the searching and better utilize the implicit DMRS port assignment rule, some options are reiterated for consideration here. The starting position of an E-PDCCH candidate should align with the integer multiples of eCCEs contained in its AL. Namely, the starting eCCE index m should satisfy $m \in \{0, 1, \ldots, N_{eCCE}-1\}$ and m mod L=0. If an E-PDCCH is transmitted across multiple PRB pairs, for example, for AL=8, either the same or different precodings may be used for the DMRS port and the E-PDCCH in different PRB pairs. The option of using the same precoding may improve channel estimation under a flat fading channel. Either the same precoding vector or different precoding vectors may be assumed by the UE. When orthogonal DMRS ports are not available, MU-MIMO transmission of E-PDCCH could be supported for two E-PDCCHs with the same DMRS port but with different DMRS scrambling sequences. The seed for different DMRS scrambling sequences could be signaled to the UE with UE-specific higher layer signaling in a semi-static manner. The implicit DMRS port assignment may be applicable to localized transmission only where consecutive eCCEs are allocated to an E-PDCCH. For distributed transmission, non-consecutive eCCEs may be allocated to an E-PDCCH. In this case, due to the limitation of the DMRS resources and characteristics of the distributed E-PDCCH transmission, it may be beneficial to support only a single layer E-PDCCH transmission. For the distributed E-PDCCH transmission based on the eCCE (namely, the smallest unit of distributed E-PDCCH transmission is one eCCE), a separate DMRS port can be used for each eCCE of an E-PDCCH. For example, the DMRS port for eCCE#m allocated to an E-PDCCH can be derived as follows:

$$\text{DMRS\_port\_for\_eCCE}m = (m) \bmod M_{eCCE} + 7$$

where m is the eCCE index. For example, if an E-PDCCH consists of four eCCEs {eCCE0, eCCE5, eCCE10, eCCE15}, then the corresponding DMRS ports can be obtained as DMRS ports {7, 8, 9, 10}, respectively. For MU-MIMO transmission of the E-PDCCH, different DMRS scrambling sequences can be used for different E-PDCCHs. The DMRS scrambling sequence could be signaled to the UE with UE-specific higher layer signaling in a semi-static manner.

In summary, implicit DMRS port assignment may be used to assign a DMRS port for each E-PDCCH. The DMRS ports assigned to an E-PDCCH are a function of eCCEs assigned to the E-PDCCH. The DMRS ports assigned to the E-PDCCH could be associated to the largest assigned eCCE index in a PRB pair or could be associated to the smallest assigned eCCE index in a PRB pair. SU-MIMO and MU-MIMO transmission for E-PDCCH could be supported with orthogonal DMRS ports assigned to different layers of the E-PDCCH from the same UE or different E-PDCCHs from different UEs.

Referring back to FIGS. 38 and 39, for the eCCE definitions shown in FIG. 38 and FIG. 39, the DMRS for an eCCE can be only mapped to the DMRS REs within the time and frequency range of the eCCE. An example is shown in FIG. 38.

In one embodiment, whether DMRS port 7 or port 8 is used by a UE for E-PDCCH demodulation can be semi-statically signaled to the UE by the eNB, for example using RRC signaling. The scrambling ID associated with the DMRS port can also be semi-statically signaled to the UE. The same scrambling ID can be used for all UEs with a cell.

The benefits and features of this approach can include the following: Only DMRS ports 7 and 8 are needed for E-PDCCH demodulation purposes; thus DMRS overhead is reduced compared to cases where DMRS ports 7 to 10 are used. The same DMRS port may be assumed for all eCCEs allocated to the same UE. UEs with the same DMRS port can still be multiplexed within the same PRB pair, as different DMRS REs are used by different UEs. Therefore, there is no scheduling constraint within a PRB pair in terms of which UEs can be scheduled together. Any UEs can be scheduled within a PRB pair. MU-MIMO can be supported for two UEs assigned with different DMRS ports. For example, if DMRS port 7 is assigned to UE1 and DMRS port 8 is assigned to UE2, then the two UEs can be paired to perform MU-MIMO on the same eCCEs. MU-MIMO with orthogonal ports can be supported for all aggregation levels and is not limited to certain aggregation levels. SU-MIMO can be supported by assigning both of the DMRS ports to the same UE. In this case, the UE may always assume two-layer transmission. Each UE performs rate matching based on the available REs in the allocated eCCEs by assuming its own CSI-RS configuration. Therefore, there is no ambiguity between the eNB and the UE.

In Rel-8, PUCCH resources for acknowledgements and negative acknowledgements (ACK/NACK) can be derived based at least in part on the first CCE of the PDCCH that schedules the corresponding PDSCH. In Rel-11, with the introduction of the E-PDCCH, the PUCCH resources for ACK/NACK can be based on the eCCE, which is the smallest control channel element for the E-PDCCH. However, if MU-MIMO transmission is supported for E-PDCCH transmission, such an implicit mapping mechanism may have some issues. For example, as shown in FIG. 47, where MU-MIMO transmission of an E-PDCCH is illustrated, E-PDCCH3 and E-PDCCH5 both use eCCE2 as their first eCCE. Therefore, if a Rel-8 implicit mapping rule is used, the PUCCH resources for ACK/NACK for these two UEs can be the same. A similar situation may apply to E-PDCCH4 and E-PDCCH6 in the same figure, as they both use eCCE4 as the first eCCE.

To avoid this issue, the implicit mapping rule between a PUCCH resource for ACK/NACK and the first CCE index may need to be modified. In an embodiment, the PUCCH resource for ACK/NACK can be linked to the eCCE index whose corresponding DMRS port is used for E-PDCCH decoding. In general, if a set of $\{eCCE_m, eCCE_{m+1}, \ldots, eCCE_{m+L-1}\}$ are allocated to an E-PDCCH, where $m \in \{0, 1, \ldots, N_{eCCE}-1\}$ and m mod L=0, DMRS ports for E-PDCCH decoding may be determined by the following equation:

$$\text{DMRS port number} = f(m, m+1, \ldots, m+L-1) \bmod M_{eCCE} + 7$$

The PUCCH resource $n_{PUCCH}^{(1,p)}$ on antenna port p for ACK/NACK transmission using PUCCH format 1a/1b can be derived based on the corresponding absolute eCCE index as described below:

$$n_{PUCCH}^{(1,p=p0)} = f(m, m+1, \ldots, m+L-1) + N_{PUCCH}^{offset}$$

where the aggregation level L can be, for example, 1, 2, 4, 8, ..., $2^n$, wherein n is an integer. $N_{PUCCH}^{offset}$ is an offset configured by a higher layer.

The above operation is performed because the DMRS ports derived from the above formula would be different for different E-PDCCHs paired for MU-MIMO, and their corresponding eCCE indices used in deriving the DMRS ports are different.

To be more specific, in one example, a DMRS port can be derived as follows:

$$\text{DMRS\_port} = \max(m, m+1, \ldots, m+L-1) \bmod M_{eCCE} + 7$$

$$= (m+L-1) \bmod M_{eCCE} + 7$$

Then, the PUCCH resource for ACK/NACK can be derived based on a corresponding f( ... ) function as described below:

$$n_{PUCCH}^{(1,p=p0)} = m+L-1+N_{PUCCH}^{offset}$$

$m \in \{0, 1, \ldots, N_{eCCE}-1\}$ and m mod L=0

Figure 55:
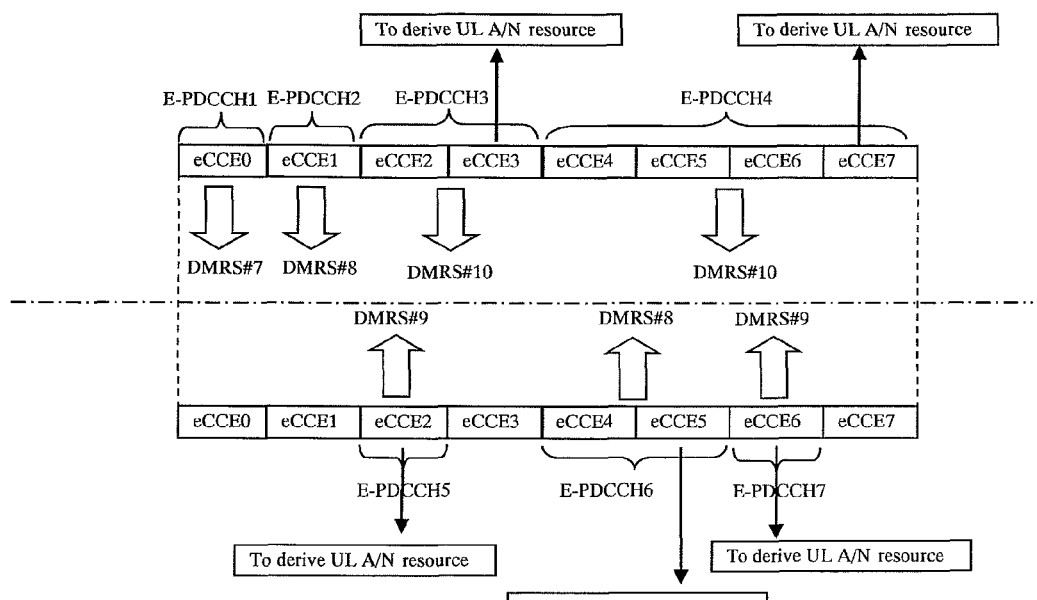
FIG. 55 illustrates an eCCE index for a PUCCH ACK/NACK resource according to one embodiment.

FIG. 55 shows an example where a number of E-PDCCHs are paired for MU-MIMO transmission. Each E-PDCCH has an eCCE which could be used to generate the PUCCH ACK/NACK. The eCCE used to derive the PUCCH ACK/NACK resource index for each E-PDCCH is the one used to derive the DMRS port assignment for the E-PDCCH and may not necessarily be the first eCCE of the E-PDCCH. In the example, the allocated eCCE with the highest index is used to derive the PUCCH ACK/NACK resource index for each E-PDCCH. From the figure, it can be seen that even with MU-MIMO transmission, the eCCEs used to derive PUCCH ACK/NACK resources do not overlap with each other. Therefore, the issue that two UEs may generate the same resource for their PUCCH ACK/NACK signals if legacy mapping rules are used may be avoided.

In another example, a DMRS port can be derived as follows:

$$\text{DMRS\_port} = \min(m, m+1, \ldots, m+L-1) \bmod M_{eCCE} + 7$$

$$= (m) \bmod M_{eCCE} + 7$$

Then, the PUCCH resource for ACK/NACK can be derived based on a corresponding absolute eCCE index as described below:

$$n_{PUCCH}^{(1,p=p0)} = m + N_{PUCCH}^{offset}$$

In the situation of a MU-MIMO transmission of an E-PDCCH where the same DMRS port but different scrambling identities (SCIDs) are assigned to two E-PDCCHs, the eCCEs used to generate the PUCCH ACK/NACK resource can be linked to the eCCEs generated above plus an offset. For example, such offset can be the SCID to generate the different sequences, which can be signaled to the UE semi-statically using higher layer signaling. For example, $$n_{PUCCH}^{(1,p=p0)} = f(m, m+1, \ldots, m+L-1) + N_{PUCCH}^{offset} + \text{SCID}$$

SCID={0,1} is the seed to generate the DMRS sequence.

In this situation, the eNB should properly schedule E-PDCCH transmission to avoid any usage of $f(m, m+1, \ldots, m+L-1)+1$ as an eCCE index for PUCCH ACK/NACK resource generation.

For a two antenna port transmission case, the PUCCH resource for antenna port p=p1 is given by:

$$n_{PUCCH}^{1,p=p1} = n_{PUCCH}^{(1,p=p0)} + 1$$

Again, the eNB should try to avoid PUCCH ACK/NACK resource collisions by proper E-PDCCH scheduling. In this case, for example, the eNB may not schedule two aggregation level 1 E-PDCCHs in two consecutive eCCEs.

In summary, in some embodiments, for E-PDCCH transmission, the eCCE used to generate the PUCCH ACK/NACK resource is a function of eCCE indices assigned for the E-PDCCH. The eCCE used to generate the PUCCH ACK/NACK resource may be the one used to generate the DMRS assignment for the E-PDCCH decoding. Alternatively or additionally, the eCCE used to generate the PUCCH ACK/NACK resource may be the one used to generate the DMRS assignment for the E-PDCCH demodulation, plus the SCID, the seed to generate the DMRS sequence.

Common control channels can also be configured and transmitted in an E-PDCCH. Similar to the legacy PDCCH design, the common control channels can be transmitted together with UE-specific control channels over an E-PDCCH region with distributed transmission. This is because common control channels are used to carry common messages for multiple UEs and therefore may not benefit from beamforming transmission. To enhance the performance of common control channels, distributed transmission may be used.

Similar to the legacy PDCCH design, a subset of the resources in the E-PDCCH region configured for distributed transmission can be used for common control channel transmission. Common search spaces can be defined over the subset of such resources for UEs to perform blind decoding of common control channels. UE-specific search spaces can also be defined in the same region for some or all UEs, and a UE can be configured through RRC signaling regarding whether or not to use blind decoding to detect UE-specific control channels in the region. As a result, both an E-PDCCH region with localized transmission and an E-PDCCH region with distributed transmission can be configured, and UE-specific search spaces can be defined in each of the two regions.

For UEs that are configured for distributed transmission of the E-PDCCH, the UE-specific E-PDCCH region with distribution transmission can be viewed as a UE-specific search space (USS) with distributed transmission. Such UE-specific search spaces along with common search spaces in the distributed transmission region for the E-PDCCH can be REG-based or eCCE-based. The REG-based transmission may be similar to that designed in Rel-8, where a REG is the smallest unit for resource mapping of control channels. The eCCE-based transmission may use an eCCE as the smallest unit to transmit each control channel.

Figure 56:
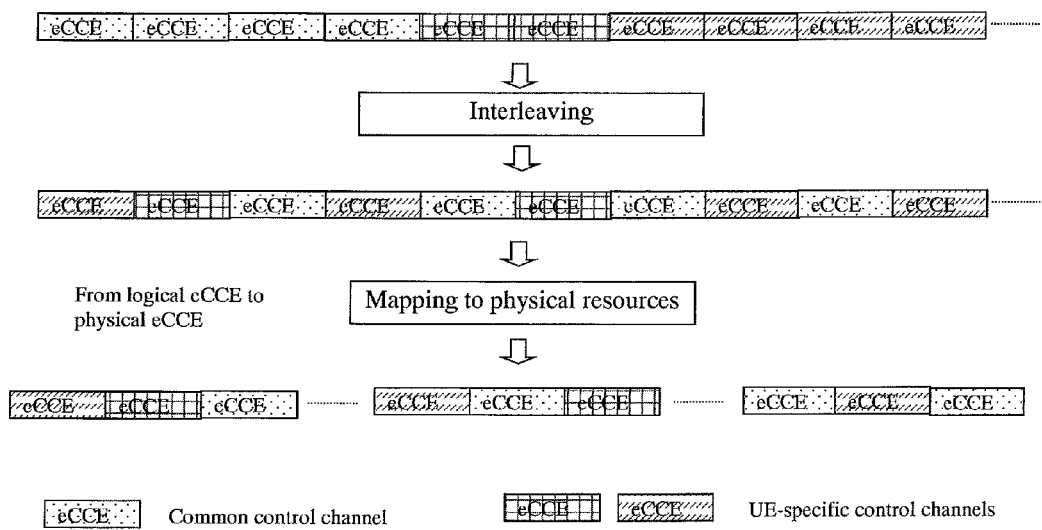
FIG. 56 illustrates an eNB procedure for a common control channel and a UE-specific control channel with distributed transmission in an E-PDCCH according to one embodiment.

At the eNB side, the transmission procedure of common control channels and UE-specific control channels with distributed transmission is illustrated in FIG. 56, which can be summarized as follows: The common control channels and UE-specific control channels may be placed in a queue. The common control channels can be placed at the start of the queue, and the UE-specific control channels can be placed after them. Alternatively, the available eCCEs may be arranged in a queue starting from eCCE index 0. The resources for the common control channels may be allocated in the eCCEs at the start of the queue, and the number of eCCEs for that purpose may be predefined. The resources for UE-specific control channels at a subframe may be allocated to eCCEs determined by a UE ID (e.g., an RNTI) and the subframe number. Thus, the possible eCCEs used for UE-specific control channels may overlap with the eCCEs for the common control channels. A common control channel, if present, may be allocated first, and a UE-specific control channel may be allocated after all common control channels have been allocated. It is possible that a UE-specific control channel may not be allocated in a subframe, as some or all of the possible eCCEs that could be allocated for the UE-specific control channel may have already been allocated to other common or UE-specific control channels. The queue of eCCEs can go through an interleaving process, which can change the order of eCCEs in the queue. The interleaved eCCEs can be mapped to physical resources, which can be allocated in multiple sub-bands distributed in the system bandwidth.

Figure 57:
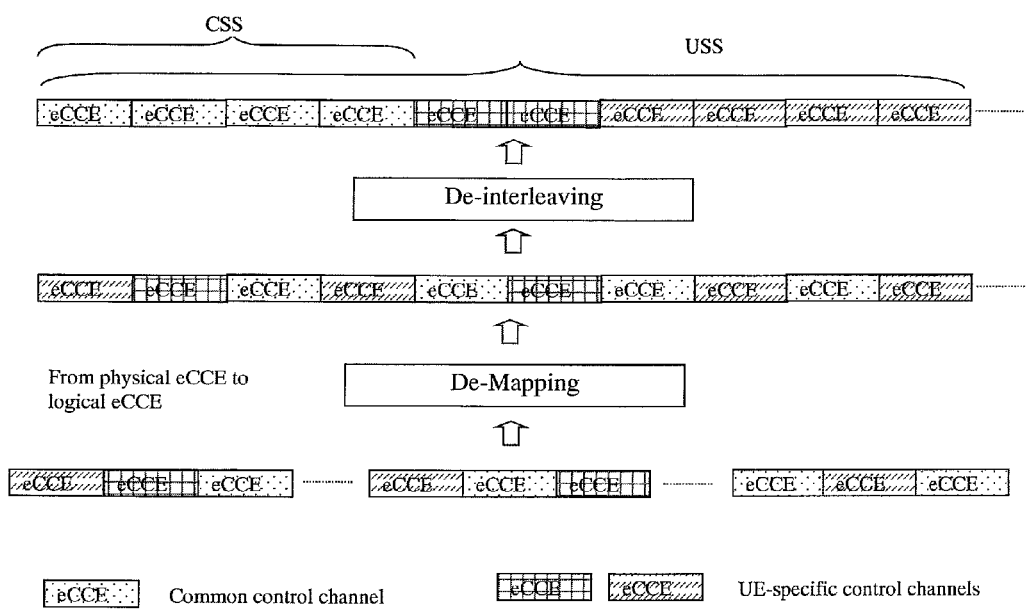
FIG. 57 illustrates a UE procedure for a common control channel and a UE-specific control channel with distributed transmission in an E-PDCCH according to one embodiment.

At the UE side, the receiving procedure of common control channels and UE-specific control channels with distributed transmission is illustrated in FIG. 57, which is the reverse procedure of that at the eNB. The procedure can be summarized as follows: The physical eCCEs carrying common control channels and UE-specific control channels with distributed transmission can be mapped to logical eCCEs. The obtained queue of eCCEs can go through a de-interleaving process, which is the reverse process of the interleaving process at the eNB. The de-interleaved eCCEs in the queue can be divided into CSS and USS, where CSS is at the beginning of the queue, while USS can cover all the eCCEs. The UE can search for the common control channels in the CSS and for UE-specific control channels in the USS. The starting position of a UE-specific control channel can be determined based on UE ID and subframe index, and the aggregation level can be determined through blind decoding.

In summary, in the E-PDCCH, eCCEs based on common control channels and UE-specific control channels with distributed transmission can be interleaved and mapped to physical eCCEs distributed across the system bandwidth.

Figure 28:
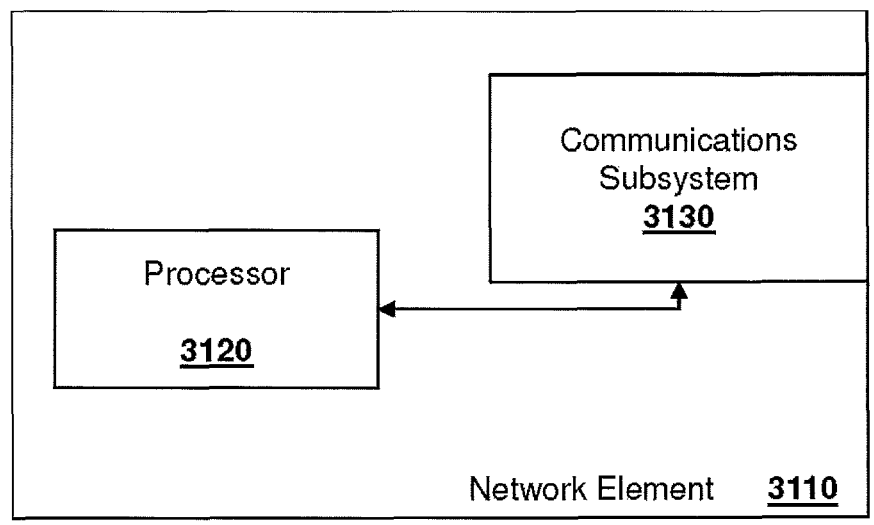
FIG. 28 is a simplified block diagram of an exemplary network element according to one embodiment.

The concepts described above may be implemented by a network element. A simplified network element is shown with regard to FIG. 28. In FIG. 28, network element 3110 includes a processor 3120 and a communications subsystem 3130, where the processor 3120 and communications subsystem 3130 cooperate to perform the methods described above.

Further, the above may be implemented by a UE. One exemplary device is described below with regard to FIG. 29. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 29:
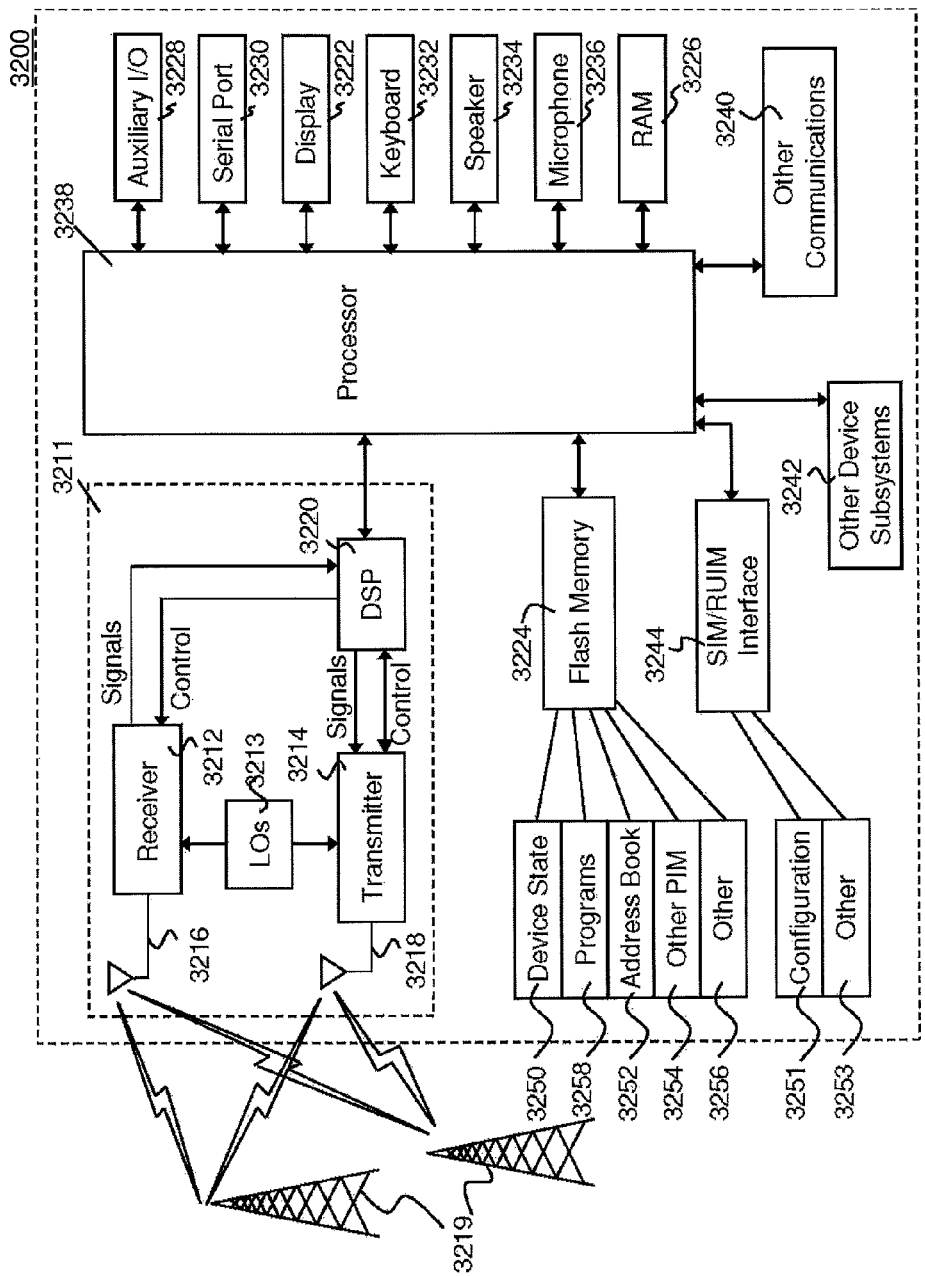
FIG. 29 is a block diagram with an example user equipment capable of being used with the systems and methods in the embodiments described herein.

When required network registration or activation procedures have been completed, UE 3200 may send and receive communication signals over the network 3219. As illustrated in FIG. 29, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Some of the subsystems shown in FIG. 29 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 29 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 30:
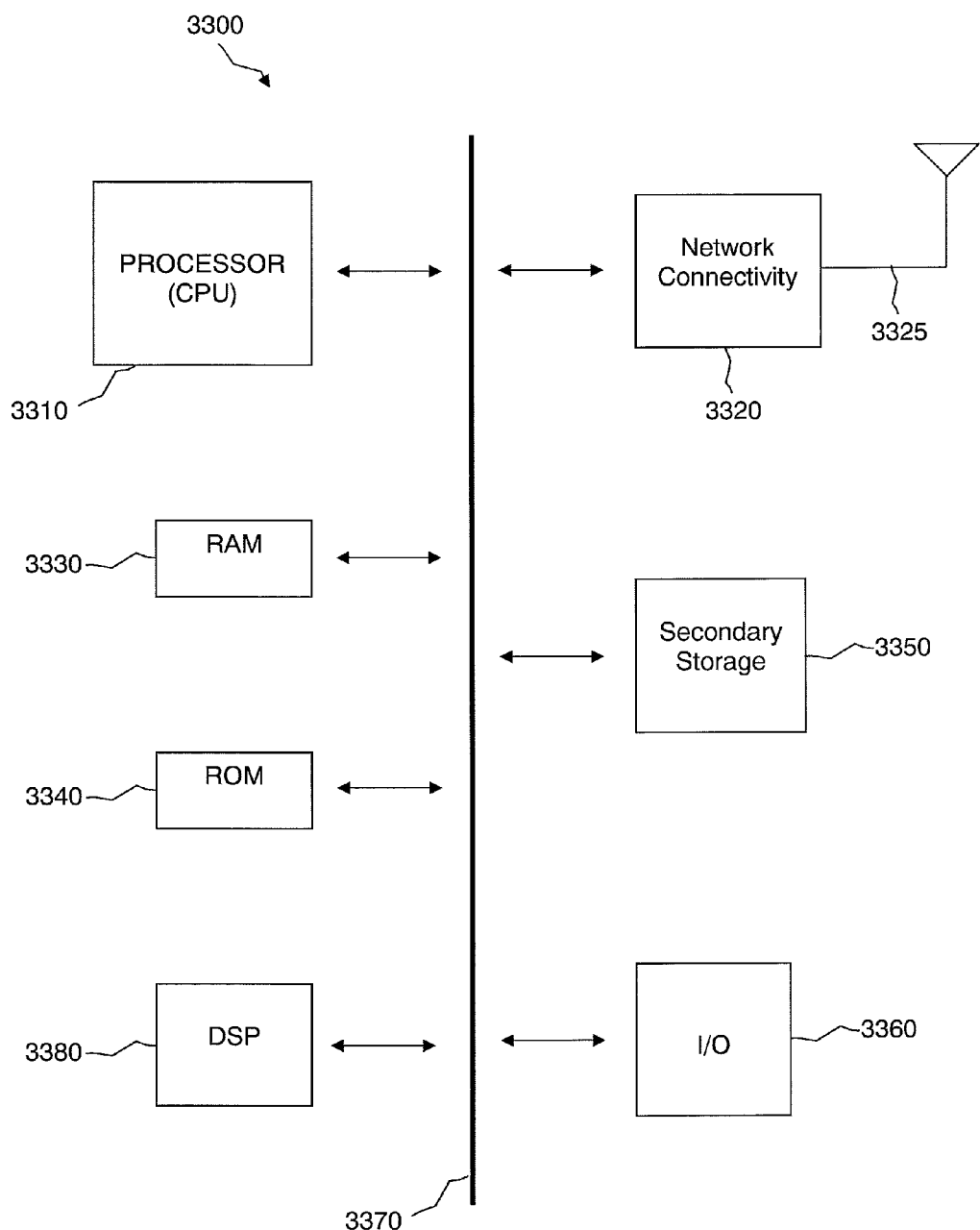
FIG. 30 illustrates a processor and related components suitable for implementing the several embodiments of the present disclosure.

The UE and other components described above might include a processing component that is capable of executing instructions related to the actions described above. FIG. 30 illustrates an example of a system 3300 that includes a processing component 3310 suitable for implementing one or more embodiments disclosed herein. The processing component 3310 may be substantially similar to the processor 3120 of FIG. 28 and/or the processor 3238 of FIG. 29.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an implementation, a method is provided for communication in a wireless telecommunications network. The method comprises transmitting an E-PDCCH to a UE using transmit diversity from at least one DMRS port.

In another implementation, an access node in a wireless telecommunications network is provided. The access node includes a processor configured such that the access node transmits an E-PDCCH to a UE using transmit diversity from at least one DMRS port.

In another implementation, a UE is provided. The UE includes a processor configured such that the UE receives an E-PDCCH that was transmitted using transmit diversity from at least one DMRS port.

The following are incorporated herein by reference for all purposes: 3GPP Technical Specification (TS) 36.211, 3GPP TS 36.213, 3GPP TS 36.216, 3GPP TS 36.331, and 3GPP TR 36.819.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunications network, comprising:
   transmitting an extended physical downlink control channel (E-PDCCH) to a user equipment (UE) using transmit diversity from at least one demodulation reference signal (DMRS) port.

2. The method of claim 1, wherein the DMRS port uses the same set of resource elements to carry a reference signal as those DMRS ports defined in Release 10 of the Third Generation Partnership Project Long Term Evolution standards.

3. The method of claim 1, wherein the transmit diversity is at least one of:
   space-frequency block code (SFBC);
   hybrid SFBC and space-time block code (STBC); or
   channel independent beamforming.

4. The method of claim 3, wherein channel independent beamforming is achieved by applying a precoding operation on modulated E-PDCCH symbols before the modulated E-PDCCH symbols are transmitted over at least two antennas, and wherein the precoding operation comprises applying one precoding vector to a modulated E-PDCCH symbol.

5. The method of claim 4, wherein different precoding vectors are used for different modulated symbols or different groups of modulated symbols of the E-PDCCH in a physical resource block pair.

6. The method of claim 5, wherein the different groups of modulated symbols of the E-PDCCH are transmitted on different DMRS ports.

7. The method of claim 1, wherein transmission using transmit diversity is assumed for an E-PDCCH transmission when at least two DMRS ports are configured in a physical resource block pair for the E-PDCCH.

8. The method of claim 1, wherein the use of transmit diversity for an E-PDCCH transmission is explicitly signaled to the UE.

9. The method of claim 1, wherein modulated symbols of the E-PDCCH are mapped to resource elements in at least one physical resource block pair using at least one of:
   space frequency block code (SFBC)-based mapping;
   hybrid SFBC and space time block code (STBC)-based mapping; or
   symbol-by-symbol based mapping to a time-and-frequency resource following a pre-defined rule for channel independent beamforming.

10. The method of claim 1, wherein, when the UE is within the coverage areas of at least two transmission points, an E-PDCCH is transmitted from at least two of the transmission points using at least one of:
    transmit diversity;
    beamforming; or
    combined transmit diversity and beamforming.

11. An access node in a wireless telecommunications network, comprising:
    a processor configured such that the access node transmits an extended physical downlink control channel (E-PDCCH) to a user equipment (UE) using transmit diversity from at least one demodulation reference signal (DMRS) port.

12. The access node of claim 11, wherein the DMRS port uses the same set of resource elements to carry a reference signal as those DMRS ports defined in Release 10 of the Third Generation Partnership Project Long Term Evolution standards.

13. The access node of claim 11, wherein the transmit diversity is at least one of:
    space-frequency block code (SFBC);
    hybrid SFBC and space-time block code (STBC); or
    channel independent beamforming.

14. The access node of claim 13, wherein channel independent beamforming is achieved by applying a precoding operation on modulated E-PDCCH symbols before the modulated E-PDCCH symbols are transmitted over at least two antennas, and wherein the precoding operation comprises applying one precoding vector to a modulated E-PDCCH symbol.

15. The access node of claim 14, wherein different precoding vectors are used for different modulated symbols or different groups of modulated symbols of the E-PDCCH in a physical resource block pair.

16. The access node of claim 15, wherein the different groups of modulated symbols of the E-PDCCH are transmitted on different DMRS ports.

17. The access node of claim 11, wherein transmission using transmit diversity is assumed for an E-PDCCH transmission when at least two DMRS ports are configured in a physical resource block pair for the E-PDCCH.

18. The access node of claim 11, wherein the use of transmit diversity for an E-PDCCH transmission is explicitly signaled to the UE.

19. The access node of claim 11, wherein modulated symbols of the E-PDCCH are mapped to resource elements in at least one physical resource block pair using at least one of:
    space frequency block code (SFBC)-based mapping;
    hybrid SFBC and space time block code (STBC)-based mapping; or
    symbol-by-symbol based mapping to a time-and-frequency resource following a pre-defined rule for channel independent beamforming.

20. The access node of claim 11, wherein, when the UE is within the coverage areas of at least two transmission points, an E-PDCCH is transmitted from at least two of the transmission points using at least one of:
    transmit diversity;
    beamforming; or
    combined transmit diversity and beamforming.

21. A user equipment (UE), comprising:
    a processor configured such that the UE receives an extended physical downlink control channel (E-PDCCH) that was transmitted using transmit diversity from at least one demodulation reference signal (DMRS) port.

22. The UE of claim 21, wherein the DMRS port uses the same set of resource elements to carry a reference signal as those DMRS ports defined in Release 10 of the Third Generation Partnership Project Long Term Evolution standards.

23. The UE of claim 21, wherein the transmit diversity is at least one of:
    space-frequency block code (SFBC);
    hybrid SFBC and space-time block code (STBC); or
    channel independent beamforming.

24. The UE of claim 23, wherein, in the case of channel independent beamforming, the UE receives different modulated symbols or different groups of modulated symbols of the E-PDCCH in a physical resource block pair associated with different DMRS ports.

25. The UE of claim 21, wherein transmit diversity is assumed for an E-PDCCH reception when at least two DMRS ports are configured in a physical resource block pair for the E-PDCCH.

26. The UE of claim 21, wherein the use of transmit diversity for an E-PDCCH transmission is explicitly signaled to the UE.

27. The UE of claim 21, wherein modulated symbols of the E-PDCCH are mapped to resource elements in at least one physical resource block pair using at least one of:
- space frequency block code (SFBC)-based mapping;
- hybrid SFBC and space time block code (STBC)-based mapping; or
- symbol-by-symbol based mapping to a time-and-frequency resource following a pre-defined rule for channel independent beamforming.

28. The UE of claim 21, wherein, when the UE is within the coverage areas of at least two transmission points, the UE receives the E-PDCCH from at least two of the transmission points, the E-PDCCH having been transmitting using at least one of:
- transmit diversity;
- beamforming; or
- combined transmit diversity and beamforming.

* * * * *